US012489602B2

(12) United States Patent
Yang et al.

(10) Patent No.: US 12,489,602 B2
(45) Date of Patent: Dec. 2, 2025

(54) DEVICE FOR PROCESSING HOMOMORPHICALLY ENCRYPTED DATA

(71) Applicant: AGENCY FOR SCIENCE, TECHNOLOGY AND RESEARCH, Singapore (SG)

(72) Inventors: Hong Yang, Singapore (SG); Dee Meng Kang, Singapore (SG); Ahmad Qaisar Ahmad Al Badawi, Singapore (SG); Khin Mi Mi Aung, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 245 days.

(21) Appl. No.: 18/254,132

(22) PCT Filed: Nov. 24, 2021

(86) PCT No.: PCT/SG2021/050723
§ 371 (c)(1),
(2) Date: May 23, 2023

(87) PCT Pub. No.: WO2022/115036
PCT Pub. Date: Jun. 2, 2022

(65) Prior Publication Data

US 2024/0039694 A1 Feb. 1, 2024

(30) Foreign Application Priority Data

Nov. 24, 2020 (SG) .......................... 10202011663Q

(51) Int. Cl.

| | |
|---|---|
| ***H04L 9/00*** | (2022.01) |
| ***G06F 7/72*** | (2006.01) |
| ***G06F 9/38*** | (2018.01) |

(52) U.S. Cl.
CPC .............. *H04L 9/008* (2013.01); *G06F 7/724* (2013.01); *G06F 9/3875* (2013.01)

(58) Field of Classification Search
CPC ....... H04L 9/008; G06F 7/724; G06F 9/3875; G06F 17/144; G06F 21/602
See application file for complete search history.

(56) References Cited

U.S. PATENT DOCUMENTS 10,298,385 B2 * 5/2019 Khedr ..................... H04L 9/008
11,165,592 B2 * 11/2021 Barreto ................ H04L 9/3066
(Continued)

FOREIGN PATENT DOCUMENTS

WO WO-2019022665 A2 * 1/2019 ............... G06F 7/00

OTHER PUBLICATIONS

Ahmad Al Badawi, "High-Performance FV Somewhat Homomorphic Encryption on GPUs", DOI: https://doi.org/10.13154/tches.v2018.12.70-95 vol. 2018, Issue 2, Published May 8, 2018 , 26 pages (Year: 2018).*
(Continued)

*Primary Examiner* — Shahriar Zarrineh

(57) ABSTRACT

There is provided a device for processing homomorphically encrypted data. The device includes: inter-line butterfly array blocks, each inter-line butterfly array block including inter-line modulus butterfly units, each inter-line modulus butterfly unit being configured to perform a modulus butterfly operation based on a computation pair of data points received corresponding to a pair of input data points at a same row of a matrix of input data points; intra-line butterfly array blocks, each intra-line butterfly array block including intra-line modulus butterfly units, each intra-line modulus butterfly unit being configured to perform a modulus butterfly operation based on a computation pair of data points received corresponding to a pair of input data points at a
(Continued)

same column of the matrix of input data points; and a clock counter communicatively coupled to each inter-line butterfly array block and each intra-line butterfly array block, and configured to output a counter signal.

20 Claims, 50 Drawing Sheets

(56) References Cited

U.S. PATENT DOCUMENTS

| | | | | |
|---|---|---|---|---|
| 11,436,351 | B1 * | 9/2022 | Abraham | H04L 9/008 |
| 11,444,926 | B1 * | 9/2022 | Gama | G06N 5/04 |
| 11,456,856 | B2 * | 9/2022 | Khedr | H04L 9/008 |
| 2001/0032227 | A1 * | 10/2001 | Jaber | G06F 17/142 708/313 |
| 2010/0191791 | A1 | 7/2010 | Patel et al. | |
| 2018/0139054 | A1 * | 5/2018 | Chu | H04L 9/008 |
| 2018/0294950 | A1 | 10/2018 | Khedr et al. | |
| 2019/0222412 | A1 * | 7/2019 | Khedr | H04L 9/0618 |
| 2019/0268135 | A1 * | 8/2019 | Khedr | G09C 1/00 |
| 2020/0213079 | A1 | 7/2020 | Kreeger et al. | |
| 2021/0058229 | A1 * | 2/2021 | Jiang | G06F 21/6245 |
| 2021/0344489 | A1 * | 11/2021 | Becher | H04L 9/008 |

OTHER PUBLICATIONS

International Search Report and Written Opinion issued Jan. 17, 2022 regarding International Application No. PCT/SG2021/050723, 10 pages.

Kim et al., "Hardware Architecture of a No. Theoretic Transform for a Bootstrappable RNS-based Homomorphic Encryption Scheme", 2020 IEEE 28th Annual International Symposium on Field-Programmable Custom Computing Machines (FCCM), May 2020, pp. 56-64.

Voss et al., "Design and implementation of an accelerated Gabor filter bank using parallel hardware", International Conference on Field Programmable Logic and Applications (FPL 2001), Jan. 2001, pp. 451-460.

Tao et al., "Multirate-based fast parallel algorithms for DCT-kernel-based real-valued discrete Gabor transform", Signal Processing, vol. 92, Issue 3, Mar. 2012, pp. 679-684.

"Configurable Flow Accelerators", University of Edinburgh, Institute for Computing Systems Architecture, undated (accesed Nov. 19, 2023), 3 pages. groups.inf.ed.ac.uk/pasta/rareas_cfa.html.

Roy et al., "FPGA-Based High-Performance Parallel Architecture for Homomorphic Computing on Encrypted Data", 2019 IEEE International Symposium on High Performance Computer Architecture (HPCA), Feb. 2019, pp. 387-398.

* cited by examiner $m = 2^{15}$, $m = L * Q$, $m = 2^n$, $L = 2^r$, $Q = 2^q, n = q + r$ H: array with Q x L constant complex integers.

$m=2^{15}$, $m=L*Q$, $m=2^n$, $L=2^r$, $Q=2^q$, $n=q+r$

H': array with Q x L constant complex integers, minV is an integer

Two-buffer pipeline

Complex Modulus Multiplication 808-0

1508

Complex Modulus Addition

Complex Modulus Subtraction 1012-j 1008-0

2808

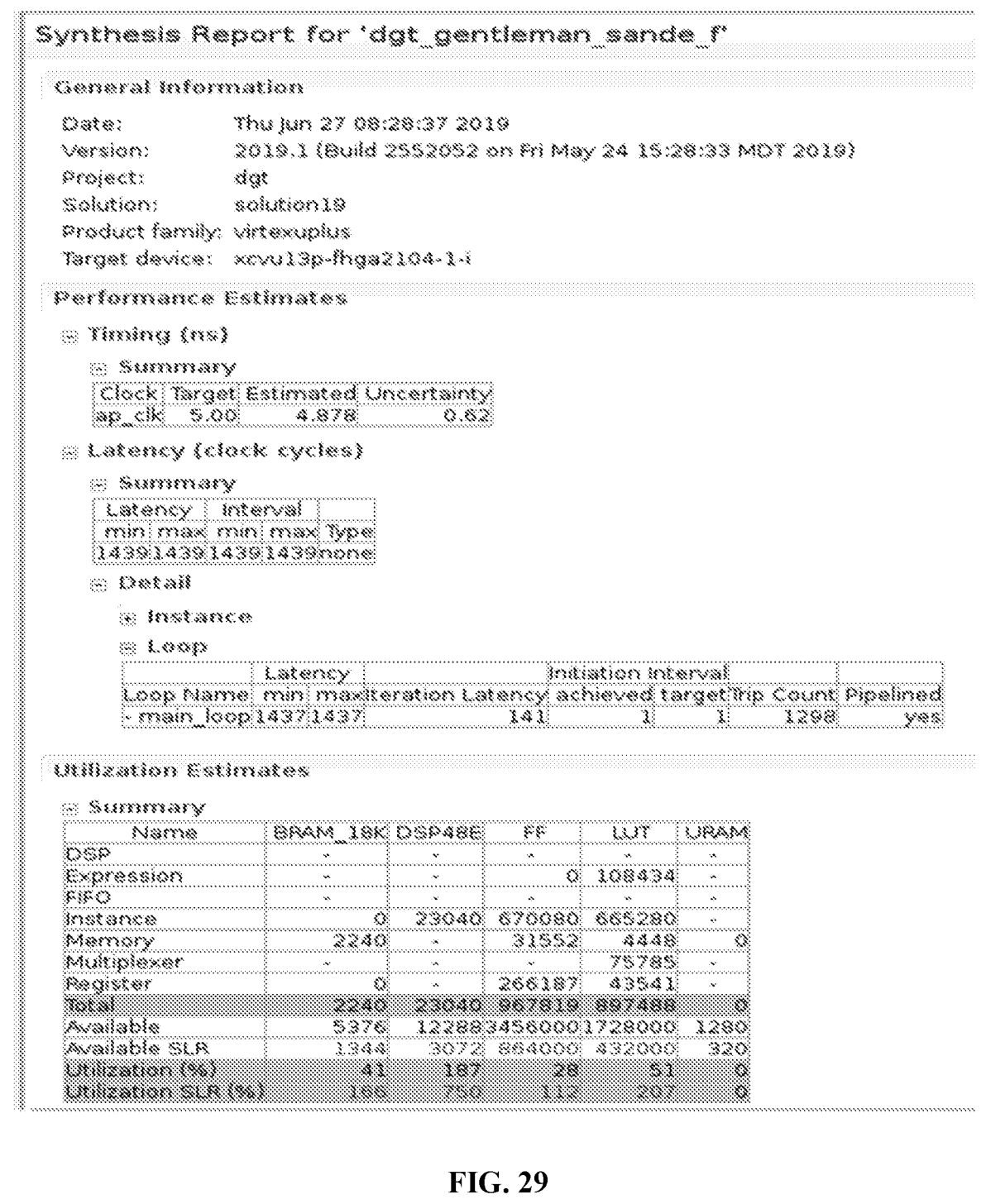

Synthesis Report for 'dgt_gentleman_sande_f'

General Information

| | |
|---|---|
| Date: | Thu Jun 27 08:28:37 2019 |
| Version: | 2019.1 (Build 2552052 on Fri May 24 15:28:33 MDT 2019) |
| Project: | dgt |
| Solution: | solution19 |
| Product family: | virtexuplus |
| Target device: | xcvu13p-fhga2104-1-i |

Performance Estimates

Timing (ns)

Summary

| Clock | Target | Estimated | Uncertainty |
|---|---|---|---|
| ap_clk | 5.00 | 4.878 | 0.62 |

Latency (clock cycles)

Summary

| Latency | | Interval | | |
|---|---|---|---|---|
| min | max | min | max | Type |
| 1439 | 1439 | 1439 | 1439 | none |

Detail

Instance

Loop

| | Latency | | | Initiation Interval | | | |
|---|---|---|---|---|---|---|---|
| Loop Name | min | max | Iteration Latency | achieved | target | Trip Count | Pipelined |
| - main_loop | 1437 | 1437 | 141 | 1 | 1 | 1298 | yes |

Utilization Estimates

Summary

| Name | BRAM_18K | DSP48E | FF | LUT | URAM |
|---|---|---|---|---|---|
| DSP | - | - | - | - | - |
| Expression | - | - | 0 | 108434 | - |
| FIFO | - | - | - | - | - |
| Instance | 0 | 23040 | 670080 | 665280 | - |
| Memory | 2240 | - | 31552 | 4448 | 0 |
| Multiplexer | - | - | - | 75785 | - |
| Register | 0 | - | 266187 | 43541 | - |
| Total | 2240 | 23040 | 967819 | 897488 | 0 |
| Available | 5376 | 12288 | 3456000 | 1728000 | 1280 |
| Available SLR | 1344 | 3072 | 864000 | 432000 | 320 |
| Utilization (%) | 41 | 187 | 28 | 51 | 0 |
| Utilization SLR (%) | 166 | 750 | 112 | 207 | 0 |

FIG. 29

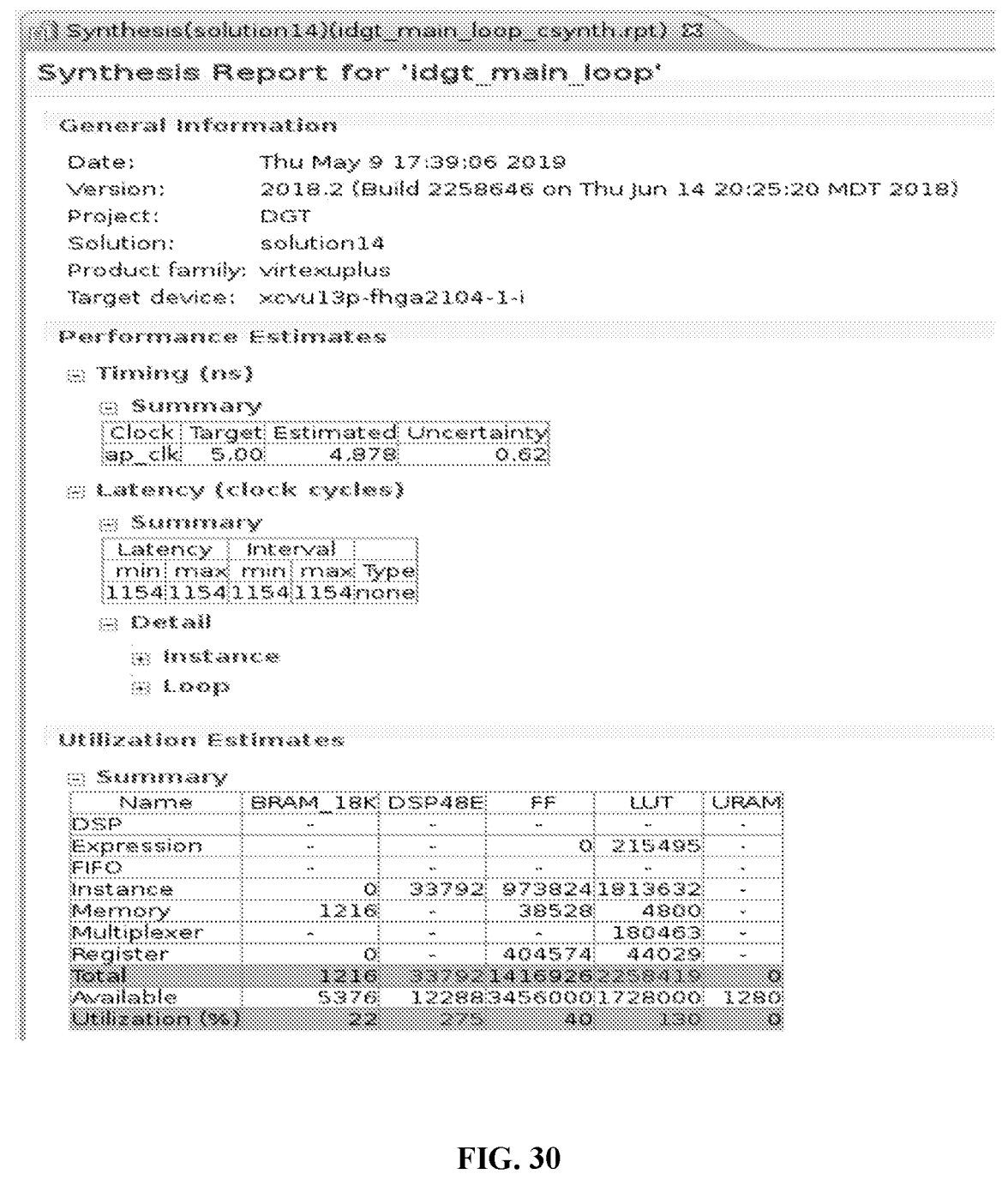

Synthesis(solution14)(idgt_main_loop_csynth.rpt)

Synthesis Report for 'idgt_main_loop'

General Information

| | |
|---|---|
| Date: | Thu May 9 17:39:06 2019 |
| Version: | 2018.2 (Build 2258646 on Thu Jun 14 20:25:20 MDT 2018) |
| Project: | DGT |
| Solution: | solution14 |
| Product family: | virtexuplus |
| Target device: | xcvu13p-fhga2104-1-i |

Performance Estimates

Timing (ns)

Summary

| Clock | Target | Estimated | Uncertainty |
|---|---|---|---|
| ap_clk | 5.00 | 4.878 | 0.62 |

Latency (clock cycles)

Summary

| Latency | | Interval | | |
|---|---|---|---|---|
| min | max | min | max | Type |
| 1154 | 1154 | 1154 | 1154 | none |

Detail

Instance

Loop

Utilization Estimates

Summary

| Name | BRAM_18K | DSP48E | FF | LUT | URAM |
|---|---|---|---|---|---|
| DSP | - | - | - | - | - |
| Expression | - | - | 0 | 215495 | - |
| FIFO | - | - | - | - | - |
| Instance | 0 | 33792 | 973824 | 1813632 | - |
| Memory | 1216 | - | 38528 | 4800 | - |
| Multiplexer | - | - | - | 180463 | - |
| Register | 0 | - | 404574 | 44029 | - |
| Total | 1216 | 33792 | 1416926 | 2258419 | 0 |
| Available | 5376 | 12288 | 3456000 | 1728000 | 1280 |
| Utilization (%) | 22 | 275 | 40 | 130 | 0 |

FIG. 30

DEVICE FOR PROCESSING HOMOMORPHICALLY ENCRYPTED DATA

CROSS-REFERENCE TO RELATED APPLICATION

This application is a 371 National Stage of International Application No. PCT/SG2021/050723, filed on 24 Nov. 2021, which claims priority to Singapore Patent Application No. 10202011663Q, filed on 24 Nov. 2020, the content of which being hereby incorporated by reference in its entirety for all purposes.

TECHNICAL FIELD

The present invention generally relates to a device for processing homomorphically encrypted data and a system comprising the device, and more particularly, a hardware implementation of discrete Galois transform (DGT) and/or inverse discrete Galois transform (iDGT) operations for processing homomorphically encrypted data.

BACKGROUND

The long latency of conventional implementations of fully homomorphic encryption (FHE) multiplication prevents FHE from being widely used to solve a wide range of privacy-preserving computing problems in cloud and untrusted servers for allowing arbitrary operations to be performed on encrypted data without the need for the decryption key at any stage of computation. For example, the situation is worse in artificial intelligence (AI) as it demands more computing-intense data processing.

For example, a residual numeral system (RNS) implementation of homomorphic multiplication may frequently call discrete Galois transform (DGT) and inverse discrete Galois transform (iDGT) operations which are some of the most computationally intensive operations. In particular, these types of computations require O(n log n) complexity on top of other operations that run in O(n).

DGT and iDGT operations with conventional CPU (central processing unit) implementation are slower than those with conventional GPU (graphics processing unit) implementation due to the GPU having more Float Point (FP) cores for more parallel computations. However, the latency of the conventional GPU implementation, although better than the conventional CPU implementation, is still too long for practical considerations in homomorphic operations (e.g., homomorphic multiplication), especially for AI applications which demand huge computations and heavy data movement between FP cores and memory units.

A need therefore exists to provide a device for processing homomorphically encrypted data that seek to overcome, or at least ameliorate, one or more of deficiencies of conventional device for processing homomorphically encrypted data, such as but not limited to, improving performance and/or throughput in processing homomorphically encrypted data, and more particularly, in relation to a hardware implementation of DGT and/or iDGT operations for processing homomorphically encrypted data. It is against this background that the present invention has been developed.

SUMMARY

According to a first aspect of the present invention, there is provided a device for processing homomorphically encrypted data, the device comprising:

a plurality of inter-line butterfly array blocks, each inter-line butterfly array block comprising a plurality of inter-line modulus butterfly units, each inter-line modulus butterfly unit being configured to perform a modulus butterfly operation based on a computation pair of data points received corresponding to a pair of input data points at a same row of a matrix of input data points;

a plurality of intra-line butterfly array blocks, each intra-line butterfly array block comprising a plurality of intra-line modulus butterfly units, each intra-line modulus butterfly unit being configured to perform a modulus butterfly operation based on a computation pair of data points received corresponding to a pair of input data points at a same column of the matrix of input data points; and a clock counter communicatively coupled to each inter-line butterfly array block of the plurality of inter-line butterfly array blocks and each intra-line butterfly array block of the plurality of intra-line butterfly array blocks, and configured to output a counter signal for controlling said each inter-line butterfly array block and said each intra-line butterfly array block to operate with single cycle initiation interval, wherein the matrix of input data points comprises a plurality of columns of input data points, wherein a plurality of parallel input data points derived from the homomorphically encrypted data are arranged into the plurality of columns of input data points, and the plurality of inter-line butterfly array blocks and the plurality of intra-line butterfly array blocks are arranged in series to form a pipeline for processing the matrix of input data points.

According to a second aspect of the present invention, there is provided a system comprising:

a memory;

a device for processing homomorphically encrypted data; and at least one processor communicatively coupled to the memory and configured to:

send, from the memory, a plurality of parallel input data points derived from homomorphically encrypted data to the device for processing by the device; and receive, at the memory, a plurality of parallel output data points produced by the device after the plurality of parallel input data points is processed by the device, wherein the device comprises:

a plurality of inter-line butterfly array blocks, each inter-line butterfly array block comprising a plurality of inter-line modulus butterfly units, each inter-line modulus butterfly unit being configured to perform a modulus butterfly operation based on a computation pair of data points received corresponding to a pair of input data points at a same row of a matrix of input data points;

a plurality of intra-line butterfly array blocks, each intra-line butterfly array block comprising a plurality of intra-line modulus butterfly units, each intra-line modulus butterfly unit being configured to perform a modulus butterfly operation based on a computation pair of data points received corresponding to a pair of input data points at a same column of the matrix of input data points; and a clock counter communicatively coupled to each inter-line butterfly array block of the plurality of inter-line butterfly array blocks and each intra-line butterfly array block of the plurality of intra-line butterfly array blocks, and configured to output a counter signal for controlling said each inter-line butterfly array block and said each intra-line butterfly array block to operate with single cycle initiation interval, wherein the matrix of input data points comprises a plurality of columns of input data points, wherein a plurality of parallel input data points derived from the homomorphically encrypted data are arranged into the plurality of columns of input data points, and the plurality of inter-line butterfly array blocks and the plurality of intra-line butterfly array blocks are arranged in series to form a pipeline for processing the matrix of input data points.

According to a third aspect of the present invention, there is provided a method of forming a device for processing homomorphically encrypted data, the method comprising:

providing a plurality of inter-line butterfly array blocks, each inter-line butterfly array block comprising a plurality of inter-line modulus butterfly units, each inter-line modulus butterfly unit being configured to perform a modulus butterfly operation based on a computation pair of data points received corresponding to a pair of input data points at a same row of a matrix of input data points;

providing a plurality of intra-line butterfly array blocks, each intra-line butterfly array block comprising a plurality of intra-line modulus butterfly units, each intra-line modulus butterfly unit being configured to perform a modulus butterfly operation based on a computation pair of data points received corresponding to a pair of input data points at a same column of the matrix of input data points; and providing a clock counter communicatively coupled to each inter-line butterfly array block of the plurality of inter-line butterfly array blocks and each intra-line butterfly array block of the plurality of intra-line butterfly array blocks, and configured to output a counter signal for controlling said each inter-line butterfly array block and said each intra-line butterfly array block to operate with single cycle initiation interval, wherein the matrix of input data points comprises a plurality of columns of input data points, wherein a plurality of parallel input data points derived from the homomorphically encrypted data are arranged into the plurality of columns of input data points, and the plurality of inter-line butterfly array blocks and the plurality of intra-line butterfly array blocks are arranged in series to form a pipeline for processing the matrix of input data points.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIGS. 29 and 30 depict simulation results of the DGT circuit and the iDGT circuit according to various example embodiments of the present invention.

DETAILED DESCRIPTION

Various embodiments of the present invention provide a device for processing homomorphically encrypted data and a system comprising the device, and more particularly, relating to a hardware implementation of discrete Galois transform (DGT) and/or inverse discrete Galois transform (iDGT) operations for processing homomorphically encrypted data in relation to a homomorphic operation (e.g., a homomorphic multiplication operation).

For example, as explained in the background, the long latency of conventional implementations of fully homomorphic encryption (FHE) multiplication prevents FHE from being widely used to solve a wide range of privacy-preserving computing problems in cloud and untrusted servers for allowing arbitrary operations to be performed on encrypted data without the need for the decryption key at any stage of computation. For example, a residual numeral system (RNS) implementation of homomorphic multiplication may frequently call DGT and iDGT operations which are some of the most computationally intensive operations. For example, there exist conventional CPU and GPU implementations of DGT and iDGT operations with conventional CPU (central processing unit) implementation are slower than those with conventional GPU (graphics processing unit) implementation due to the GPU having more Float Point (FP) cores for more parallel computations. However, the latency of the conventional GPU implementation, although better than the conventional CPU implementation, is still too long for practical considerations in homomorphic operations (e.g., homomorphic multiplication), especially for AI applications which demand huge computations and heavy data movement between FP cores and memory units.

Accordingly, various embodiments of the present invention provide a device for processing homomorphically encrypted data that seek to overcome, or at least ameliorate, one or more of deficiencies of conventional device for processing homomorphically encrypted data, such as but not limited to, improving performance and/or throughput in processing homomorphically encrypted data, and more particularly, in relation to a hardware implementation of DGT and/or iDGT operations for processing homomorphically encrypted data in relation to a homomorphic operation (e.g., homomorphic multiplication).

Figure 1:
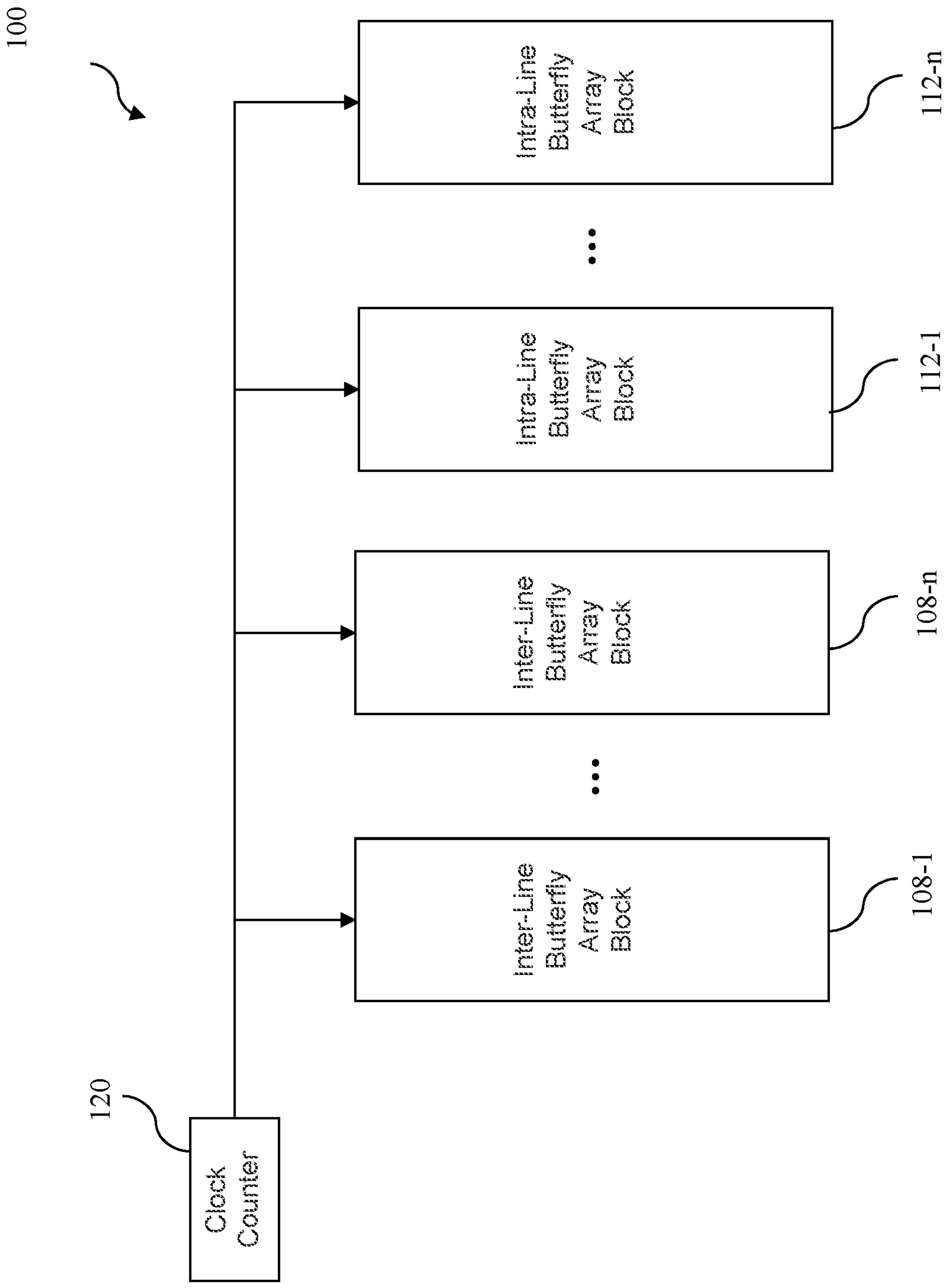
FIG. 1 depicts a schematic drawing of a device for processing homomorphically encrypted data, according to various embodiments of the present invention.

FIG. 1 depicts a schematic drawing of a device 100 for processing homomorphically encrypted data, according to various embodiments of the present invention. The device 100 comprises: a plurality of inter-line butterfly array blocks 108-1, . . . , 108-*n*, each inter-line butterfly array block comprising a plurality of inter-line modulus butterfly units, each inter-line modulus butterfly unit being configured to perform a modulus butterfly operation based on a computation pair of data points received corresponding to a pair of input data points at a same row of a matrix of input data points; a plurality of intra-line butterfly array blocks 112-1, . . . , 112-*n*, each intra-line butterfly array block comprising a plurality of intra-line modulus butterfly units, each intra-line modulus butterfly unit being configured to perform a modulus butterfly operation based on a computation pair of data points received corresponding to a pair of input data points at a same column of the matrix of input data points; and a clock counter 120 communicatively coupled to each inter-line butterfly array block of the plurality of inter-line butterfly array blocks 108-1, . . . , 108-*n* and each intra-line butterfly array block of the plurality of intra-line butterfly array blocks 112-1, . . . , 112-*n*, and configured to output a counter signal for controlling the above-mentioned each inter-line butterfly array block and the above-mentioned each intra-line butterfly array block to operate with single cycle initiation interval. In particular, the matrix of input data points comprises a plurality of columns of input data points, wherein a plurality of parallel input data points derived from the homomorphically encrypted data are arranged into the plurality of columns of input data points. Furthermore, the plurality of inter-line butterfly array blocks 108-1, . . . , 108-*n* and the plurality of intra-line butterfly array blocks 112-1, . . . , 112-*n* are arranged in series to form a pipeline for processing the matrix of input data points.

Accordingly, the device 100 according to various embodiments is advantageously configured with a pipeline architecture having single cycle initiation interval, thereby resulting in improved performance and/or throughput in processing homomorphically encrypted data, and more particularly, in relation to a hardware implementation of DGT and/or iDGT operations for processing homomorphically encrypted data. These advantages or technical effects, or other advantages or technical effects, will become more apparent to a person skilled in the art as the device 100 is described in more details according to various embodiments and example embodiments of the present invention.

In various embodiments, the device 100 further comprises a data point arranging block configured to receive the plurality of parallel input data points derived from the homomorphically encrypted data and arrange the plurality of parallel input data points received into the plurality of columns of input data points to form the matrix of input data points.

In various embodiments, each inter-line butterfly array block of the plurality of inter-line butterfly array blocks 108-1, . . . , 108-*n* comprises a plurality of first-in-first-out (FIFO) input data buffers. In this regard, for the above-mentioned each inter-line butterfly array block, each FIFO input data buffer of the plurality of FIFO input data buffers is communicatively coupled to the plurality of inter-line modulus butterfly units of the inter-line butterfly array block and is configured to receive a plurality of columns of data points and output each of the plurality of columns of data points to the plurality of inter-line modulus butterfly units column-by-column in FIFO order for each of the plurality of inter-line modulus butterfly units to perform the above-mentioned modulus butterfly operation based on the computation pair of data points received.

In various embodiments, for the above-mentioned each inter-line butterfly array block: the above-mentioned each of the plurality of columns of data points has a number of data points being half of the number of input data points in a column of the plurality of columns of input data points, and the plurality of inter-line modulus butterfly units of the inter-line butterfly array block has a number of inter-line modulus butterfly units being half of the number of input data points in the column of the plurality of columns of input data points.

In various embodiments, for the above-mentioned each inter-line butterfly array block: the inter-line butterfly array block comprises a first set of multiplexer units, each FIFO input data buffer of the plurality of FIFO input data buffers of the inter-line butterfly array being communicatively coupled to the plurality of inter-line modulus butterfly units of the inter-line butterfly array block via a multiplexer unit of the first set of multiplexer units, and the clock counter 120 is communicatively coupled to each multiplexer unit of the first set of multiplexer units for controlling the inter-line butterfly array block to operate with single cycle initiation interval.

In various embodiments, a first FIFO input data buffer and a third FIFO input data buffer of the plurality of FIFO input data buffers of the inter-line butterfly array block are each communicatively coupled to a first multiplexer unit of the first set of multiplexer units. In this regard, the first multiplexer unit is configured to output a column of data points of the plurality of columns of data points from a selected FIFO input data buffer amongst the first and third FIFO input data buffers to the plurality of inter-line modulus butterfly units of the inter-line butterfly array block. In this regard, the selected FIFO input data buffer is selected based on the counter signal received by the first multiplexer unit of the first set of multiplexer units.

In various embodiments, a second FIFO input data buffer and a fourth FIFO input data buffer of the plurality of FIFO input data buffers of the inter-line butterfly array block are each communicatively coupled to a second multiplexer unit of the first set of multiplexer units. In this regard, the second multiplexer unit is configured to output a column of data points of the plurality of columns of data points from a selected FIFO input data buffer amongst the second and fourth FIFO input data buffers to the plurality of inter-line modulus butterfly units of the inter-line butterfly array block. In this regard, the selected FIFO input data buffer is selected based on the counter signal received by the second multiplexer unit of the first set of multiplexer units.

In various embodiments, for each inter-line butterfly array block from a first inter-line butterfly array block to a penultimate inter-line butterfly array block of the plurality of inter-line butterfly array blocks 108-1, . . . , 108-*n*: the inter-line butterfly array block further comprises a second set of multiplexer units, each FIFO input data buffer of the plurality of FIFO input data buffers of an immediately subsequent inter-line butterfly array block of the plurality of inter-line butterfly array blocks 108-1, . . . , 108-*n* with respect to the inter-line butterfly array block is communicatively coupled to the plurality of inter-line modulus butterfly units of the inter-line butterfly array block via a multiplexer unit of the second set of multiplexer units. In various embodiments, the clock counter 120 is communicatively coupled to each multiplexer unit of the second set of multiplexer units for controlling the inter-line butterfly array block to operate with single cycle initiation interval.

In various embodiments, the first FIFO input data buffer and the second FIFO input data buffer of the plurality of FIFO input data buffers of the immediately subsequent inter-line butterfly array block are each communicatively coupled to a first multiplexer unit of the second of multiplexer units. In this regard, the first multiplexer unit is configured to output a first portion of a column of data points from the plurality of inter-line modulus butterfly units of the inter-line butterfly array block to a selected FIFO input data buffer amongst the first and second FIFO input data buffers. In this regard, the selected FIFO input data buffer is selected based on the counter signal received by the first multiplexer unit of the second set of multiplexer units.

In various embodiments, the third FIFO input data buffer and the fourth FIFO input data buffer of the plurality of FIFO input data buffers of the immediately subsequent inter-line butterfly array block are each communicatively coupled to a second multiplexer unit of the second of multiplexer units. In this regard, the second multiplexer unit being configured to output a second portion of a column of data points from the plurality of inter-line modulus butterfly units of the inter-line butterfly array block to a selected FIFO input data buffer amongst the third and fourth FIFO input data buffers. In this regard, the selected FIFO input data buffer being selected based on the counter signal received by the second multiplexer unit of the second set of multiplexer units.

In various embodiments, the first inter-line butterfly array block further comprises a third set of multiplexer units. In various embodiments, the first and second FIFO input data buffers of the plurality of FIFO input data buffers of the first inter-line butterfly array block are each communicatively coupled to a first multiplexer unit of the third set of multiplexer units. In this regard, the first multiplexer unit is configured to output a first portion of a column of data points from an input register to a selected FIFO input data buffer amongst the first and second FIFO input data buffers. In this regard, the selected FIFO input data buffer being selected based on the counter signal received by the first multiplexer unit of the third set of multiplexer units.

In various embodiments, the third and fourth FIFO input data buffers of the plurality of FIFO input data buffers of the first inter-line butterfly array block are each communicatively coupled to a second multiplexer unit of the third set of multiplexer units. In this regard, the second multiplexer unit is configured to output a second portion of the column of data points from the input register to a selected FIFO input data buffer amongst the third and fourth FIFO input data buffers. In this regard, the selected FIFO input data buffer is selected based on the counter signal received by the second multiplexer unit of the third set of multiplexer units. In various embodiments, the clock counter 120 is communicatively coupled to each multiplexer unit of the third set of multiplexer units for controlling the first inter-line butterfly array block to operate with single cycle initiation interval.

In various embodiments, a last inter-line butterfly array block of the plurality of inter-line butterfly array blocks 108-1, . . . , **108-*n* further comprises: a second set of multiplexer units; a third multiplexer unit; and a plurality of FIFO output data buffers. In various embodiments, each FIFO output data buffer of the plurality of FIFO output data buffers of the inter-line butterfly array is communicatively coupled to the plurality of inter-line modulus butterfly units of the last inter-line butterfly array block via a multiplexer unit of the second set of multiplexer units. Furthermore, the third multiplexer unit is configured to output a column of data points from a selected FIFO output data buffer amongst the plurality of FIFO output data buffers. In this regard, the selected FIFO output data buffer being selected based on the counter signal received by the third multiplexer unit. In various embodiments, the clock counter 120** is communicatively coupled to each multiplexer unit of the second set of multiplexer units and the third multiplexer unit for controlling the last inter-line butterfly array block to operate with single cycle initiation interval.

In various embodiments, each intra-line butterfly array block of the plurality of intra-line butterfly array blocks 112-1, . . . , **112-*n*** comprises an input register. In this regard, for the above-mentioned each intra-line butterfly array block, the input register is communicatively coupled to the plurality of intra-line modulus butterfly units of the intra-line butterfly array block and is configured to receive a column of data points and output the column of data points to the plurality of intra-line modulus butterfly units for each of the plurality of intra-line modulus butterfly units to perform said modulus butterfly operation based on the computation pair of data points received.

In various embodiments, the device 100 further comprises a weight modulus multiplication block comprising a plurality of modulus multiplication units, each modulus multiplication unit being configured to perform a modulus multiplication operation based on a data point received.

In various embodiments (e.g., in the case of the pipeline being configured to perform a DGT operation), the plurality of intra-line butterfly array blocks 112-1, . . . , **112-*n* are arranged after (i.e., subsequent to) the plurality of inter-line butterfly array blocks 108-1, . . . , 108-*n*** in pipeline. In various embodiments, the pipeline is configured to perform a DGT of the plurality of parallel input data points.

In various embodiments (e.g., in the case of the pipeline being configured to perform a iDGT operation), the plurality of inter-line butterfly array blocks 108-1, . . . , **108-*n* are arranged after (i.e., subsequent to) the plurality of intra-line butterfly array blocks 112-1, . . . , 112-*n*** in the pipeline. In various embodiments, the pipeline is configured to perform an iDGT of the plurality of parallel input data points.

In various embodiments, the plurality of parallel input data points has $2^n$ number of parallel input data points. In this regard, the matrix has $2^r$ number of rows of input data points and $2^{n-r}$ number of columns of input data points, wherein $n \geq 4$, $r \geq 2$ and $r<n$. Furthermore, the plurality of inter-line butterfly array blocks 108-1, . . . , **108-*n* has q number of inter-line buttery array blocks, wherein $q=n-r$, and the plurality of intra-line butterfly array blocks 112-1, . . . , 112-*n*** has r number of inter-line buttery array blocks.

In various embodiments, the device 100 is a field-programmable gate array (FPGA) device or an application specific integrated circuit (ASIC) device.

Figure 2:
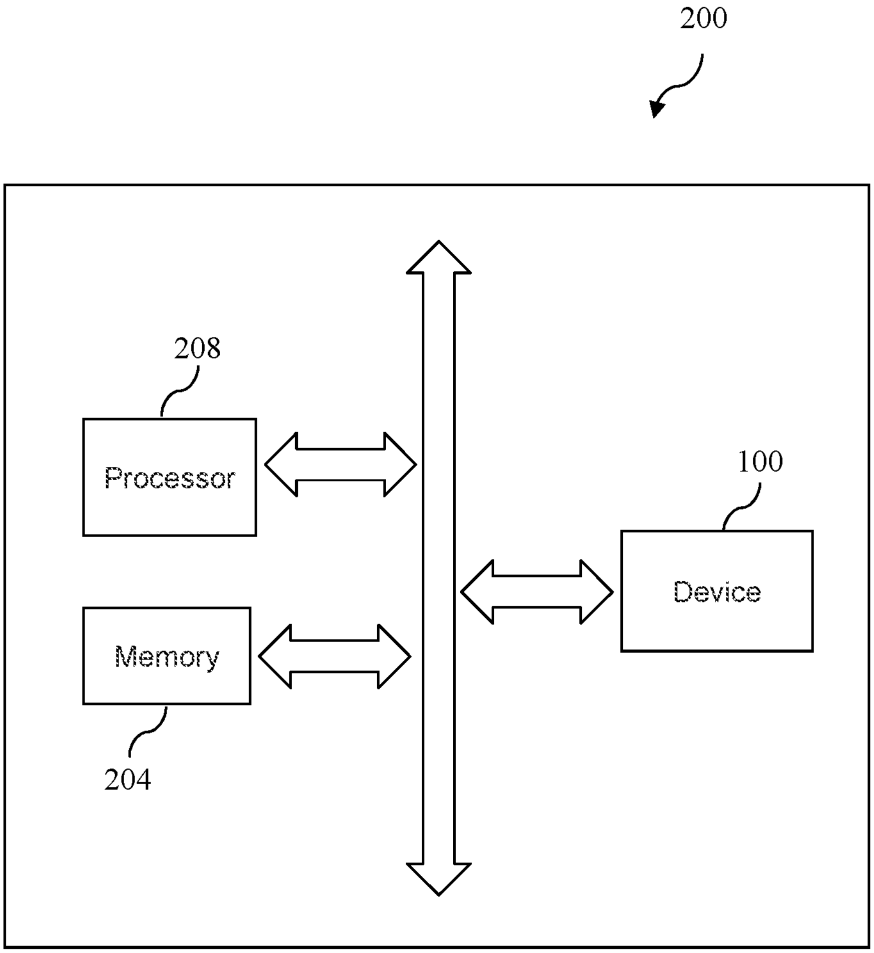
FIG. 2 depicts a schematic drawing of a system, comprising the above-mentioned device for processing homomorphically encrypted data, according to various embodiments of the present invention.

FIG. 2 depicts a schematic drawing of a system 200 according to various embodiments of the present invention. The system 200 comprises: a memory 204; a device 100 for processing homomorphically encrypted data as described herein according to various embodiments; and at least one processor 208 communicatively coupled to the memory 204 and configured to: send, from the memory 204, a plurality of parallel input data points derived from homomorphically encrypted data to the device 100 for processing by the device 100; and receive, at the memory 204, a plurality of parallel output data points produced by the device 100 from processing the plurality of parallel input data points.

Figure 3:
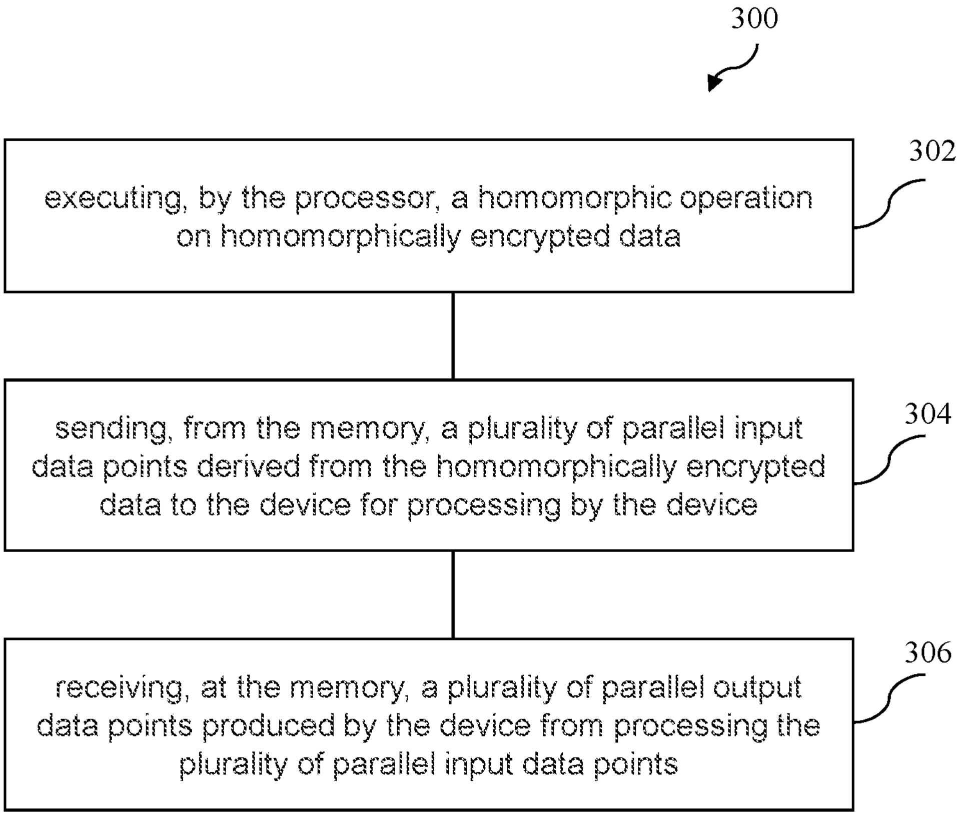
FIG. 3 depicts a schematic flow diagram of a method of operating the above-mentioned system according to various embodiments of the present invention.

FIG. 3 depicts a schematic flow diagram of a method 300 of operating the system 200 according to various embodiments of the present invention. The method 300 comprises: executing (at 302), by the processor 208, a homomorphic operation on homomorphically encrypted data; sending (at 304), from the memory 204, a plurality of parallel input data points derived from the homomorphically encrypted data to the device 100 for processing by the device 100; and receiving (at 306), at the memory 204, a plurality of parallel output data points produced by the device 100 from processing the plurality of parallel input data points.

Figure 4:
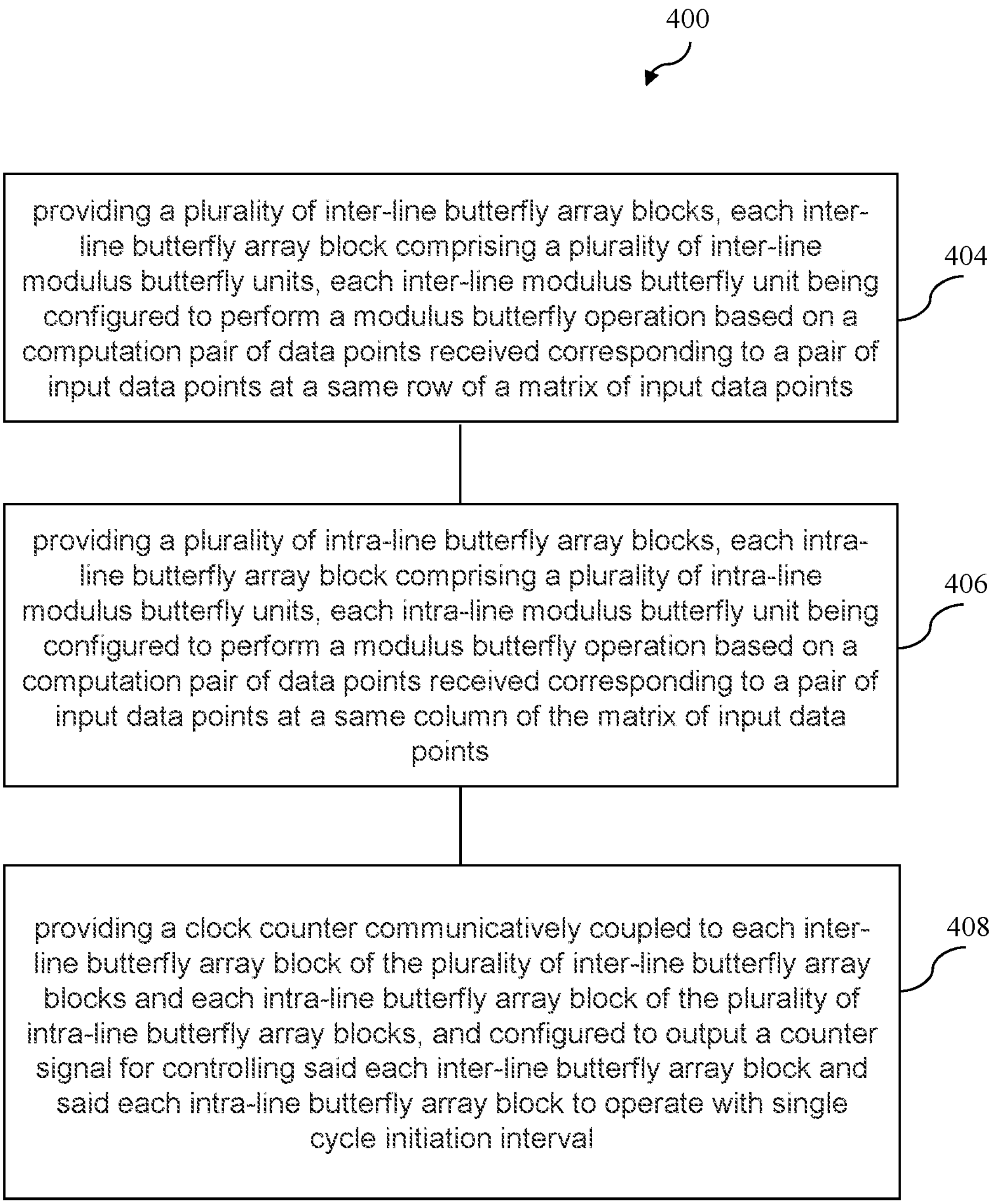
FIG. 4 depicts a schematic flow diagram of a method of forming the above-mentioned device for processing homomorphically encrypted data, according to various embodiments of the present invention.

FIG. 4 depicts a schematic flow diagram of a method 400 of forming the device 100 for processing homomorphically encrypted data, according to various embodiments of the present invention. The method 400 comprising: providing (at 404, e.g., forming or configuring) a plurality of inter-line butterfly array blocks 108-1, . . . , **108-*n*, each inter-line butterfly array block comprising a plurality of inter-line modulus butterfly units, each inter-line modulus butterfly unit being configured to perform a modulus butterfly operation based on a computation pair of data points received corresponding to a pair of input data points at a same row of a matrix of input data points; providing (at 406, e.g., forming or configuring) a plurality of intra-line butterfly array blocks 112-1, . . . , 112-*n*, each intra-line butterfly array block comprising a plurality of intra-line modulus butterfly units, each intra-line modulus butterfly unit being configured to perform a modulus butterfly operation based on a computation pair of data points received corresponding to a pair of input data points at a same column of the matrix of input data points; and providing (at 408) a clock counter 120 communicatively coupled to each inter-line butterfly array block of the plurality of inter-line butterfly array blocks 108-1**, . . . ,

108-*n* and each intra-line butterfly array block of the plurality of intra-line butterfly array blocks 112-1, . . . , 112-*n*, and configured to output a counter signal for controlling the above-mentioned each inter-line butterfly array block and the above-mentioned each intra-line butterfly array block to operate with single cycle initiation interval. In particular, the matrix of input data points comprises a plurality of columns of input data points, wherein a plurality of parallel input data points derived from the homomorphically encrypted data are arranged into the plurality of columns of input data points. Furthermore, the plurality of inter-line butterfly array blocks 108-1, . . . , 108-*n* and the plurality of intra-line butterfly array blocks 112-1, . . . , 112-*n* are arranged in series to form a pipeline for processing the matrix of input data points.

In various embodiments, the method 400 is for forming the device 100 as described hereinbefore with reference to FIG. 1, therefore, various steps of the method 400 may correspond to forming, providing or configuring various components or elements of the device 100 as described herein according to various embodiments, and thus such corresponding steps need not be repeated with respect to the method 400 for clarity and conciseness. In other words, various embodiments described herein in context of the device 100 are analogously valid for the method 400 (e.g., for forming the device 100 having various components and configurations as described herein according to various embodiments), and vice versa.

In various embodiments, the device 100 is formed as an FPGA device (integrated circuit) by configuring the FPGA device as described herein with respect to the device 100 according to various example embodiments. In various embodiments, the device 100 is formed as an ASIC device (integrated circuit) by configuring the ASIC device as described herein with respect to the device 100 according to various example embodiments. In various embodiments, the system 200 may also be embodied as a device or an apparatus.

A computing system, a controller, a microcontroller or any other system providing a processing capability may be presented according to various embodiments in the present disclosure. Such a system may be taken to include one or more processors and one or more computer-readable storage mediums. For example, the system 200 described hereinbefore may include a processor (or controller) 208 and a computer-readable storage medium (or memory) 204 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry. Thus, in various embodiments, a "circuit" may be a hard-wired logic circuit or a programmable logic circuit such as a programmable processor, e.g., a microprocessor (e.g. a Complex Instruction Set Computer (CISC) processor or a Reduced Instruction Set Computer (RISC) processor), a ASIC or a FPGA.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "sending", "receiving", "controlling", "executing" or the like, refer to the actions and processes of a computer system, or similar electronic device, that manipulates and transforms data represented as physical quantities within the computer system into other data similarly represented as physical quantities within the computer system or other information storage or transmission devices.

The present specification also discloses a system (e.g., which may also be embodied as a device or an apparatus), such as the system 200, for performing the operations/functions of various methods described herein. Such a system or apparatus may be specially constructed for the required purposes, or may comprise a general purpose computer or other device selectively activated or reconfigured by a computer program stored in the computer. The algorithms presented herein are not inherently related to any particular computer or other apparatus. Various general purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that individual steps of various methods (e.g., the method 300 of operating the system 200) described herein may be put into effect by computer code. The computer program is not intended to be limited to any particular programming language and implementation thereof. It will be appreciated that a variety of programming languages and coding thereof may be used to implement the methods/techniques of the disclosure contained herein. Moreover, the computer program is not intended to be limited to any particular control flow. There are many other variants of the computer program, which can use different control flows without departing from the scope of the present invention. It will be appreciated to a person skilled in the art that various modules may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

In addition, the present specification also at least implicitly discloses a computer program or software/functional module, in that it would be apparent to the person skilled in the art that individual steps of various methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the invention.

Furthermore, one or more of the steps of the computer program/module or method may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements steps of various methods described herein.

In various embodiments, there is provided a computer program product, embodied in one or more computer-readable storage mediums (non-transitory computer-readable storage medium), comprising instructions executable by one or more computer processors (e.g., the processor 208) to perform a method 300 of operating the system 200 as described hereinbefore with reference to FIG. 3. Accordingly, various computer programs or modules described herein may be stored in a computer program product receivable by a system therein for execution by at least one processor of the system to perform the respective functions.

Various software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist.

Figure 5:
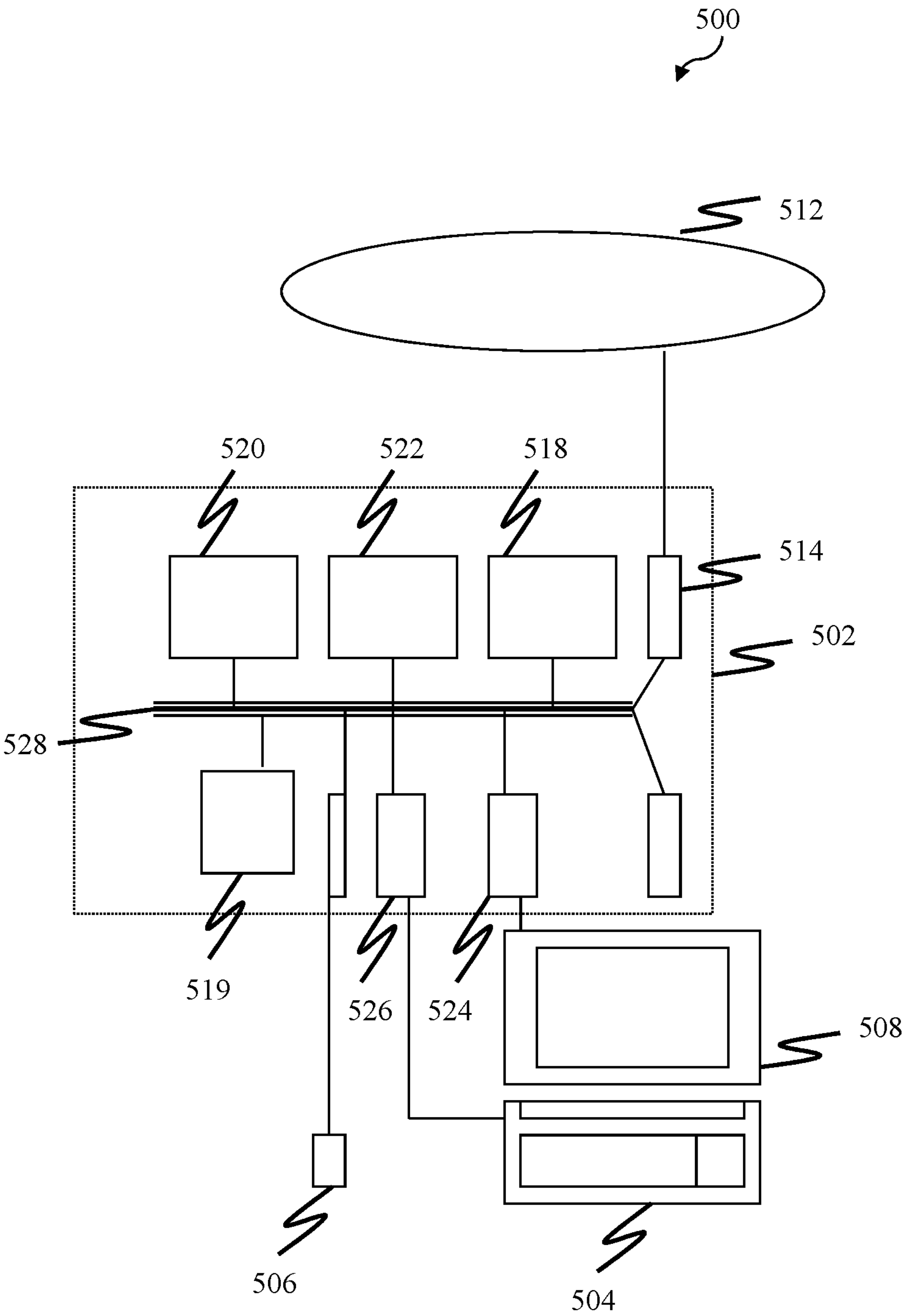
FIG. 5 depicts a schematic block diagram of an exemplary computer system in which the above-mentioned system shown in FIG. 2, according to various embodiments of the present invention, may be realized or implemented.

In various embodiments, the system 200 may be realized by or embodied as any computer system (e.g., desktop or portable computer system) including at least one processor and a memory, such as a computer system 500 as schematically shown in FIG. 5 as an example only and without limitation. Various methods/steps or functional modules may be implemented as software, such as a computer program being executed within the computer system 500, and instructing the computer system 500 (in particular, one or more processors therein) to conduct various functions or operations. The computer system 500 may comprise a computer module 502, input modules, such as a keyboard and/or touchscreen 504 and a mouse 506, and a plurality of output devices such as a display 508. The computer module 502 may be connected to a computer network 512 via a suitable transceiver device 514, to enable access to, e.g., the Internet or other network systems such as Local Area Network (LAN) or Wide Area Network (WAN). The computer module 502 in the example may include a processor 518 (e.g., corresponding to processor 208 of the system 200 as described herein according to various embodiments) for executing various instructions, a Random Access Memory (RAM) 520 and a Read Only Memory (ROM) 522. The computer module 502 may also include a number of Input/Output (I/O) interfaces, for example I/O interface 524 to the display 508, and I/O interface 526 to the keyboard and/or touchscreen 504. The components of the computer module 502 typically communicate via an interconnected bus 528 and in a manner known to the person skilled in the relevant art.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first", "second" and so forth does not limit the quantity or order of such elements or features, unless stated or the context requires otherwise. For example, such designations may be used herein as a convenient way of distinguishing between two or more elements or instances of an element. Thus, unless stated or the context requires otherwise, a reference to first and second elements does not necessarily mean that only two elements can be employed, or that the first element must precede the second element. In addition, a phrase referring to "at least one of" a list of items refers to any single item therein or any combination of two or more items therein.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Various example embodiments provide a single cycle initiation interval (II) pipeline architecture of iDGT and DGT, which is implemented in hardware, such as FPGA. It will be understood by a person skilled in the art that the hardware implementation of the single cycle initiation interval pipeline architecture of iDGT and DGT disclosed according to various example embodiments is not limited to FPGA, and may be implemented as other types of integrated circuits in the field of very large-scale integration (VLSI) as desired or as appropriate, such as but not limited to, ASIC. Various example embodiments find that such a customized hardware design (single cycle initiation interval pipeline architecture) can achieve a lower latency of homomorphic operation (e.g., homomorphic multiplication) on homomorphically encrypted data according to simulations on, for example, FPGA, even at low frequencies such as 200 MHz. As known by a person skilled in the art, the initiation interval is the number of cycle(s) that must elapse between issuing two operations of a given type, or in other words, the number of cycle(s) between new data inputs to an operation or a function. Therefore, a single cycle of initiation interval means that a function or an operation can accept data in the next cycle without further delay. As an example, Table 1 below shows a performance comparison amongst an example FPGA implementation according to various example embodiments of the present invention, a conventional CPU implementation and a conventional GPU implementation of DGT and iDGT for $n=2^{16}$ (where n denotes the number of parallel input data points) with respect to the respective latency achieved in performing homomorphic multiplication:

TABLE 1

| | Hardware (FPGA) | GPU (*) | CPU (**) |
|---|---|---|---|
| DGT | 7.195 us @200 MHz (simulation) | 17.04 us (Average) | 26.9 ms (Average) |
| iDGT | 5.77 us @200 MHz (simulation) | 17.819 us (Average) | 27.1 ms (Average) |

(*) CPU: Intel(R) Xeon(R) Platinum 8170 CPU @ 2.10 GHz; Physical Memory: 188 GB, GPU: NVIDIA V100

(**) CPU: Intel(R) Xeon(R) E5-2660 @2.20 GHz, memory 128 GB using Chrono timer in C code.

For example, it may be necessary for DGT and iDGT to handle both big data movement and extensive modular arithmetic operations. In this regard, the conventional GPU implementation has improved performances over the conventional CPU implementation by using more parallel FP cores on die compared with the conventional CPU implementation. Moreover, the conventional GPU implementation is embedded with high-speed low latency local memory in order to reduce the latency of data transfer. However, the conventional GPU implementation is known for their limited local memory size which is not expandable.

In contrast, various example embodiments provide a single cycle initiation interval pipeline hardware architecture of DGT and iDGT capable of handling FHE data transfer without unnecessary bubbles in pipeline to achieve lower latency. For example, the pipeline can be tailed with variable parallel modulus multiplication units to match the data throughput and latency. Furthermore, multiple pipelines of DGT and iDGT are able to operate in parallel to increase performance of homomorphic operation (e.g., homomorphic multiplication). Various example embodiments find that the single cycle initiation interval pipeline hardware architecture is advantageously cycle accurate and can be scaled without the latency penalty which the conventional GPU implementation suffers from.

Figure 6:
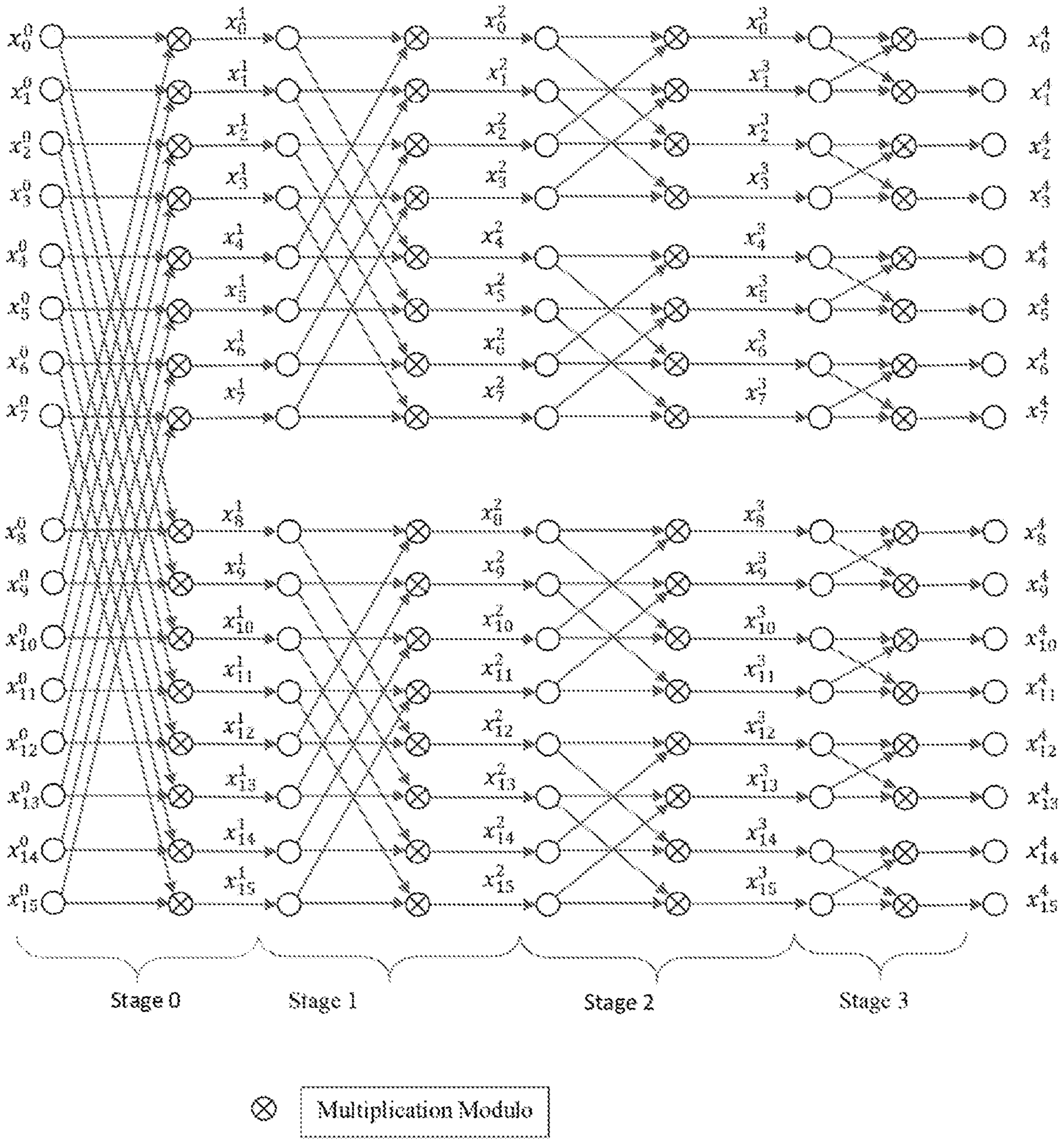
FIG. 6 depicts a schematic diagram showing the DGT flow chart (data flow) of $2^4$ data points of complex data, according to various embodiments of the present invention.

As an example overview, FIG. 6 depicts a schematic diagram showing the DGT flow chart (data flow) of $2^4$ data points of complex data after weight modulus multiplication. $x_i^s$ denotes complex data according to various example embodiments of the present invention, whereby i denotes the index of data point and $i \in [0, 2^4-1]$, and s denotes the stage number of the data flow associated with the DGT and $s \in [0, 4]$.

As shown in FIG. 6, at stage 0, a plurality of parallel data points ($x_0^0$ to $x_{15}^0$) are inputted. At stage 1, each computation pair of $x_j^0$ and $x_{j+8}^0$ while $j \in [0, 2^3-1]$ is computed with twiddle factor t(j) and multiplication modulo $p_i$ ($p_i$ denotes the prime number in RNS) and produces results (or outputs) of $x_j^1$ and $x_{j+8}^1$ according to Equation (1) below:

$$x_{k*8+j}^0 \otimes x_{k*8+j+8}^0 \overset{t(j)}{=} (x_j^1, x_{j+8}^1),\quad \text{while } j \in [0, 2^3-1], k = 0. \qquad \text{(Equation 1)}$$

At stage 2, computations are performed according to Equation (2) below:

$$x_{k*4+j}^1 \otimes x_{k*4+j+4}^1 \overset{t(j)}{=} (x_j^2, x_{j+4}^2),\quad \text{while } j \in [0, 2^2-1], k \in [0, 1]. \qquad \text{(Equation 2)}$$

At the stage 3, computations are performed according to Equation (3) below:

$$x_{k*2+j}^2 \otimes x_{k*2+j+2}^2 \overset{t(j)}{=} (x_j^3, x_{j+2}^3)\quad \text{while } j \in [0, 1], k \in [0, 2^2-1]. \qquad \text{(Equation 3)}$$

At the stage 4, computations are performed according to Equation (4) below:

$$x_{k+j}^3 \otimes x_{k+j+1}^3 \overset{t(j)}{=} (x_j^4, x_{j+1}^4)\quad \text{while } j = 0 \text{ and } k \in [0, 2^3-1]. \qquad \text{(Equation 4)}$$

In relation to the DGT data flow, various example embodiments made the following observations. As a first observation (observation 1), each computation pair (or calculation pairs) of data points at stage 1 is between a data point in the first half of parallel data points and a data point in the second half of the parallel data points with a distance of $2^3$ to the data point in the first half. In this example, $2^3$ is the half data length.

As a second observation (observation 2), each computation pair of data points at stage 2 is always either within the first half or within the second half of parallel data points, whereby each computation pair of data points within the first half or the second half is computed in the manner as described in the above-mentioned observation 1 but with half of the distance (i.e., $2^2$) between computation pairs compared to the immediately previous stage (i.e., stage 1).

As a third observation (observation 3), each computation pair at the next stage (e.g., stage 3) is always either within the first half or within the second half of parallel data points, whereby each computation pair of data points within the first half or the second half is computed in the manner as described in the above-mentioned observation 1 but with half of the distance between computation pairs compared to the immediately previous stage (e.g., stage 2).

Figure 7A:
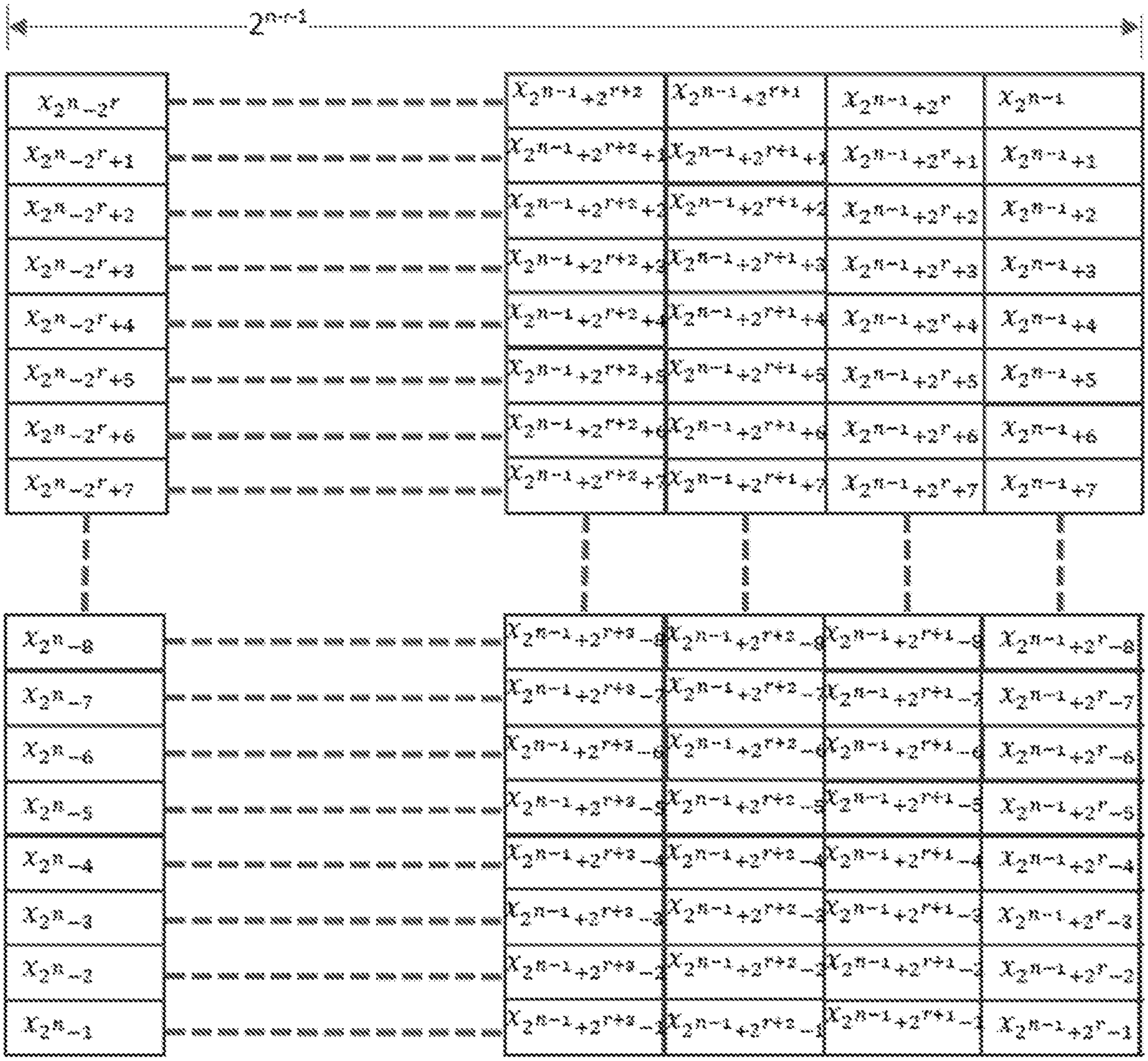
FIGS. 7A and 7B depict schematic representations of the left portion (left half) and the right portion (right half) of a matrix of input data points, respectively, according to various embodiments of the present invention.
Figure 7B:
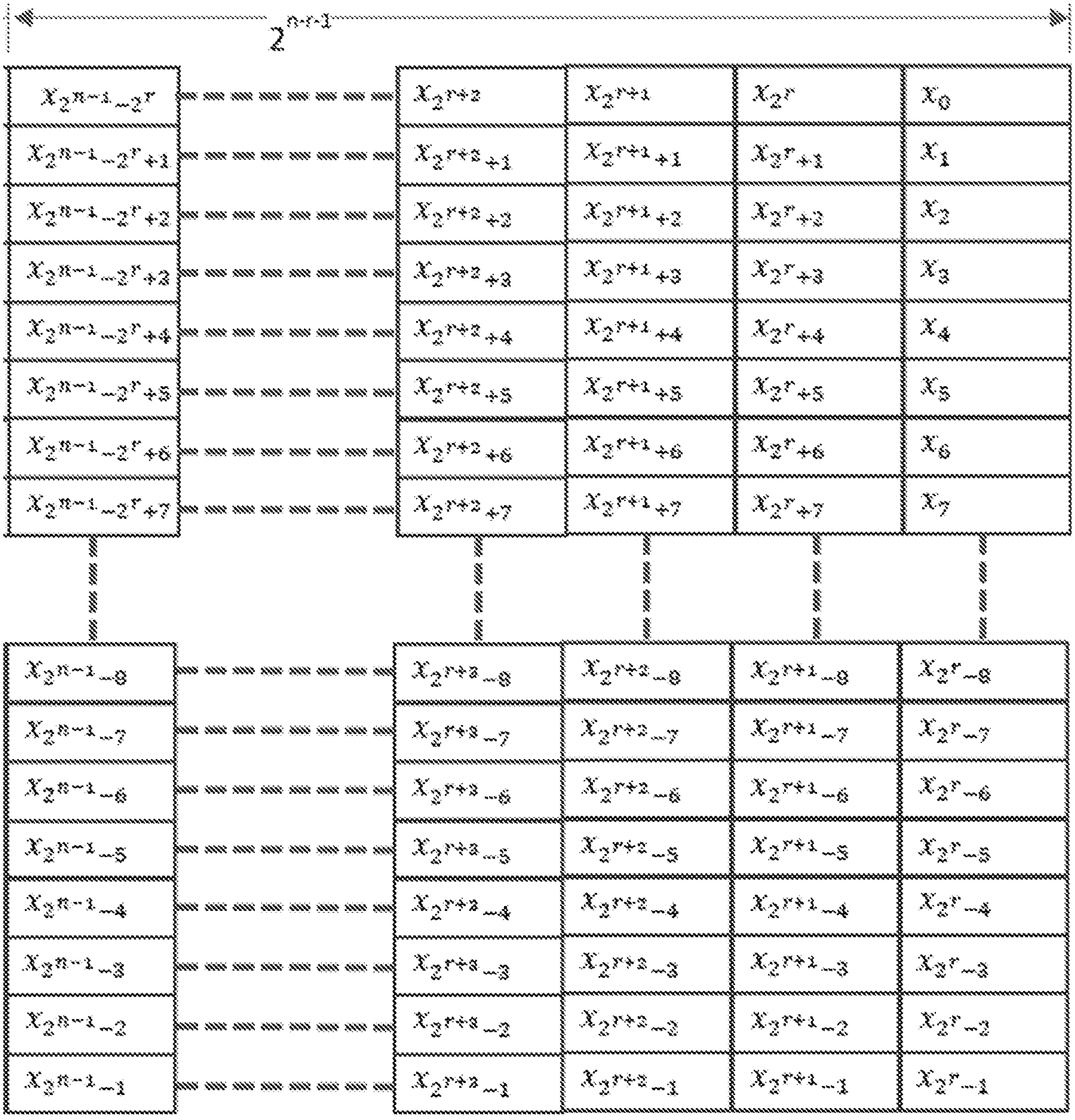

For performing DGT on a plurality of parallel data points with data size of $2^n$, n stages of hardware may be designed in a pipeline to process the plurality of parallel data points. However, various example embodiments note that it may not be feasible to parallelize $2^n$ of data points to perform various homomorphic operations, and in particular, multiplication modulo, when n is too large. For example, hardware architecture is restricted by resources and throughput. To address this problem, various example embodiments parallelize $2^r$ ($r<n$) data points, and more specifically, a plurality (e.g., $2^n$) of parallel data points are arranged into a plurality (e.g., $2^{n-r}$) of columns of data points (parallel data points) to form a matrix of input data points to be processed as illustrated in FIGS. 7A and 7B. In particular, FIGS. 7A and 7B depict schematic representations of the left portion (left half) and the right portion (right half) of the matrix of input data points, respectively.

Various example embodiments found that at the last r stages of DGT, each computation pair of data points is within the same column of data points. In this regard, various example embodiments provide r stages of intra-line (which may also be referred to as intra-column) butterfly array blocks (which may also be referred to as intra-line multiplication modulo array blocks or modules) configured or designed to solve or perform the corresponding computations (or calculations), whereby each stage (or each intra-line butterfly array block) has $2^{r-1}$ parallel intra-line modulus butterfly units (which may also be referred to as multiplication modulo units). In contrast, from stages 0 to n−r−1 of DGT, various example embodiments found that the gap of each computation pair of data points across two columns of data points is $2^{n-r-1-s}$ at stage s, s∈[0, n−r−1]. In this regard, various example embodiments further found that each computation pair of data points across two columns should be at the same row as the gap of each computation pair of data points must be $2^{n-1-s}$ at stage s, otherwise the gap is not equal to $2^{n-1-s}$ at stage s. Accordingly, various example embodiments found that each computation pair is either within a same column of data points or within a same row of data points. Accordingly, these findings advantageously establish that a plurality of columns of input data points can be input sequentially one column by one column (i.e., column by column) and processed in such a way that all computation pairs at the same row are computed or calculated in the same butterfly unit, which facilitates or enables the development of the single cycle initiation interval pipeline hardware architecture of DGT (and similarly for the single cycle initiation interval pipeline hardware architecture of iDGT) as described herein according to various example embodiments of the present invention, which will be described in further detail below.

Figure 8:
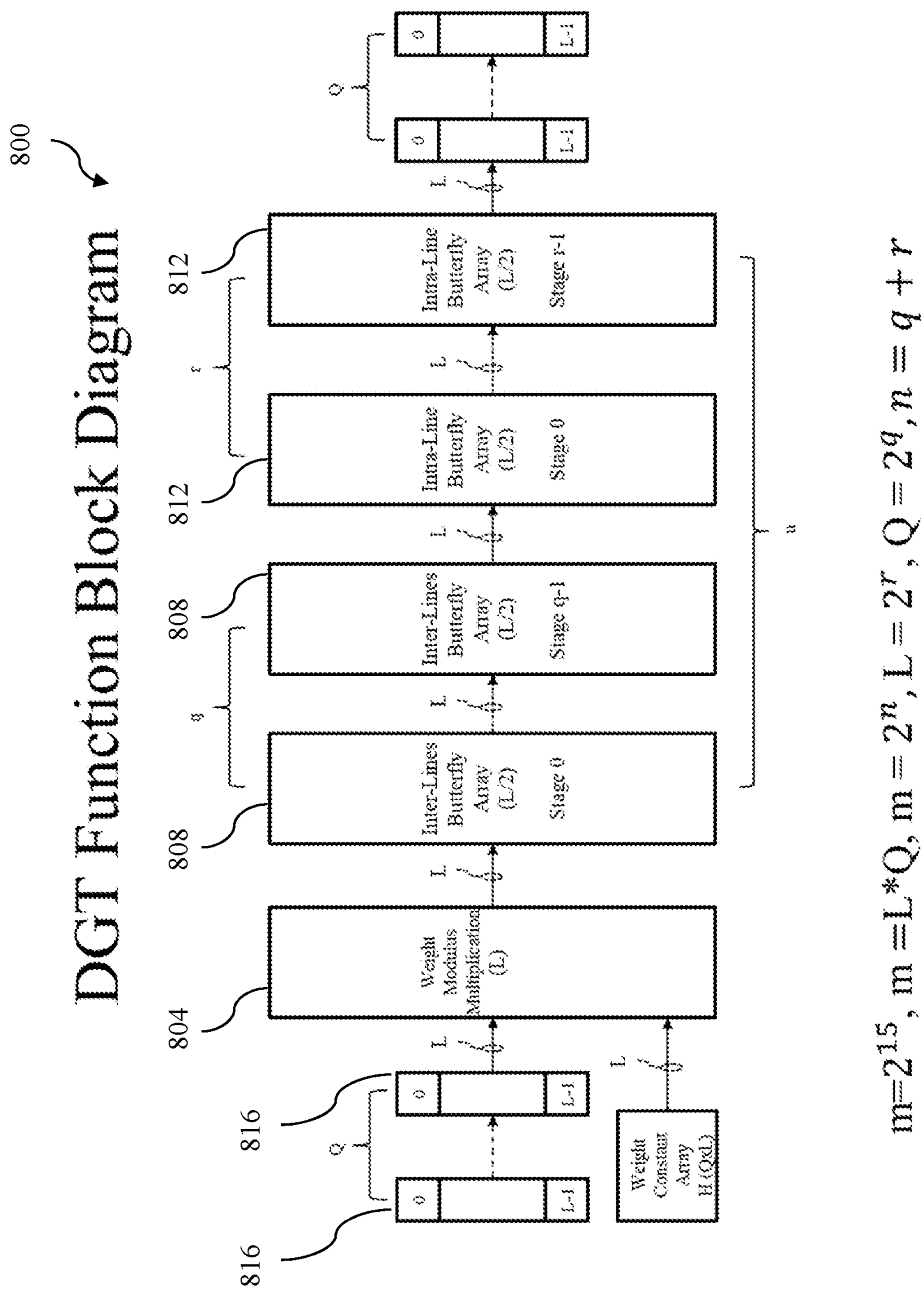
FIG. 8 depicts a schematic block diagram of a DGT circuit according to various example embodiments of the present invention.

FIG. 8 depicts a schematic block diagram of a DGT circuit 800 according to various example embodiments of the present invention (e.g., corresponding to the device 100 for processing homomorphically encrypted data as described hereinbefore according to various embodiments in the case of the device 100 being configured to perform DGT). The DGT circuit 800 comprises a weight modulus multiplication block (or weight modulus multiplication module or circuit) 804, a plurality (e.g., q (equal n−r) stages) of inter-line (which may also be referred to as inter-column) butterfly array blocks 808 (or inter-line butterfly array (which may also be referred to as inter-line multiplication modulo array) modules or circuits), and a plurality (e.g., r stages) of intra-line (which may also be referred to as intra-column) butterfly array blocks 812 (or intra-line butterfly array (which may also be referred to as intra-line multiplication modulo array) modules or circuits). The weight modulus multiplication block 804 comprises a plurality of weight modulus multiplication units (e.g., L×complex weight modulus multiplication units).

According to various example embodiments, as input data points are fed in one column by one column 816, each of the plurality of inter-line butterfly array blocks 808 comprises four FIFO input buffers for achieving single cycle initiation interval pipeline with a consistent throughput. As the plurality of inter-line butterfly array blocks 808 are arranged and communicatively coupled in series, two adjacent inter-line butterfly array blocks may share one or more common FIFO buffers, that is, one or more FIFO input buffers of an immediately subsequent inter-line butterfly block with respect to an inter-line butterfly block may also function or serve as one or more FIFO output buffers of the inter-line butterfly block. For example, the total data throughput of the single cycle initiation interval pipeline may be expressed as:

$$\text{Total data throughput (MB/s)} = \text{Clock speed (MHz)} \times \text{Data points} \times \text{bytes per data point (Byte)} \quad \text{(Equation 5)}$$

Figure 9:
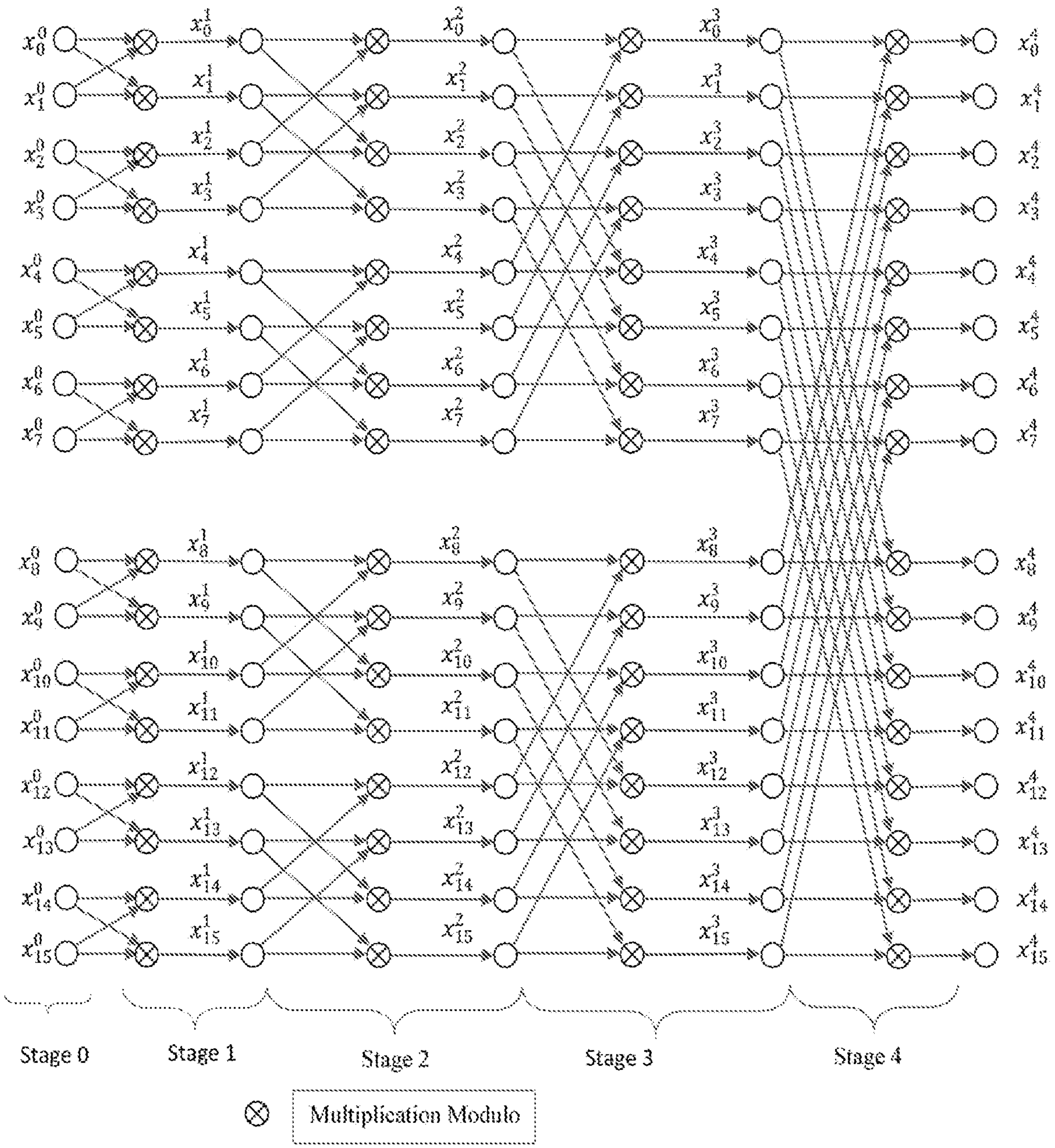
FIG. 9 depicts a schematic diagram showing the iDGT flow chart (data flow) of $2^4$ data points of complex data, according to various embodiments of the present invention.

As an example overview, FIG. 9 depicts a schematic diagram showing the iDGT flow chart (data flow) of $2^4$ data points of complex data, according to various example embodiments of the present invention. Similar to the above-mentioned DGT flow chart, $x_i^s$ denotes complex data, while i denotes the index of data point and i∈[0, $2^4$−1], and s is the stage number associated with the iDGT and s∈[0, 4].

As shown in FIG. 9 and as will be understood by a person skilled in the art, the operation (or data flow) of iDGT is the reverse of that of DGT as described hereinbefore with reference to FIG. 6, and thus, the data flow of the iDGT as shown in FIG. 9 need not be described in detail for clarity and conciseness.

Similar to the DGT as described hereinbefore, for the iDGT according to various example embodiments, a plurality (e.g., $2^n$) of parallel data points are arranged into a plurality (e.g., $2^{n-r}$) columns of data points (parallel data points) (forming or constituting a matrix of data points) to be processed. Furthermore, corresponding to the DGT as described hereinbefore, for the first r stages of iDGT, each computation pair of data points are within the same column of data points. In this regard, various example embodiments provide a plurality (e.g., r stages) of intra-line butterfly array blocks (which may also be referred to as intra-line multiplication modulo array modules or circuits) configured or designed to solve or perform the corresponding computations (or calculations), whereby each stage has $2^{r-1}$ parallel intra-line modulus butterfly units (which may also be referred to as multiplication modulo units). In contrast, from the subsequent q stages, various example embodiments found that the gap of computation pairs of data points across two columns of data points is $2^{r+s}$ at stage s, s∈[0, n−r−1]. In this regard, various example embodiments further found that the computation pairs of data points across two columns should be at the same row as the gap of computation pairs of data points must be $2^{r+s}$ at stage s, otherwise the gap is not equal to $2^{r+s}$ at stage s. Accordingly, various example embodiments found that the computation pairs are either within the same column of data points or within the same row of data points. Accordingly, similar to the DGT as described hereinbefore, these findings advantageously establish that a plurality of parallel input data points can be input sequentially one column by one column (i.e., column by column) and processed in such a way that all computation pairs at the same row are computed or calculated in the same butterfly unit, which facilitates or enables the development of the single cycle initiation interval pipeline hardware architectures of iDGT as described herein according to various example embodiments of the present invention, which will be described in further detail below.

Figure 10:
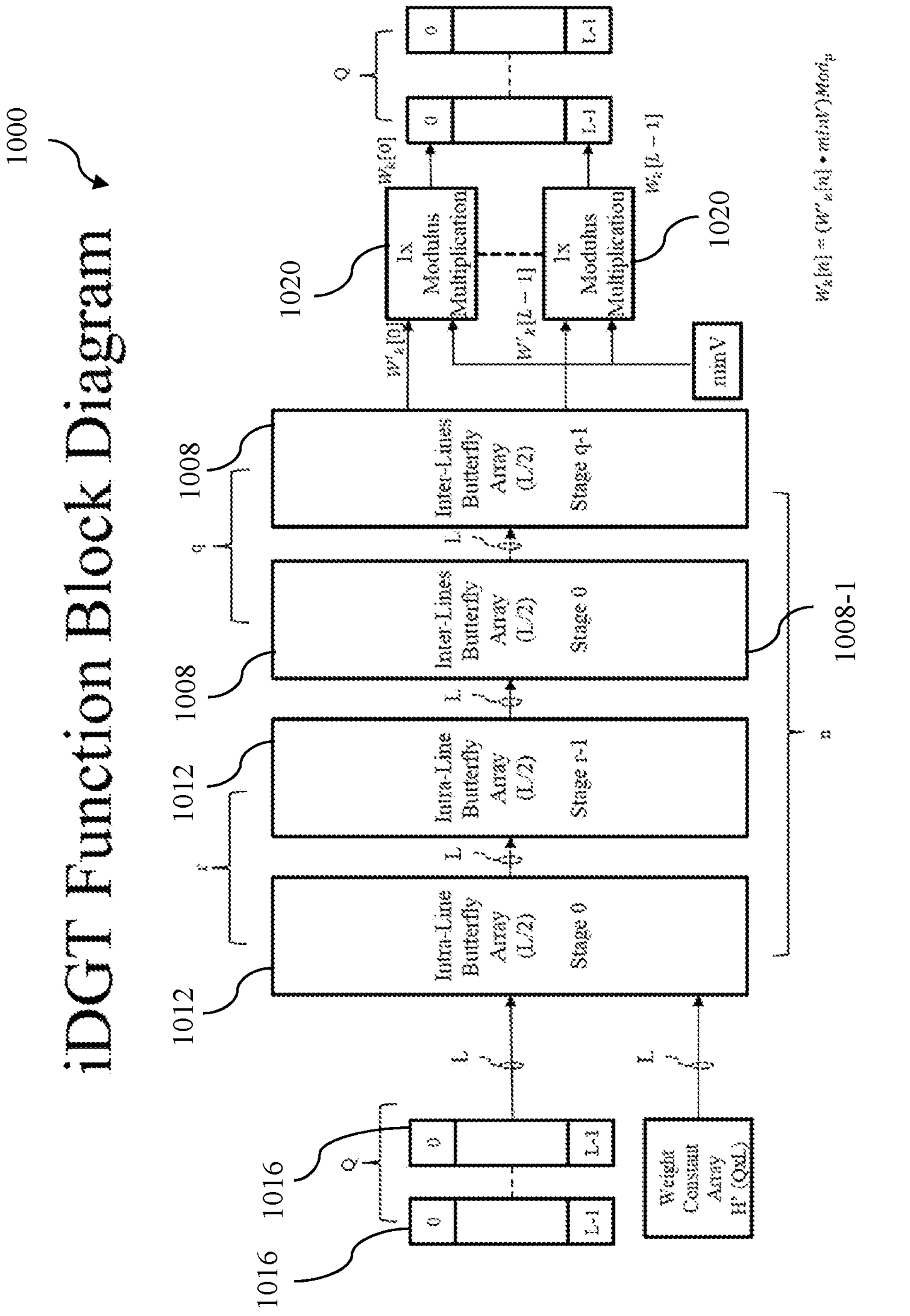
FIG. 10 depicts a schematic block diagram of a iDGT circuit according to various example embodiments of the present invention.

FIG. 10 depicts a schematic block diagram of a iDGT circuit 1000 according to various example embodiments of the present invention (e.g., corresponding to the device 100 for processing homomorphically encrypted data as described hereinbefore according to various embodiments in the case of the device 100 being configured to perform iDGT). The iDGT circuit 1000 comprises a plurality (e.g., r stages) of intra-line (which may also be referred to as intra-column) butterfly array blocks 1012 (or intra-line butterfly array (which may also be referred to as intra-line multiplication modulo array) modules or circuits), and a plurality (e.g., q (equal n−r) stages) of inter-line (which may also be referred to as inter-column) butterfly array blocks 1008 (or inter-line butterfly array (which may also be referred to as inter-line multiplication modulo array) modules or circuits). In addition, the iDGT circuit 1000 comprises a plurality (e.g., L×) of parallel modulus multiplication units (or circuits) 1020.

According to various example embodiments, similar to the DGT circuit 800 described hereinbefore, as input data points are fed in one column by one column 1016, each of the plurality of inter-line butterfly array blocks 1008 comprises four FIFO input buffers for achieving single cycle initiation interval pipeline with a consistent throughput. As the plurality of inter-line butterfly array blocks 1008 are arranged and communicatively coupled in series, two adjacent inter-line butterfly array blocks may share one or more common FIFO buffers, that is, one or more FIFO input buffers of an immediately subsequent inter-line butterfly block with respect to an inter-line butterfly block may also function or serve as one or more FIFO output buffers of the inter-line butterfly block.

Figure 11A:
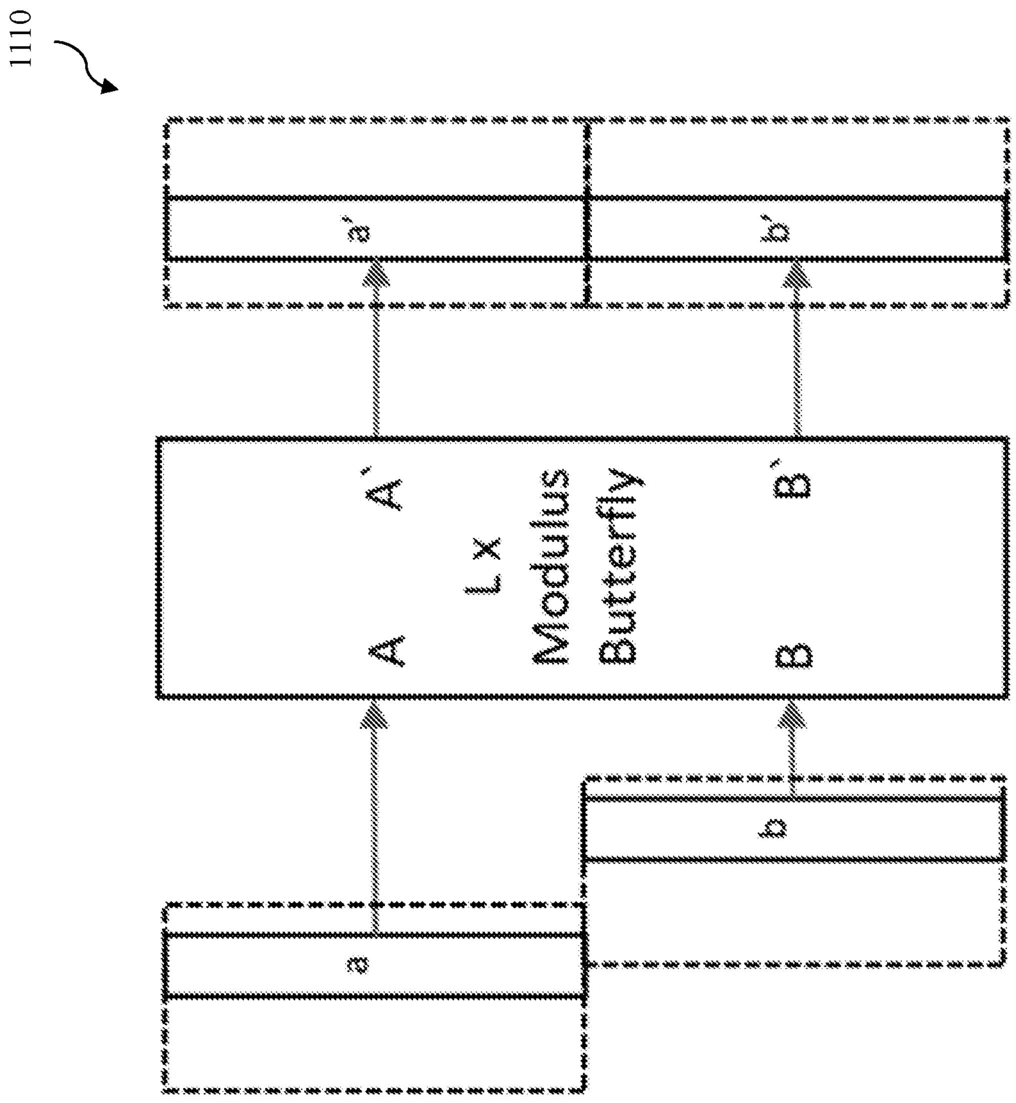
FIG. 11A depicts a schematic block diagram of a two-buffer pipeline for one stage of inter-line butterfly array block for comparison purpose.
Figure 11B:
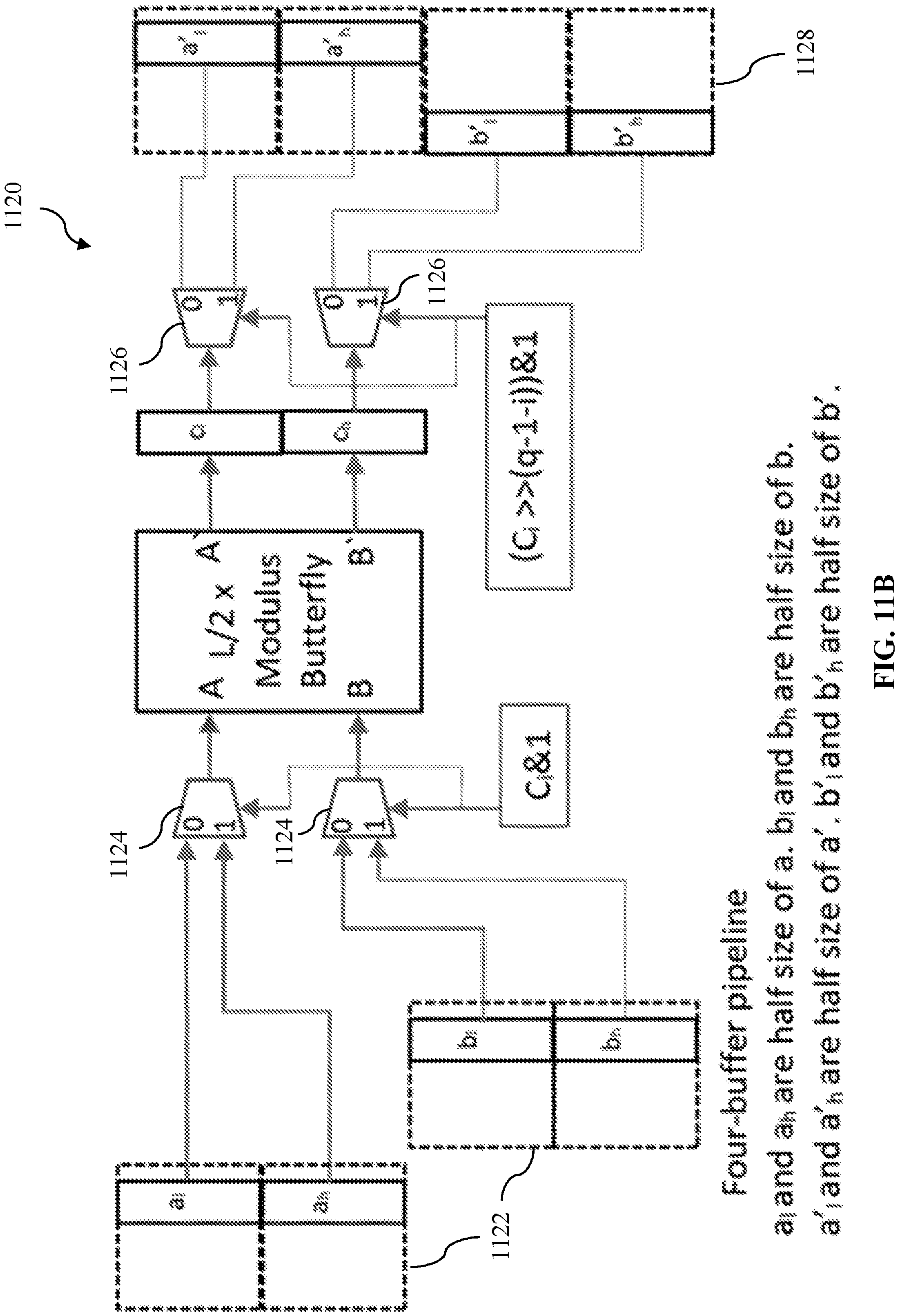
FIG. 11B depicts a schematic block diagram of a four-buffer pipeline for one stage of inter-line butterfly array block according to various example embodiments of the present invention.

In various example embodiments, L points of data are fed in parallel into the pipeline with single cycle of initiation interval through q stages of inter-line butterfly array blocks and r stages of intra-line butterfly array blocks. This achieves a throughput of L×clock. In various example embodiments, to prevent pipeline bubble, all the stages of the DGT circuit 800 are configured to have the same throughput, and similarly, all the stages of the iDGT circuit 1000 are configured to have the same throughput. In this regard, various example embodiments note that, at the q stages of inter-line butterfly array blocks, if a two-buffer pipeline 1110 as shown in FIG. 11A is implemented, the butterfly computations need to be performed between two lines (i.e., two columns) with throughput of 2×L×clock. This results in double expensive butterfly computation resources required. To address this problem, according to various example embodiments and as described hereinbefore, a four-buffer pipeline 1120 (four input buffers 1122 and four output buffers 1128 (which may correspond to four input buffers of the immediately subsequent inter-line butterfly array block as explained hereinbefore)) is provided or implemented as shown in FIG. 11B to split the butterfly computation into two phases so as to maintain consistent throughput and reduce or minimize the butterfly computation resources. In particular, FIG. 11A depicts a schematic block diagram of the above-mentioned two-buffer pipeline 1100 for one stage of inter-line butterfly array block, while FIG. 11B depicts a schematic block diagram of the above-mentioned four-buffer pipeline 1120 for one stage of inter-line butterfly array block. In this regard, the four-buffer pipeline 1120 splits the two buffers in the two-buffer pipeline 1110 into four buffers with the same total memory size and adding four multiplexers 1124, 1126 as shown in FIG. 11B. As explained above, advantageously, the butterfly calculation units are reduced by half. Accordingly, both the IDGT circuit 800 and the iDGT circuit 1000 according to various example embodiments have this advantage.

Figure 12:
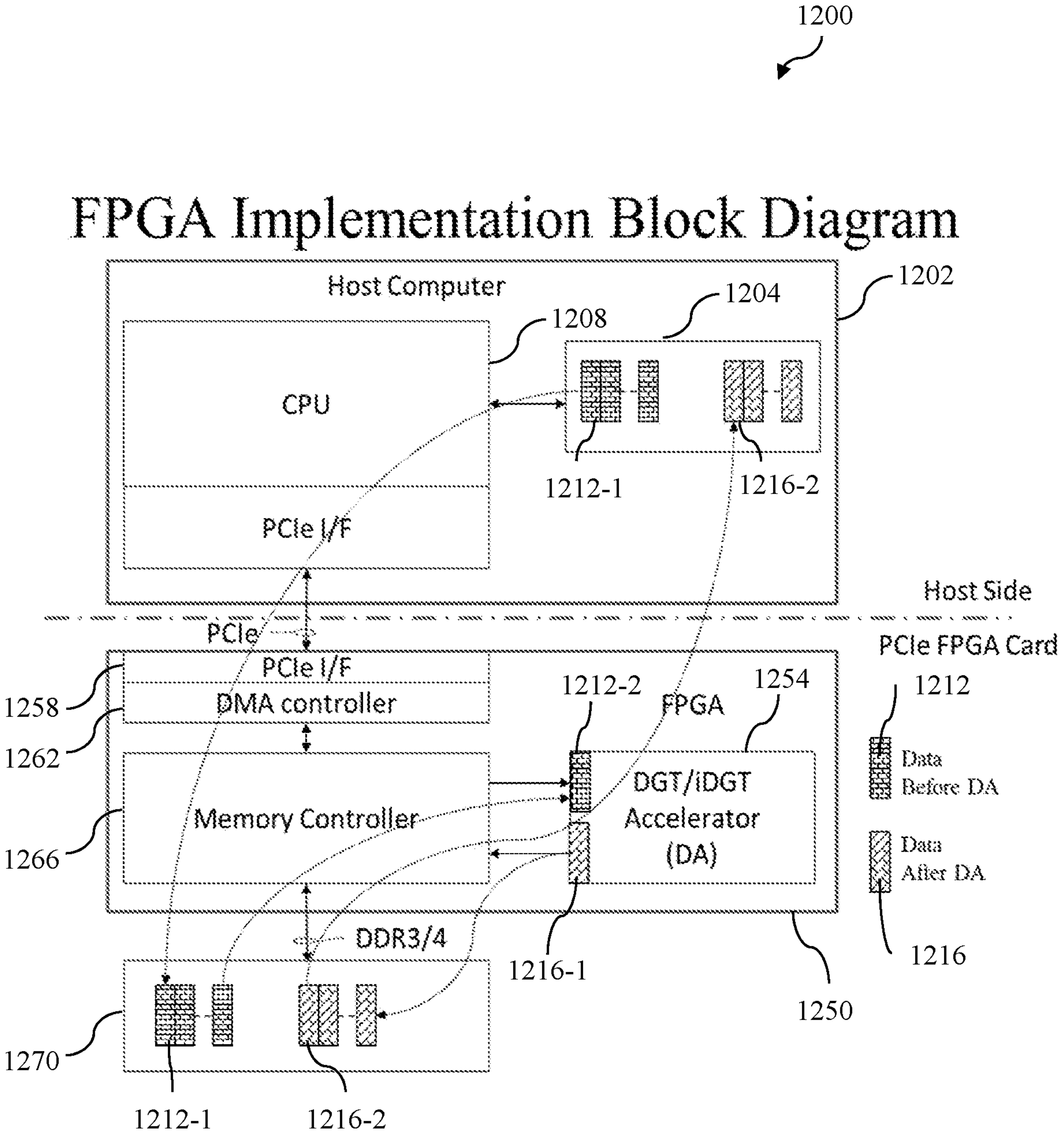
FIG. 12 depicts a schematic block diagram of a system comprising the above-mentioned DGT circuit and/or the above-mentioned iDGT circuit according to various example embodiments of the present invention.

FIG. 12 depicts a schematic block diagram of a system 1200 comprising the DGT circuit 800 and/or the iDGT circuit 1000 according to various example embodiments of the present invention (e.g., corresponding to the system 200 as described hereinbefore according to various embodiments), and more particularly, whereby the DGT circuit 800 and/or the iDGT circuit 1000 (e.g., functioning as a DGT/iDGT accelerator (DA) 1254) is implemented in a FPGA device 1250. The system 1200 comprises a memory 1204, a device (e.g., a FPGA device) 1250 for processing homomorphically encrypted data; and at least one processor 1208 communicatively coupled to the memory 1204 and configured to: send, from the memory 1204, a plurality of parallel input data points 1212 derived from homomorphically encrypted data to the device 1250 for processing by the device 1250 (more specifically, by the DA 1254); and receive, at the memory 1204, a plurality of parallel output data points 1216 produced by the device 1250 (or more specifically, by the DA 1254) from processing the plurality of parallel input data points 1212.

For example, the FPGA device 1250 may be a FPGA card (or FPGA board) comprising (or disposed thereon) at least one global memory chip 1270 and at least one FPGA chip 1254 which implements the processing units of DGT and/or iDGT (the DGT circuit 800 and/or the iDGT circuit 1000). The FPGA device 1250 may further comprise a PCIe bus 1258 with PCI controller logics 1262, a memory controller 1266 for accessing the FPGA global memory 1270. The FPGA device 1250 may be plugged into a host computer 1202. The input data 1212 in host computer memory 1204 may be transferred to the FPGA global memory 1270 in a FIFO order. The input data may then be transferred from the FPGA global memory 1270 to buffers inside the FPGA device 1250 in a consistent flow based on (or via) the memory controller 1266. After being processed by the processing units of the DGT/iDGT accelerator 1254, the output data 1216 may then be flowed into the FPGA global memory 1270 based on (or via) the memory controller 1266. Thereafter, the output data is transferred to the host memory 1204 of the host computer 1202 by the PCIe controller 1262 via the PCIe bus 1258.

In various example embodiments, the memory controller 1266 (e.g., corresponding to the data point arranging block as described hereinbefore according to various embodiments) may be configured to arrange input data 1212-1 (e.g., a plurality of parallel input data points received from the host computer 1202 via the FPGA global memory 1270) into a plurality of columns of data points 1212-2 to form a matrix of input data points to be processed by the DGT/iDGT accelerator 1254, one column by one column, as described hereinbefore with reference to FIGS. 7A and 7B. Conversely, the memory controller 1266 may be configured to arrange output data 1216-1 (e.g., a plurality of columns of output data points (or a matrix of output data points) output by the DGT/iDGT accelerator 1254 into a plurality of parallel output data points 1216-2 prior to being transferred to the FPGA global memory 1270, which is then in turn transferred to the host memory 1204. In various example embodiments, the host memory 1204 may comprise an input data buffer (e.g., storing the input data 1212-1 to be transmitted to the FPGA device 1250) and an output data buffer (e.g., storing the output data 1216-2 received from the FPGA device 1250). Similarly, the FPGA global memory 1270 may comprise an input data buffer (e.g., storing the input data 1212-1 received from the host computer 1202) and an output data buffer (e.g., storing the output data 1216-2 from the DGT/iDGT accelerator 1254 to be transmitted).

For better understanding, example implementations of various stages of the DGT circuit 800 shown in FIG. 8 will now be described in further detail according to various example embodiments of the present invention.

Figure 13:
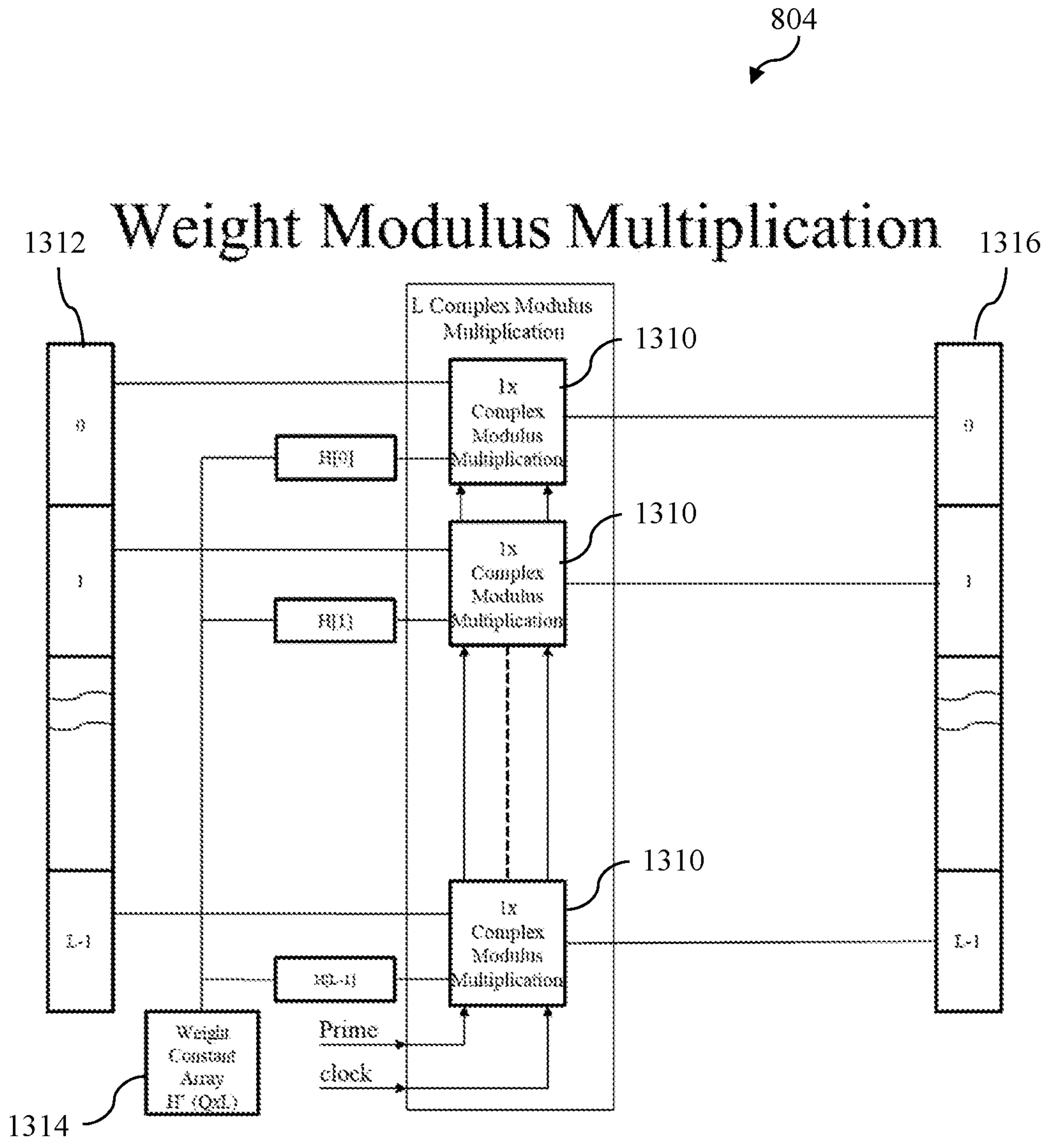
FIG. 13 depicts a schematic block diagram of an example weight modulus multiplication block of the DGT circuit according to various example embodiments of the present invention.

FIG. 13 depicts a schematic block diagram of an example weight modulus multiplication block 804 of the DGT circuit 800 according to various example embodiments of the present invention. The weight modulus multiplication block 804 comprising L×complex modulus multiplication units 1310 configured to multiple each of L parallel input data points of complex integers with a complex value pre-calculated according to each input data point. In the example weight modulus multiplication block 804, components thereof are communicatively coupled (or interconnected) in the manner as shown in FIG. 13 and thus need not be described in detail for conciseness. For example, it can be seen that each complex modulus multiplication unit 1310 is communicatively coupled to an input register 1312 and is configured to receive a corresponding data point from the input register 1310 and a corresponding weight value from a weight constant array block 1314 for performing a modulus multiplication operation (complex modulus multiplication operation) based on the corresponding data point and the corresponding weight value received. Furthermore, each complex modulus multiplication unit 1310 is communicatively coupled to an output register 1316 (which may be an input register of an immediately subsequent stage) and is configured to output a corresponding data point (result of the modulus multiplication operation) to the output register 1316. Accordingly, the input register 1312 and the output register 1316 may each store L×parallel data points (or L×points of complex data) Furthermore, as shown in FIG. 13, each complex modulus multiplication unit 1310 may be configured to receive a clock signal and a prime integer.

Figure 14:
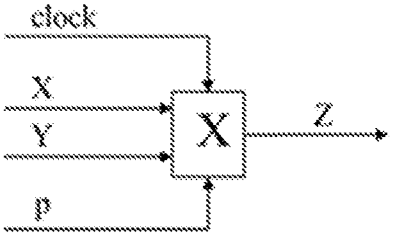
FIG. 14 depicts a schematic block diagram for illustrating and defining the complex modulus multiplication operation, according to various example embodiments of the present invention.

FIG. 14 depicts a schematic block diagram for illustrating and defining the complex modulus multiplication operation, according to various example embodiments of the present invention. In FIG. 14, $X=x_r+ix_i$, $Y=y_r+iy_i$, and $Z=z_r+iz_i$, whereby $x_r$, $x_i$, $y_r$, $y_i$, $z_r$, $z_i$ are integers, p denotes a prime integer, clock denotes a single bit clock, $z_r=(x_r\cdot y_r-x_i\cdot y_i)\%\ p$ and $z_i=(x_r\cdot y_i-x_i\cdot y_r)\%\ p$.

As shown in FIG. 8, the DGT circuit 800 comprises q stages of inter-line butterfly array blocks 808, where $q=\log_2 Q$, and whereby Q denotes the number of L in m according to the equation m=Q×L, whereby m denotes the total number of data points, and L denotes the number of parallel data points. The DGT circuit 800 further comprises r stages of intra-line butterfly array blocks 812, where $r=\log_2 L$. In this regard, L points of data points are fed in parallel into the pipeline with single cycle of initiation interval through q stages of inter-line butterfly array blocks 808 and r stages of intra-line butterfly array blocks 812.

Figure 15:
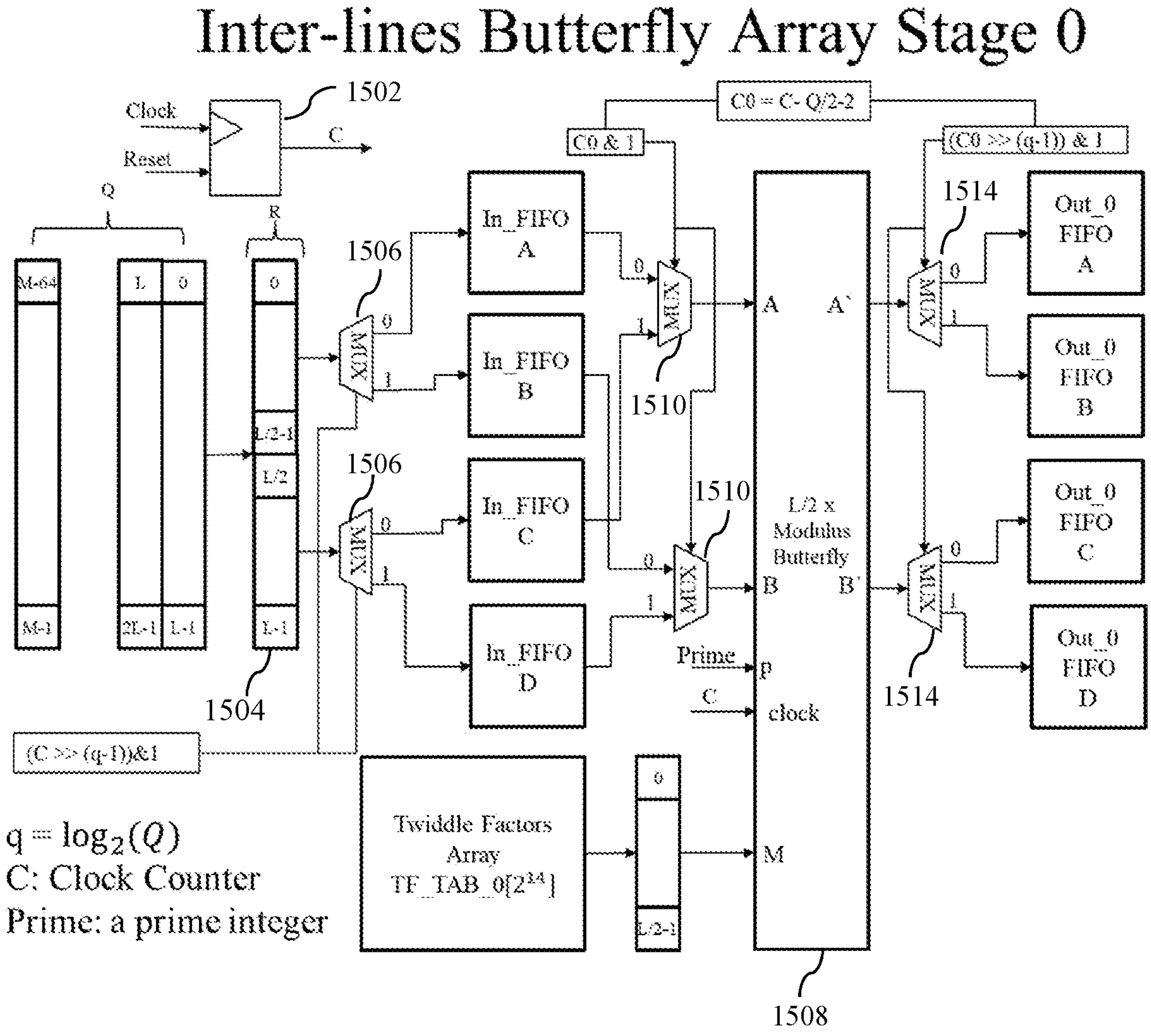
FIG. 15 depicts a schematic block diagram of an example inter-line butterfly array block of the DGT circuit at a first stage of the inter-line butterfly (illustrated as stage 0 in FIG. 8), according to various example embodiments of the present invention.

FIG. 15 depicts a schematic block diagram of an example inter-line butterfly array block 808-0 of the DGT circuit 800 at a first stage of the inter-line butterfly (illustrated as stage 0 in FIG. 8) according to various example embodiments of the present invention. In the example inter-line butterfly array block 808-0, components thereof are communicatively coupled (or interconnected) in the manner as shown in FIG. 15 and thus need not be described in detail for conciseness.

At the inter-line butterfly stage 0 (i.e., inter-line butterfly array block 808-0), L parallel data points may be latched into an input register (R) 1504 (which corresponds to (or common as) the output register 1316 of the weight modulus multiplication block 804. The L parallel data points are then pushed into four input data buffers, namely, In_FIFO A, In_FIFO B, In_FIFO C and In_FIFO D (e.g., corresponding to the first, second, third and fourth FIFO input data buffers, respectively, as described hereinbefore according to various embodiments), via a set of multiplexer units 1506 (corresponding to the third set of multiplexer units of the first inter-line butterfly array block as described hereinbefore according to various embodiments), according to the rule or equation below:

$$
\begin{aligned}
&\text{if } (C>>(q-1)\&1==0)\\
&R[0,L/2-1]\rightarrow \text{In\_FIFO } A\\
&R[L/2,L-1]\rightarrow \text{In\_FIFO } C\\
&\text{else}\\
&R[0,L/2-1]\rightarrow \text{In\_FIFO } B\\
&R[L/2,L-1]\rightarrow \text{In\_FIFO } D
\end{aligned}
\qquad \text{(Equation 6)}
$$

Data points are pulled out from In_FIFO A and In_FIFO B in FIFO order, via a set of multiplexer units 1510 (e.g., corresponding to the first set of multiplexer units of the inter-line butterfly array block as described hereinbefore according to various embodiments), and pushed into L/2 modulus butterfly units 1508 when C0 &1==0 where C0=C-Q/2-2. Data points are pulled out from In_FIFO C and In_FIFO D in FIFO order, via the set of multiplexer units 1510, and are pushed into L/2 modulus butterfly units 1508 when C0 &1==1 where C0=C-Q/2-2. Data points at the upper part of output of the modulus butterfly units 1508 (corresponding to a column of data points denoted by A' produced by the L/2 modulus butterfly units 1508) are pushed into output data buffer Out_0 FIFO A via a first multiplexer unit of a set of multiplexer units 1514 (e.g., corresponding to the second set of multiplexer units of the inter-line butterfly array block as described hereinbefore according to various embodiments), while data points at the lower part of output of modulus butterfly units 1508 (corresponding to a column of data points denoted by B' produced by the L/2 modulus butterfly units 1508) are pushed into output data buffer Out_0 FIFO C via a second multiplexer unit of the set of multiplexer units 1514, when (C0>>(q−1)) & 1==0 where C0=C-Q/2-2, after being processing by the L/2 modulus butterfly units 1508. Data points at the upper part of output modulus butterfly units 1508 (corresponding to a column of data points denoted by A' produced by the L/2 modulus butterfly units 1508) are pushed into output data buffer Out_0 FIFO B via the first multiplexer unit of the set of multiplexer units 1514 while data points at the lower part of output of modulus butterfly units 1508 (corresponding to a column of data points denoted by B' produced by the L/2 modulus butterfly units 1508) are pushed into output data buffer Out_0 FIFO D via the second multiplexer unit of the set of multiplexer units 1514, when (C0>>(q−1)) & 1==1 where C0=C-Q/2-2. The four input data buffers with respect to the inter-line butterfly array block 808-0 (In_FIFO A, In_FIFO B, In_FIFO C and In_FIFO D), each has L/2 number of parallel data points. Similarly, the four output data buffers with respect to the inter-line butterfly array block 808-0 (Out_0 FIFO A, Out_0 FIFO B, Out_0 FIFO C and Out_0 FIFO D), each has L/2 number of parallel data points. With the above-described configuration or setup of the inter-line butterfly stage 0 808-0, the initiation interval at this stage achieves single cycle.

Figure 16:
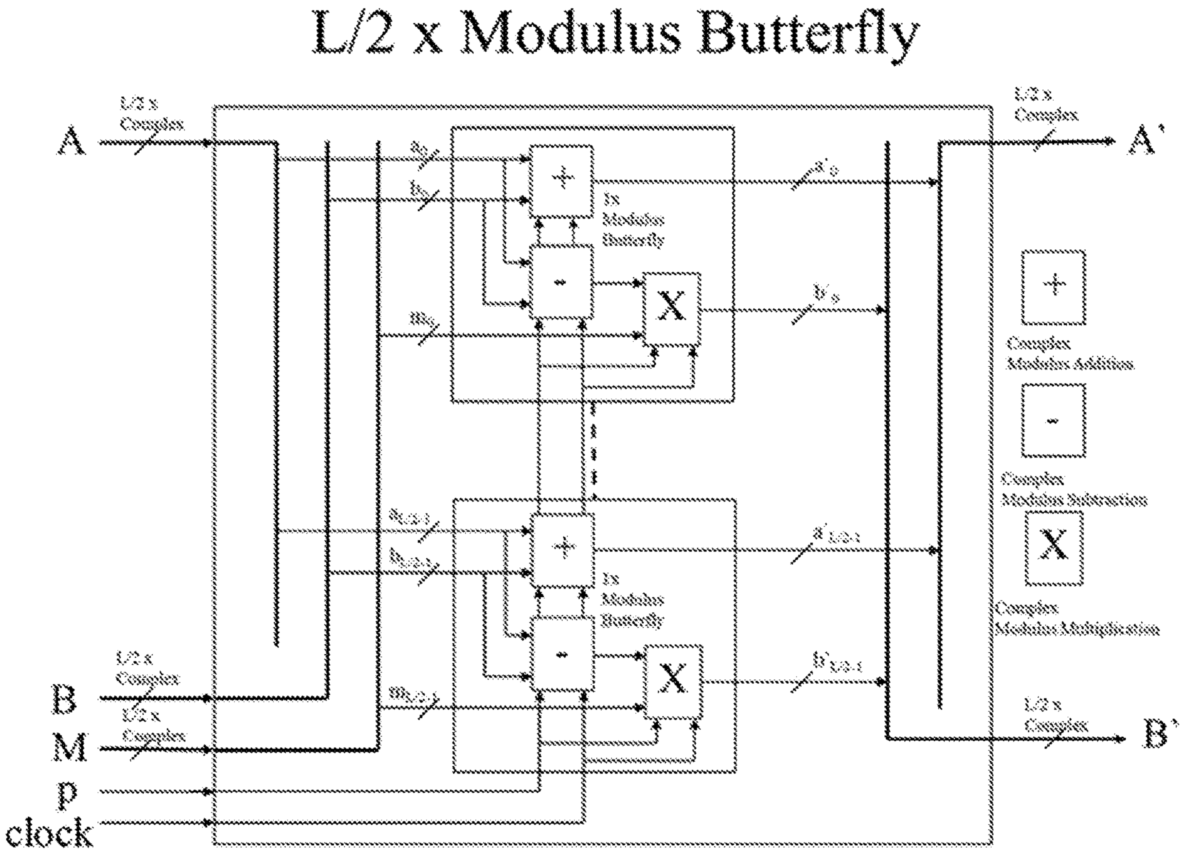
FIG. 16 depicts a schematic block diagram of L/2 modulus butterfly units, according to various example embodiments of the present invention.
Figure 17:
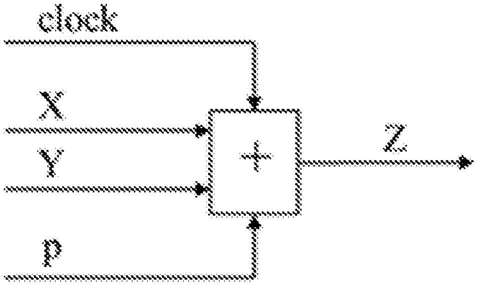
FIG. 17 depicts a schematic block diagram for illustrating and defining the complex modulus addition operation, according to various example embodiments of the present invention.
Figure 18:
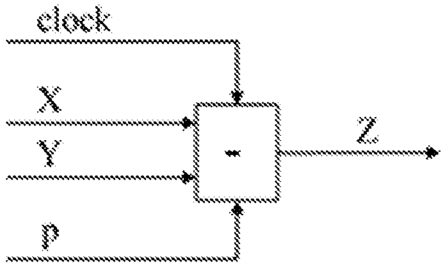
FIG. 18 depicts a schematic block diagram for illustrating and defining the complex modulus subtraction operation, according to various example embodiments of the present invention.

FIG. 16 depicts a schematic block diagram of the L/2 modulus butterfly units 1508, according to various example embodiments of the present invention. In the example L/2 modulus butterfly units 1508, components thereof are communicatively coupled (or interconnected) in the manner as shown in FIG. 16 and thus need not be described in detail for conciseness. Each modulus butterfly unit 1508 is configured to perform a modulus butterfly operation based on a computation pair of data points ($a_i$, $b_i$) received. In particular, FIG. 16 illustrates and defines the modulus butterfly operation performed by each modulus butterfly unit 1508 according to various example embodiments of the present invention involving a modulus addition operation (e.g., the complex modulus addition operation as shown in FIG. 17 to be described below), a modulus subtraction operation (e.g., the complex modulus subtraction operation as shown in FIG. 18 to be described below) and a modulus multiplication operation (e.g., the complex modulus multiplication operation as shown in FIG. 14) configured or arranged (e.g., interconnected) as shown in FIG. 16, whereby $$A=\left\{a_0a_1\ldots a_{\frac{L}{2}-1}\right\},\ B=\left\{b_0b_1\ldots b_{\frac{L}{2}-1}\right\},$$

$$A'=\left\{a'_0a'_1\ldots a'_{\frac{L}{2}-1}\right\},\ B'=\left\{b'_0b'_1\ldots b'_{\frac{L}{2}-1}\right\}\text{ and}$$

$$M=\left\{m_0m_1\ldots m_{\frac{L}{2}-1}\right\}.$$

Furthermore, $a_i$, $b_i$, $a'_i$, $b'_i$ and $m_i$ are complex integers, whereby $$i\in\left[0,\ \frac{L}{2}-1\right],$$

p denotes a prime integer and clock denotes a single bit clock. As shown in FIG. 16, each modulus butterfly unit 1508 may be configured to receive a clock signal and a prime integer.

FIG. 17 depicts a schematic block diagram for illustrating and defining the complex modulus addition operation, according to various example embodiments of the present invention. In FIG. 17, $X=x_r+ix_i$, $Y=y_r+iy_i$, and $Z=z_r+iz_i$, whereby $x_r$, $x_i$, $y_r$, $y_i$, $z_r$ $z_i$ are integers, p denotes a prime integer, clock denotes a single bit clock, $z_r=(x_r+y_r)\%$ p and $z_i=(x_r+y_i)\%$ p.

FIG. 18 depicts a schematic block diagram for illustrating and defining the complex modulus subtraction operation, according to various example embodiments of the present invention. In FIG. 18, $X=x_r+ix_i$, $Y=y_r+iy_i$, and $Z=z_r+iz_i$, whereby $x_r$, $x_i$, $y_r$, $y_i$, $z_r$ $z_i$ are integers, p denotes a prime integer, clock denotes a single bit clock, $z_r=(x_r-y_r)\%$ p and $z_i=(x_r-y_i)\%$ p.

Figure 19:
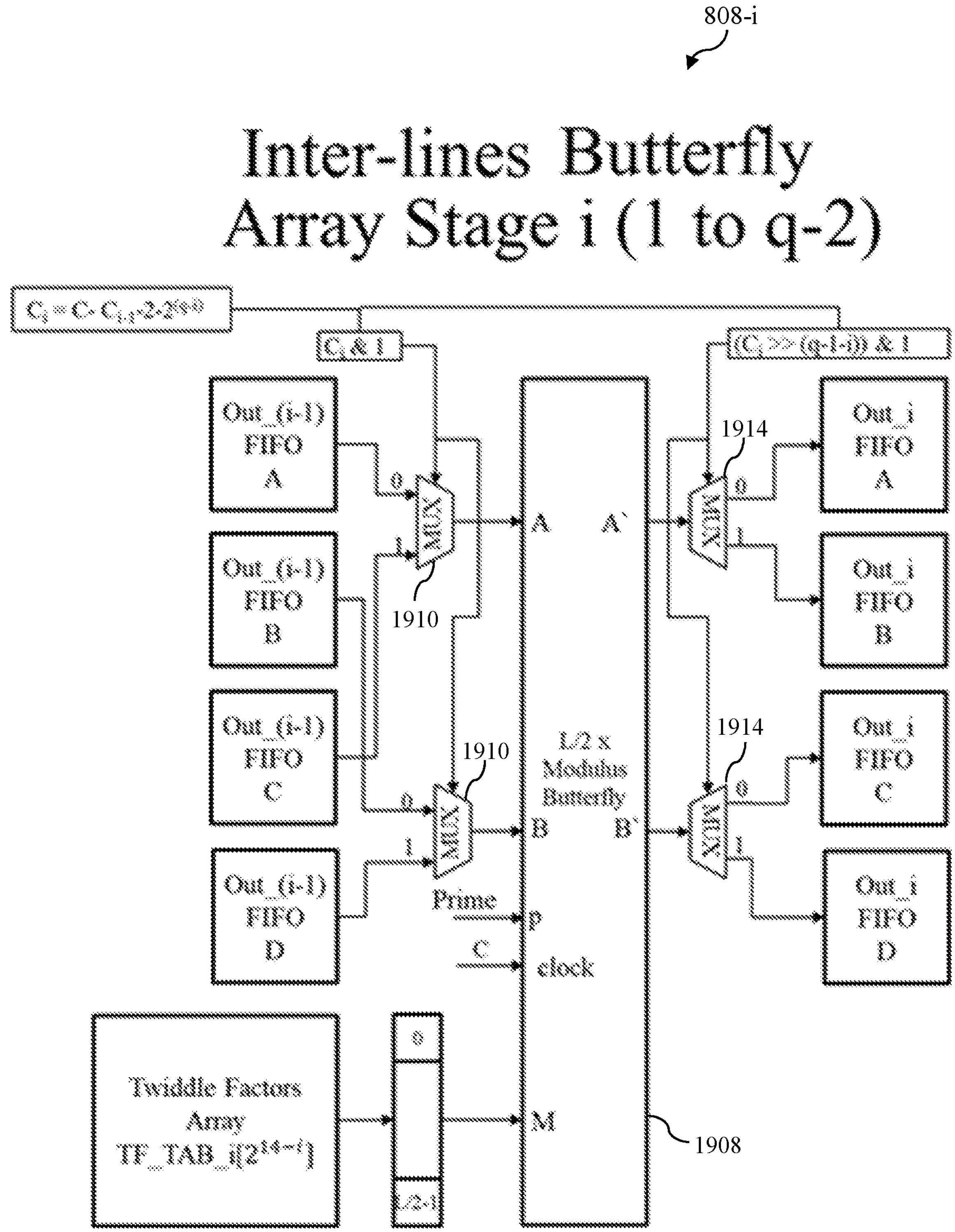
FIG. 19 depicts a schematic block diagram of an example inter-line butterfly array block of the DGT circuit at an intermediate stage (illustrated as stage i) according to various example embodiments of the present invention.

FIG. 19 depicts a schematic block diagram of an example inter-line butterfly array block 808-*i* of the DGT circuit 800 at an intermediate stage (illustrated as stage i, where i∈[1, q−2]) according to various example embodiments of the present invention. In the example inter-line butterfly array block 808-*i*, components thereof are communicatively coupled (or interconnected) in the manner as shown in FIG. 19 and thus need not be described in detail for conciseness.

At stage i of inter-line butterfly (i.e., inter-line butterfly array block 808-*i*), data points are pulled out from the previous Out_i−1 FIFO A and Out_i−1 FIFO B in FIFO order (i.e., of the immediately preceding inter-line butterfly array block, which may also be referred to as input data buffer of the current inter-line butterfly array block 808-*i*), via a set of multiplexer units 1910 (e.g., corresponding to the second set of multiplexer units of the inter-line butterfly array block as described hereinbefore according to various embodiments), and are pushed into L/2 modulus butterfly units 1908 when $C_i\&1==0$ where $C_i=C-C_{i-1}-2-2^{q-i}$. Data points are pulled out from Out_i−1 FIFO C and Out_i−1 FIFO D in FIFO order, via the set of multiplexer units 1910, and are pushed into L/2 modulus butterfly units 1908 when $C_i\&1==1$ where $C_i=C-C_{i-1}-2-2^{q-i}$. Data points at the upper part of output of the modulus butterfly units 1908 (corresponding to a column of data points denoted by A' produced by the L/2 modulus butterfly units 1908) are pushed into Out_i FIFO A while data points at the lower part of output of modulus butterfly units 1908 (corresponding to a column of data points denoted by B' produced by the L/2 modulus butterfly units 1908) are pushed into Out_i FIFO C, via a second multiplexer unit of the set of multiplexer units 1914, when $(C_i>>(q-1-i))\ \&\ 1==0$ where $C_i=C-C_{i-1}-2-2^{q-i}$. The data points at upper part of output of the modulus butterfly units 1908 (corresponding to a column of data points denoted by A' produced by the L/2 modulus butterfly units 1908) are pushed into Out_0 FIFO B while the lower part of output of modulus butterfly units 1908 (corresponding to a column of data points denoted by B' produced by the L/2 modulus butterfly units 1908) are pushed into Out_0 FIFO D, via the second multiplexer unit of the set of multiplexer units 1914, when $(C_i>>(q-1-i))\ \&\ 1==1$ where $C_i=C-C_{i-1}-2-2^{q-i}$. The four output data buffers with respect to the inter-line butterfly array block 808-*i*, namely, Out_i FIFO A, Out_i FIFO B, Out_i FIFO C and Out_i FIFO D, each has L/2 number of parallel data points, where i∈[1, q−2]. With the above-described configuration or setup of the intermediate inter-line butterfly stage i 808-*i*, the initiation interval at such a stage achieves single cycle. The configuration and operation of the L/2 modulus butterfly units 1908 are the same or similar as the L/2 modulus butterfly units 1508 as described hereinbefore and thus need not be repeated for conciseness.

Figure 20:
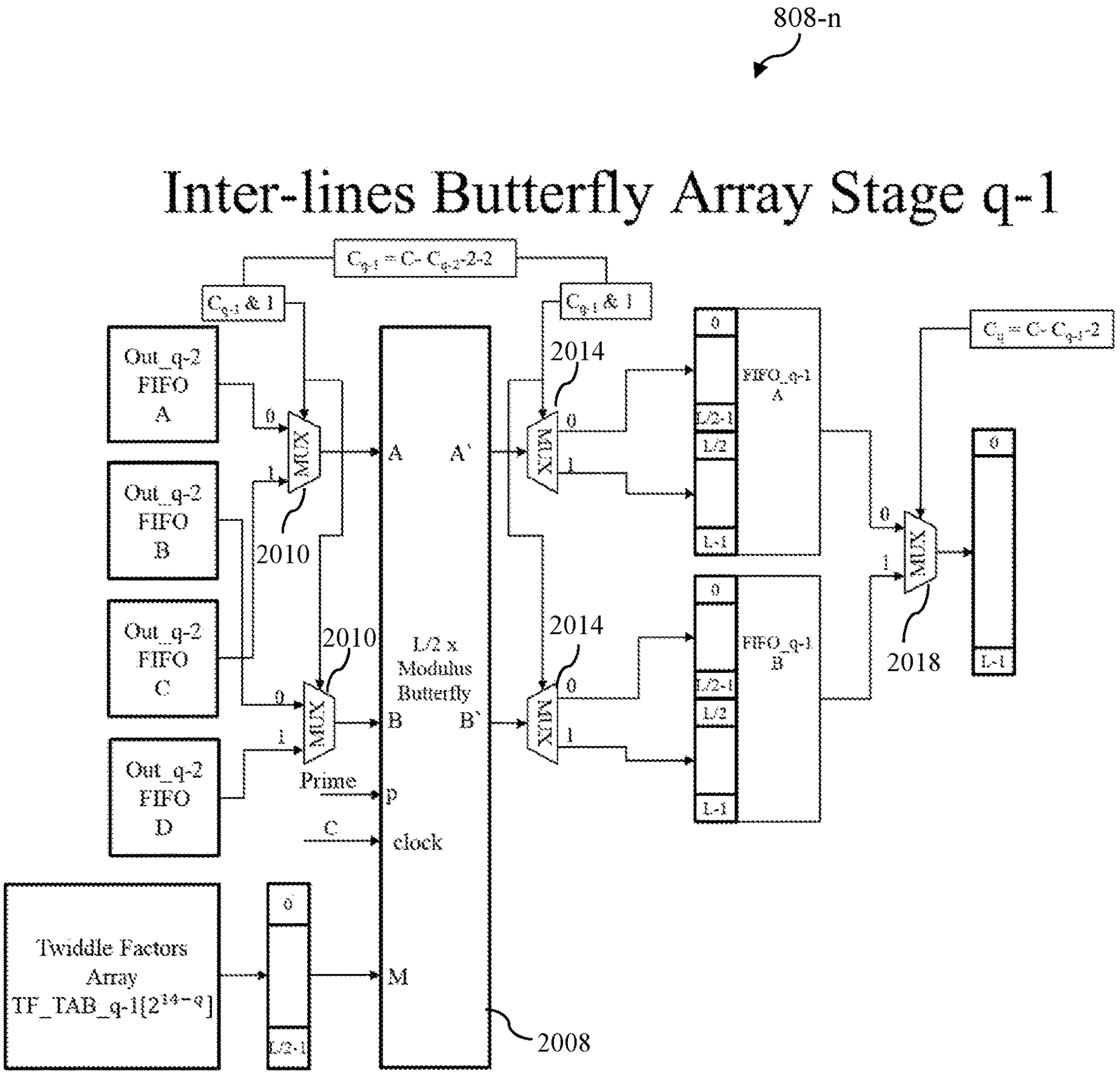
FIG. 20 depicts a schematic block diagram of an example inter-line butterfly array block of the DGT circuit at the last stage (illustrated as stage q−1), according to various example embodiments of the present invention.

FIG. 20 depicts a schematic block diagram of an example inter-line butterfly array block 808-*n* of the DGT circuit 800 at the last stage (illustrated as stage q−1), according to various example embodiments of the present invention. In the example inter-line butterfly array block 808-*n*, components thereof are communicatively coupled (or interconnected) in the manner as shown in FIG. 20 and thus need not be described in detail for conciseness.

At stage q−1 of inter-line butterfly (i.e., inter-line butterfly array block 808-*n*), data points are pulled out from previous Out_q−1 FIFO A and Out_q−1 FIFO B in FIFO order (i.e., of the immediately preceding inter-line butterfly array block, which may also be referred to as input data buffer of the last inter-line butterfly array block 808-*n*), via a set of multiplexer units 2010 (e.g., corresponding to the first set of multiplexer units of the inter-line butterfly array block as described hereinbefore according to various embodiments), and are pushed into L/2 modulus butterfly units 2008 when $C_{q-1}\ \&1==0$ where $C_{q-1}=C-C_{q-2}-2-2$. Data points are pulled out from Out_q−1 FIFO C and Out_q−1 FIFO D in FIFO order, via the set of multiplexer units 2010, and are pushed into L/2 modulus butterfly units 2008 when $C_{q-1}\ \&1==1$ where $C_{q-1}=C-C_{q-2}-2-2$. Data points at the upper part of output the modulus butterfly units 2008 (corresponding to a column of data points denoted by A' produced by the L/2 modulus butterfly units 2008) are pushed into the upper part of L/2 data points (0 to L/2-1) in Out_q−1 FIFO A while the lower part of outputs of the butterfly units (corresponding to a column of data points denoted by B' produced by the L/2 modulus butterfly units 2008) are pushed into the upper part of L/2 data points in Out_i FIFO B (0 to L/2-1), via a set of multiplexer units 2014 (e.g., corresponding to the second set of multiplexer units of the last inter-line butterfly array block as described hereinbefore according to various embodiments), when $C_{q-1}\ \&\ 1==0$ where $C_{q-1}=C-C_{q-2}-2-2$. Data points at the upper part of output of butterfly units 2008 (corresponding to a column of data points denoted by A' produced by the L/2 modulus butterfly units 2008) are pushed into lower part of L/2 points (L/2 to L−1) in Out_0 FIFO A while the lower part of output of butterfly units (corresponding to a column of data points denoted by B' produced by the L/2 modulus butterfly units 2008) are pushed into lower part of L/2 points (L/2 to L−1) on Out_0 FIFO B, via the set of multiplexer units 2014, when $C_{q-1}$ & 1==1 where $C_{q-1}=C-\ C_{q-2}-2-2$. Input data buffers with respect to the last inter-line butterfly array block 808-*n*, namely, Out_q−2 FIFO A, Out_q−2 FIFO B, Out_q−2 FIFO C and Out_q−2 FIFO D each has L/2 number of parallel data points, while output data buffers with respect to the last inter-line butterfly array block 808-*n*, namely, FIFO_q−1 A and FIFO_q−1 B each has L number of parallel data points. Furthermore, data points (0 to L−1) are pulled out from FIFO_q−1 A in FIFO order, via a multiplexer unit 2018 (e.g., corresponding to the third multiplexer unit of the last inter-line butterfly array block as described hereinbefore according to various embodiments) when $C_q$==0, where $C_q$=C−$C_{q-1}$−2, and data points (0 to L−1) are pulled out from FIFO_q−1 B in FIFO order, via the multiplexer unit 2018 when $C_q$ &1==1 where $C_q$=C−$C_{q-1}$−2. With the above-described configuration or setup of the last inter-line butterfly stage q−1 808-*n*, the initiation interval at such a stage achieves single cycle. Similarly, the configuration and operation of the L/2 modulus butterfly units 2008 are the same or similar as the L/2 modulus butterfly units 1508 as described hereinbefore and thus need not be repeated for conciseness.

Figure 31A:
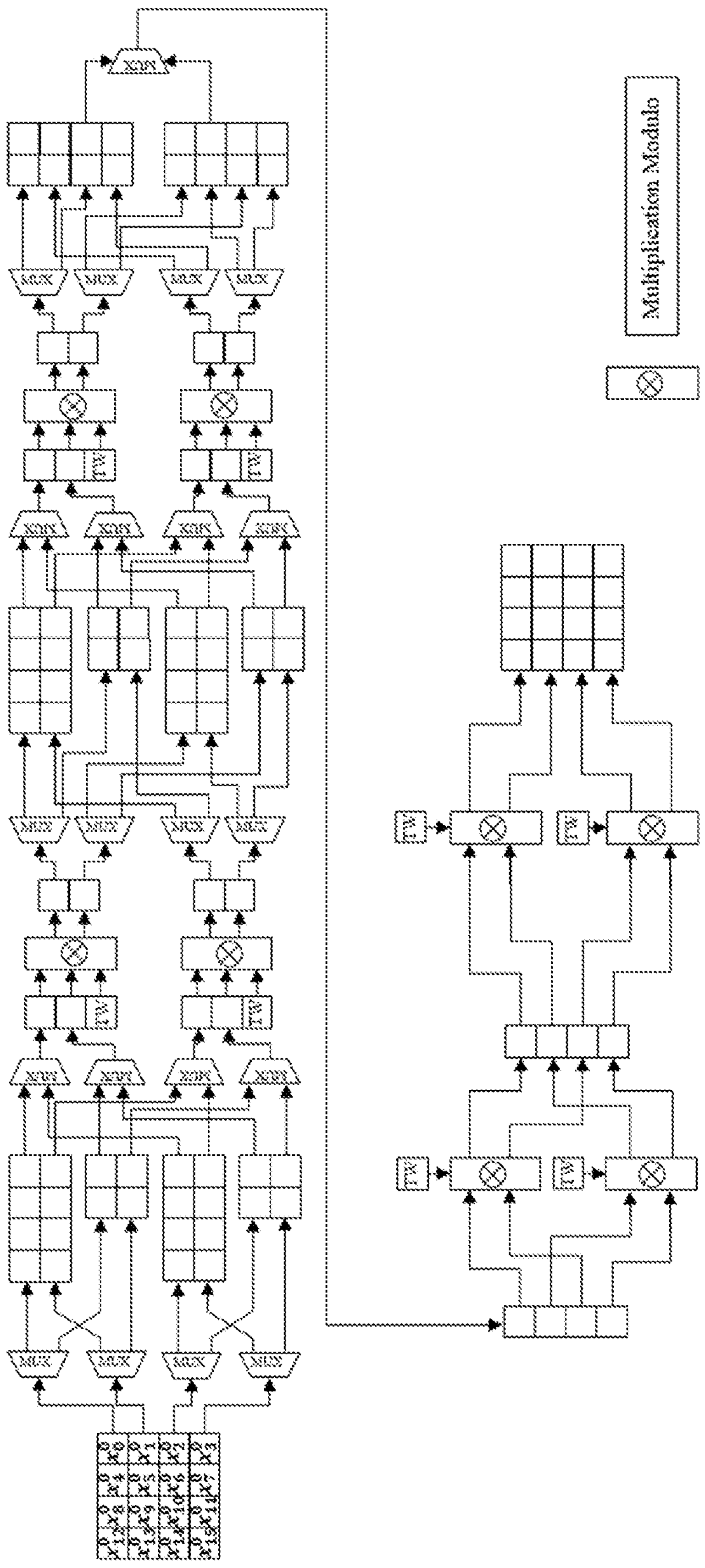
FIGS. 31A to 31S depict a detailed data flow of the DGT circuit for $2^4$ data points (i.e., 16 parallel data points arranged into 4 columns of 4 parallel data points) according to various example embodiments of the present invention.
Figure 31B:
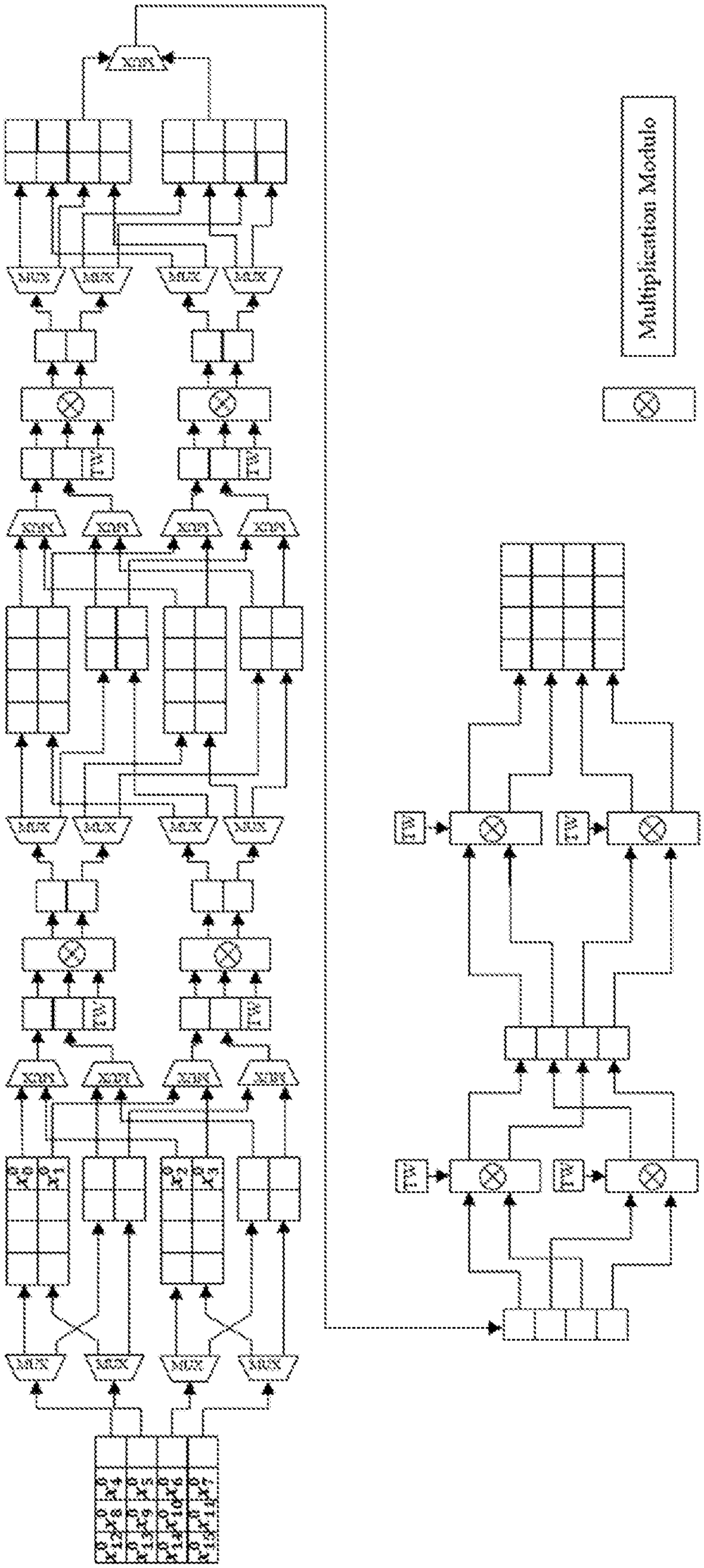
Figure 31C:
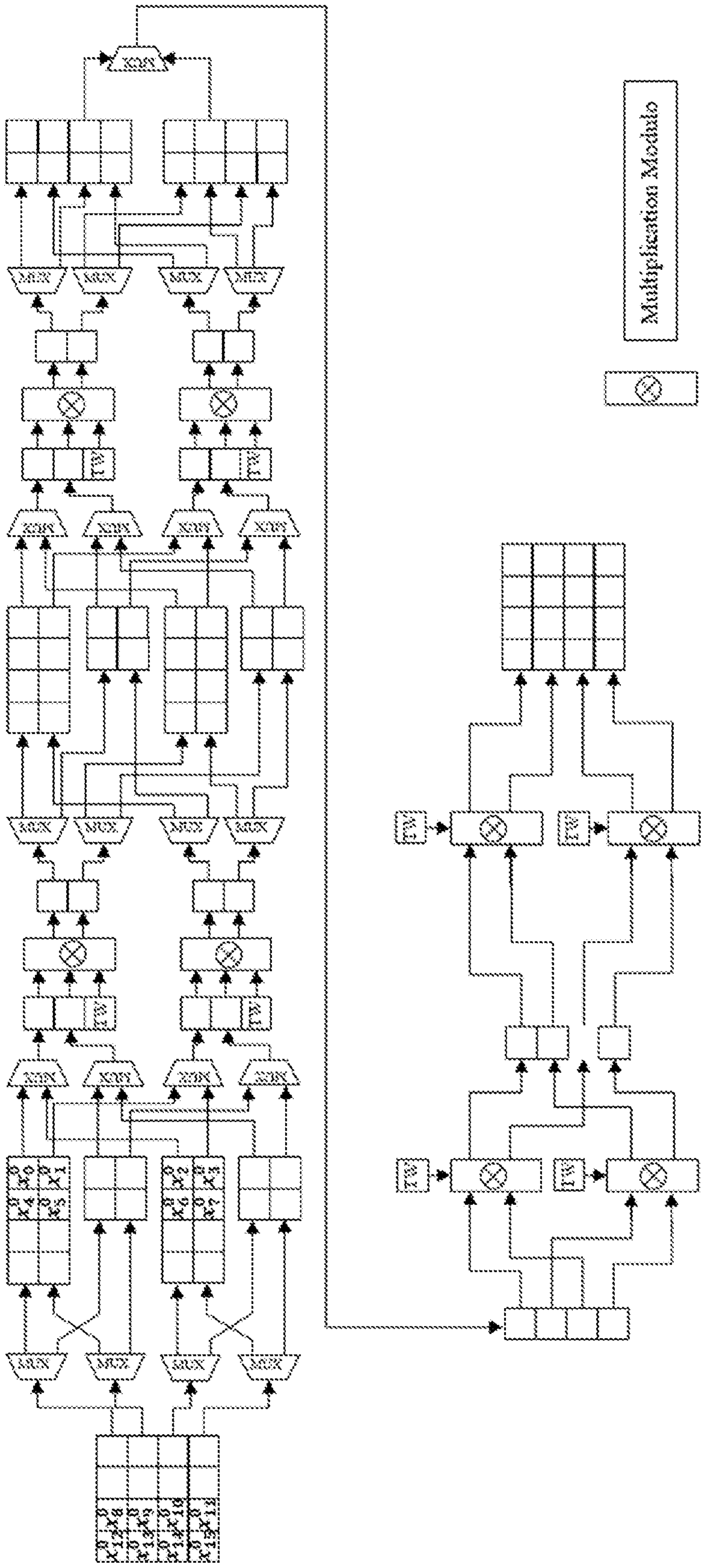
Figure 31D:
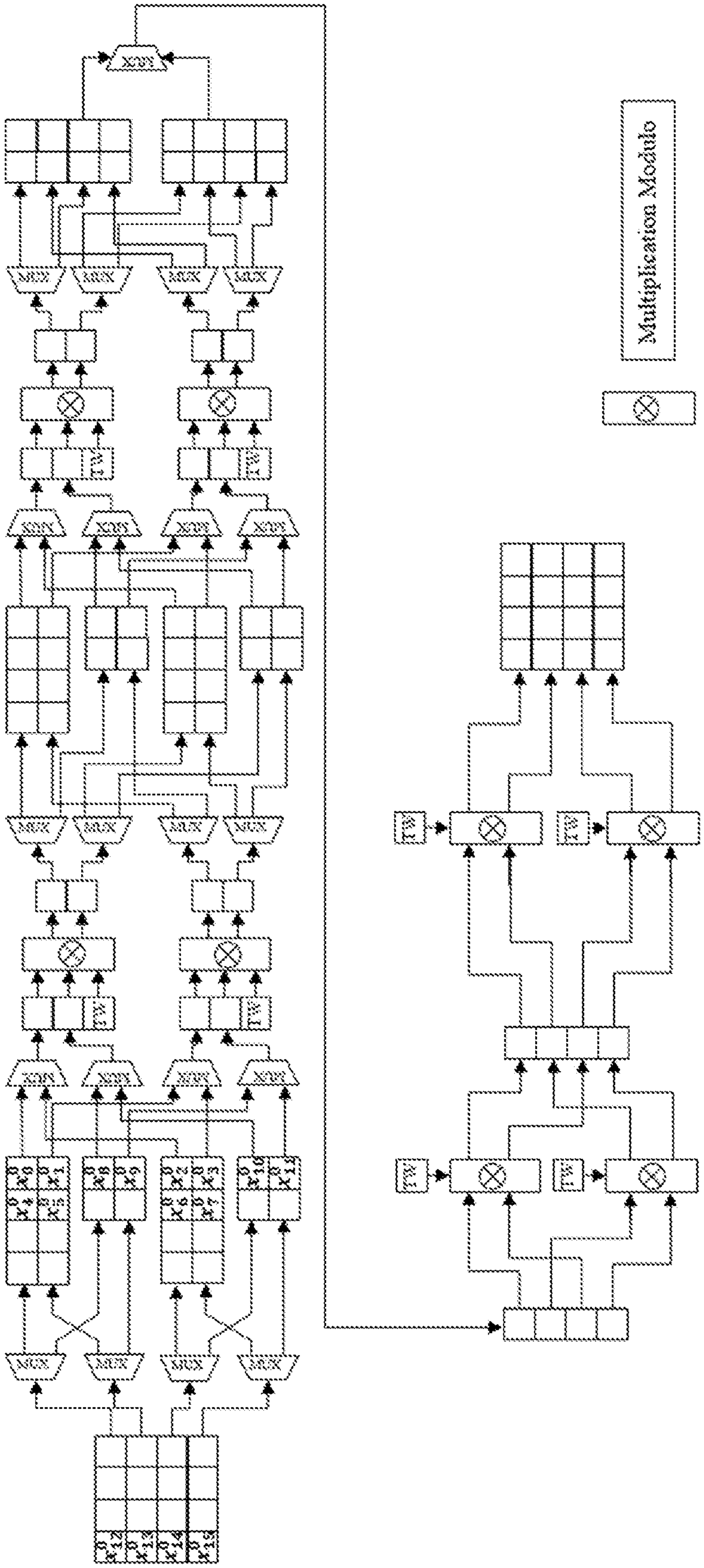
Figure 31E:
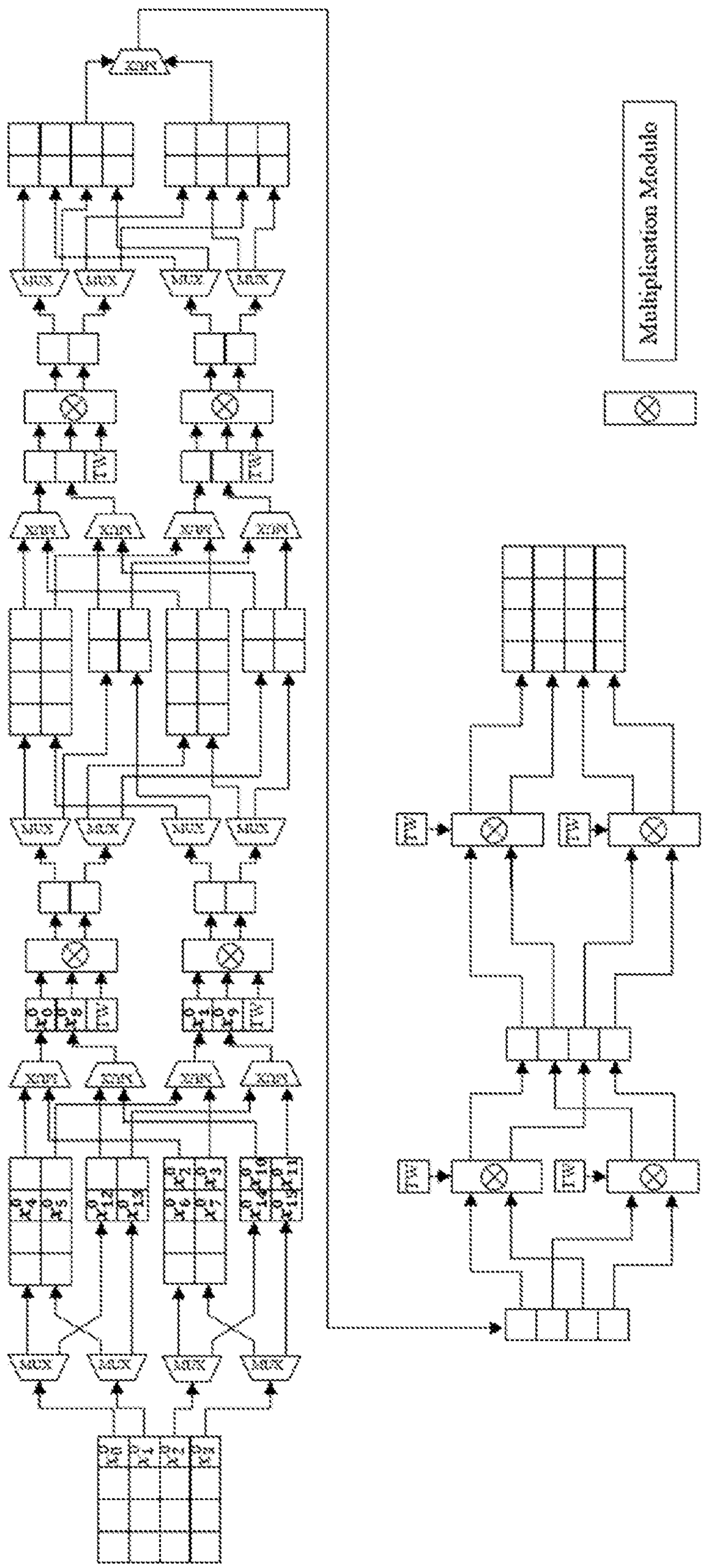
Figure 31F:
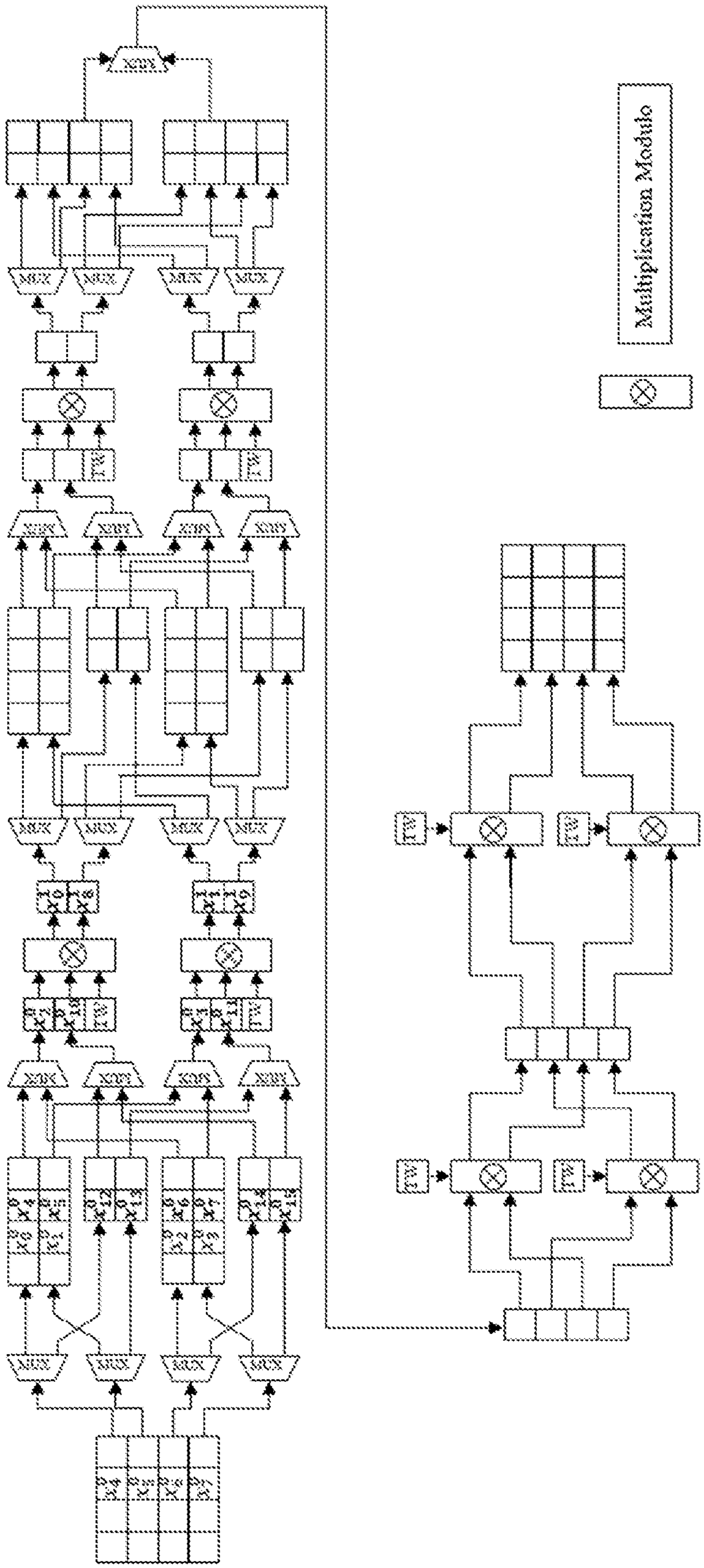
Figure 31G:
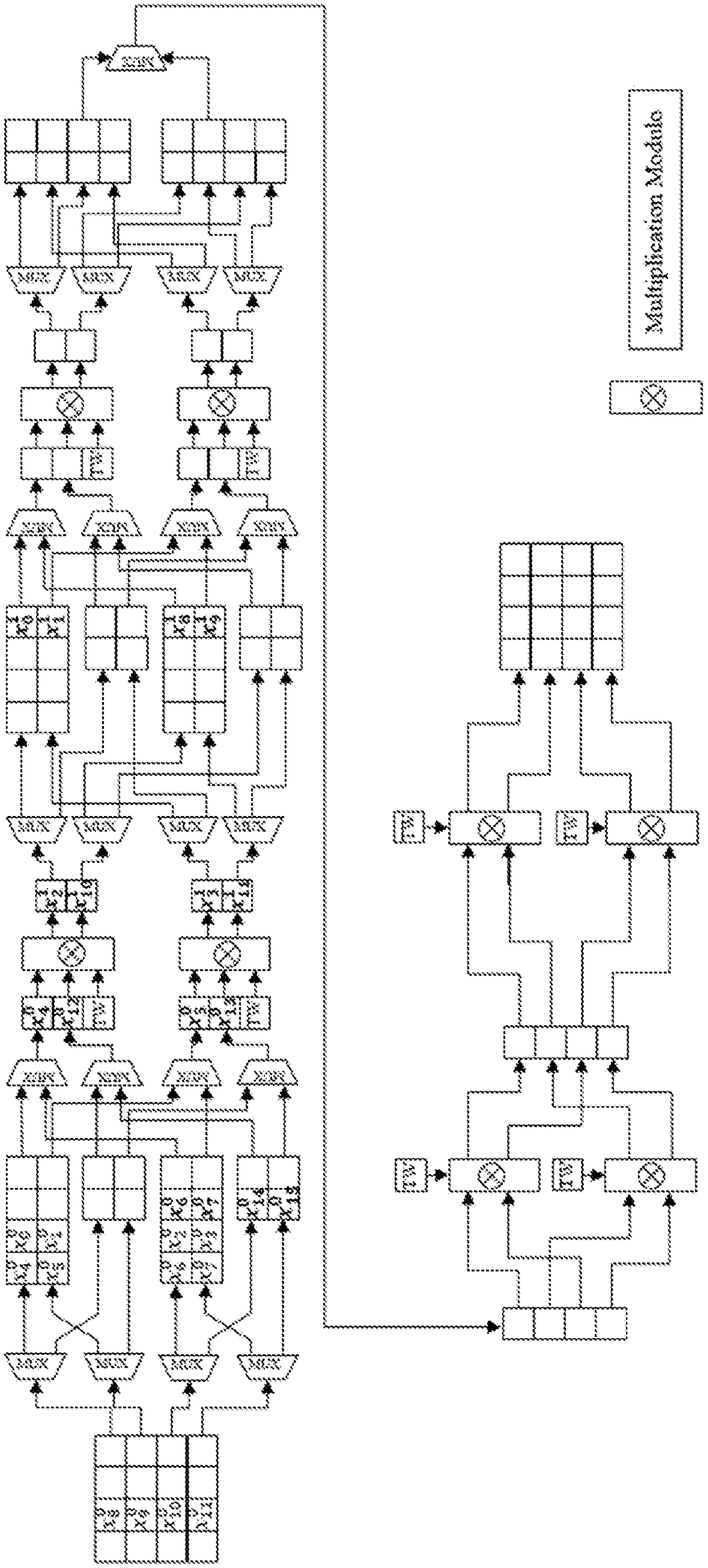
Figure 31H:
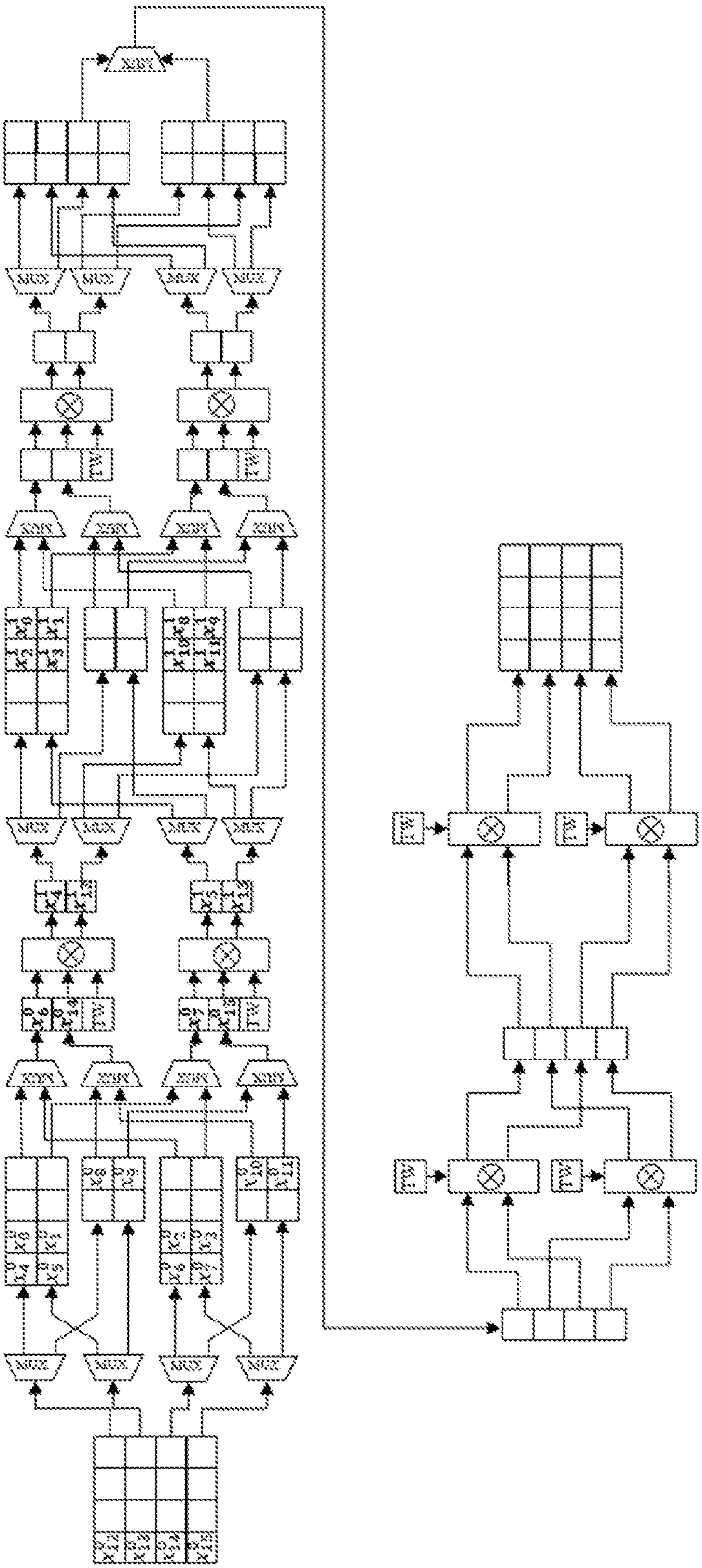
Figure 31I:
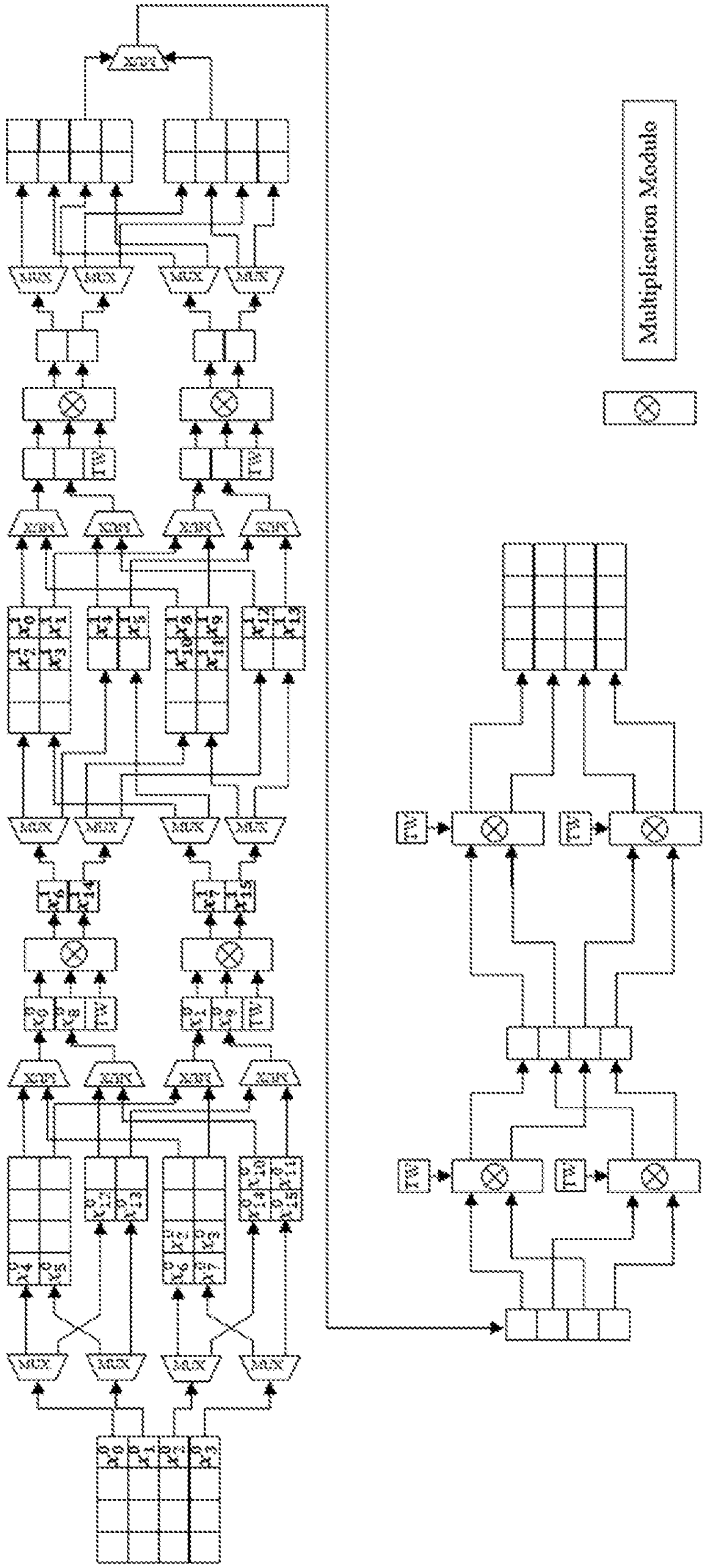
Figure 31J:
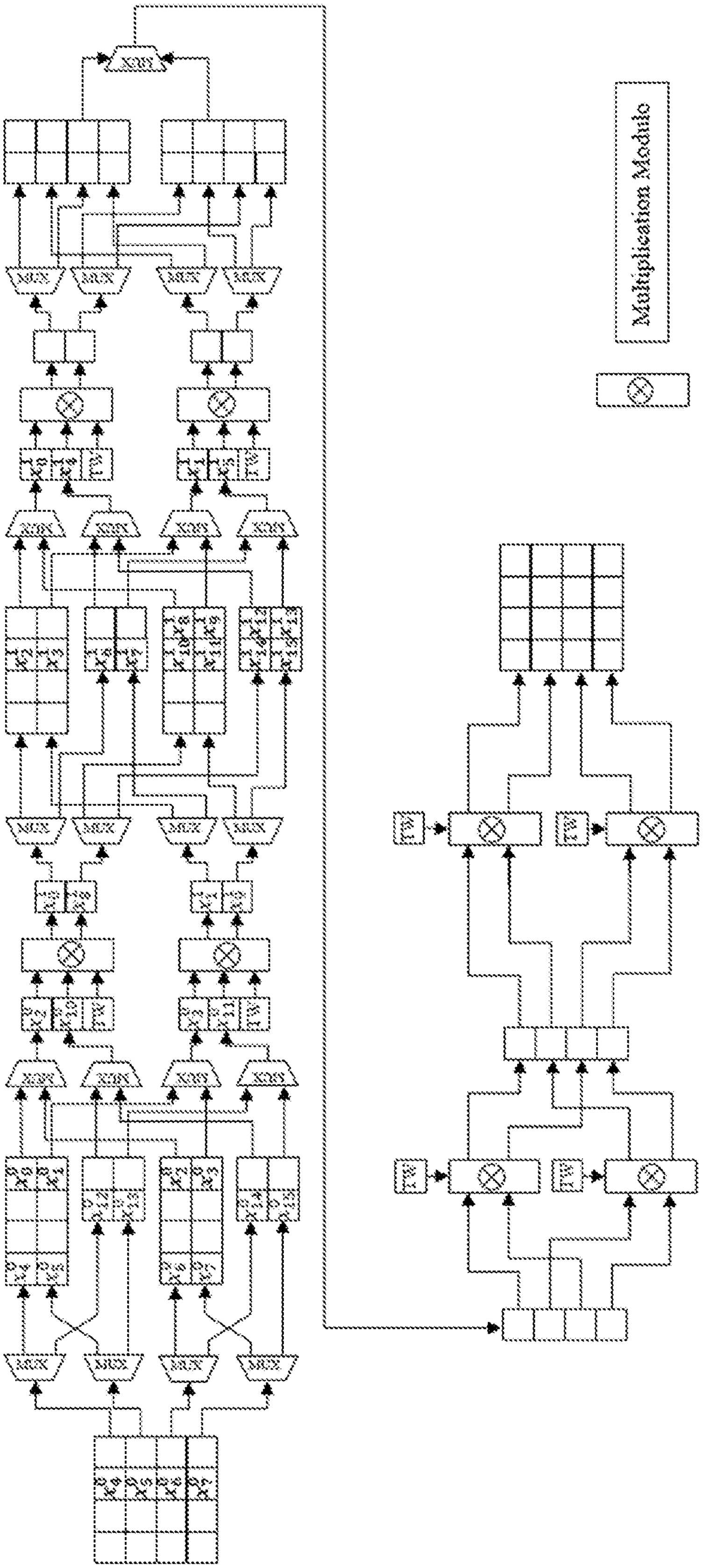
Figure 31K:
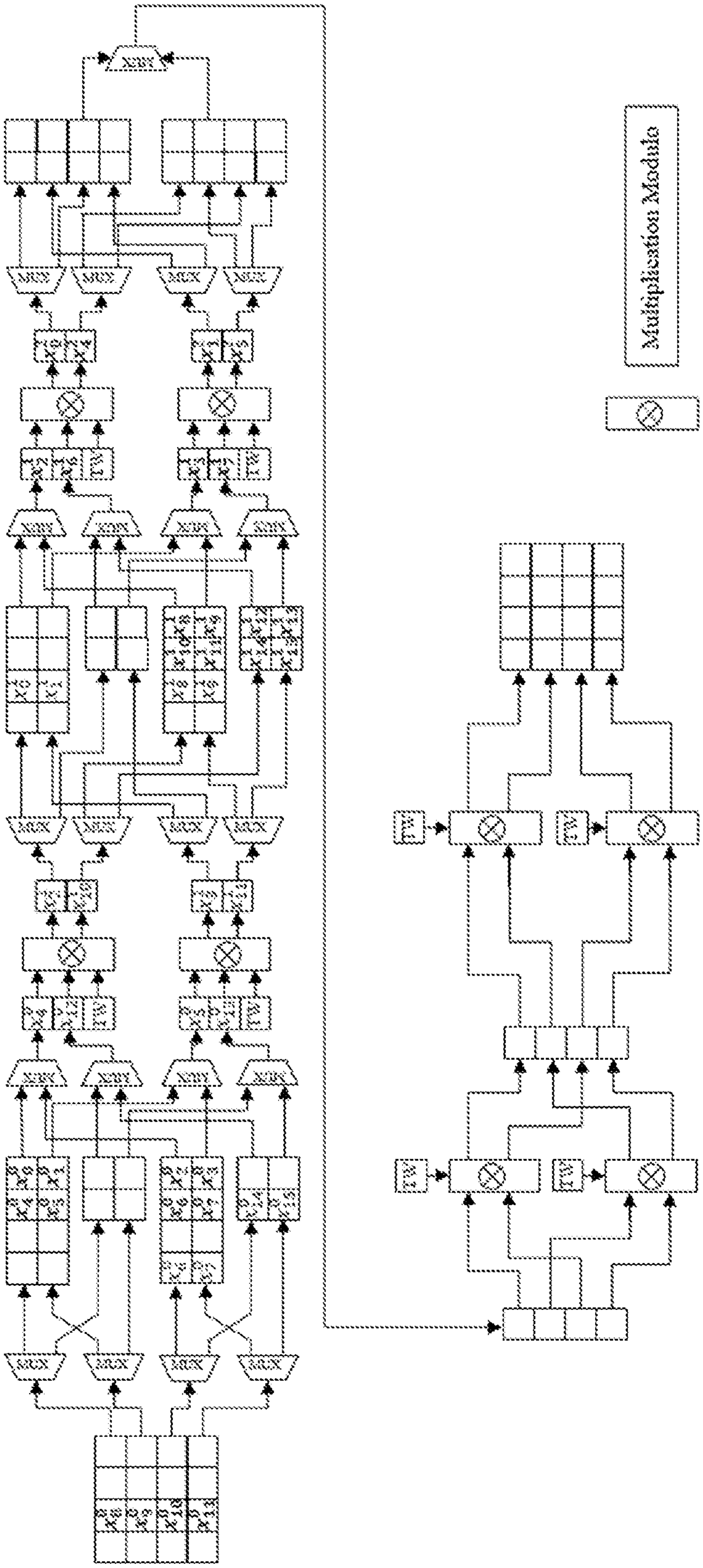
Figure 31L:
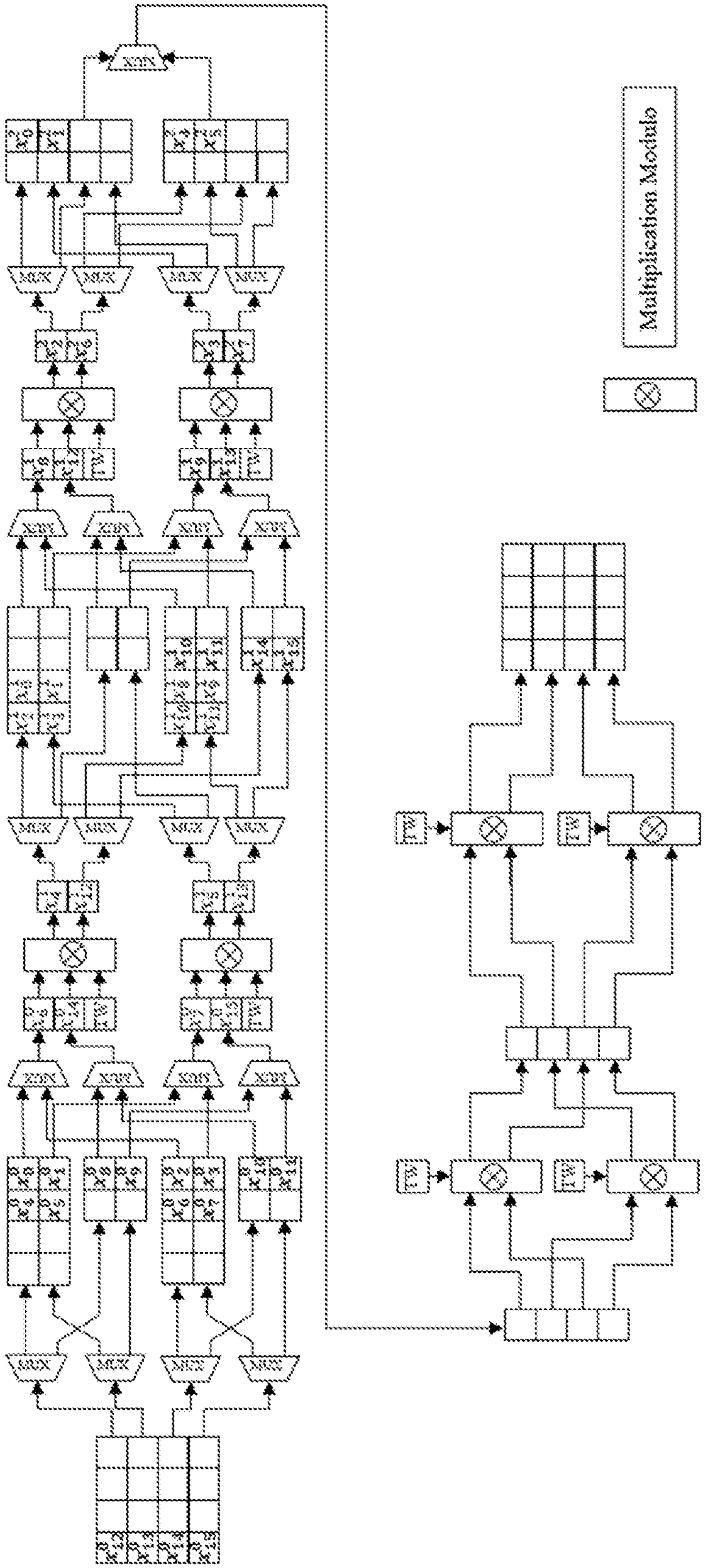
Figure 31M:
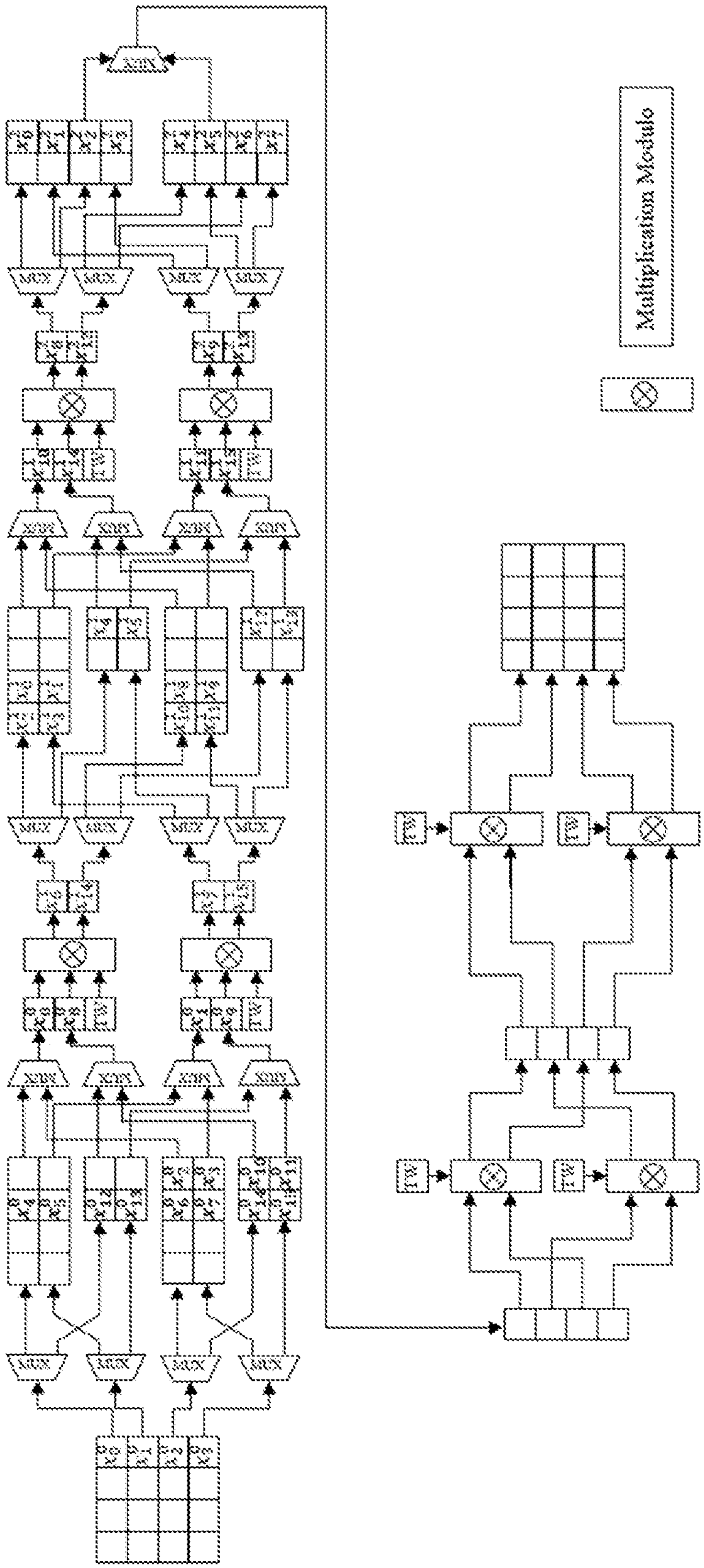
Figure 31N:
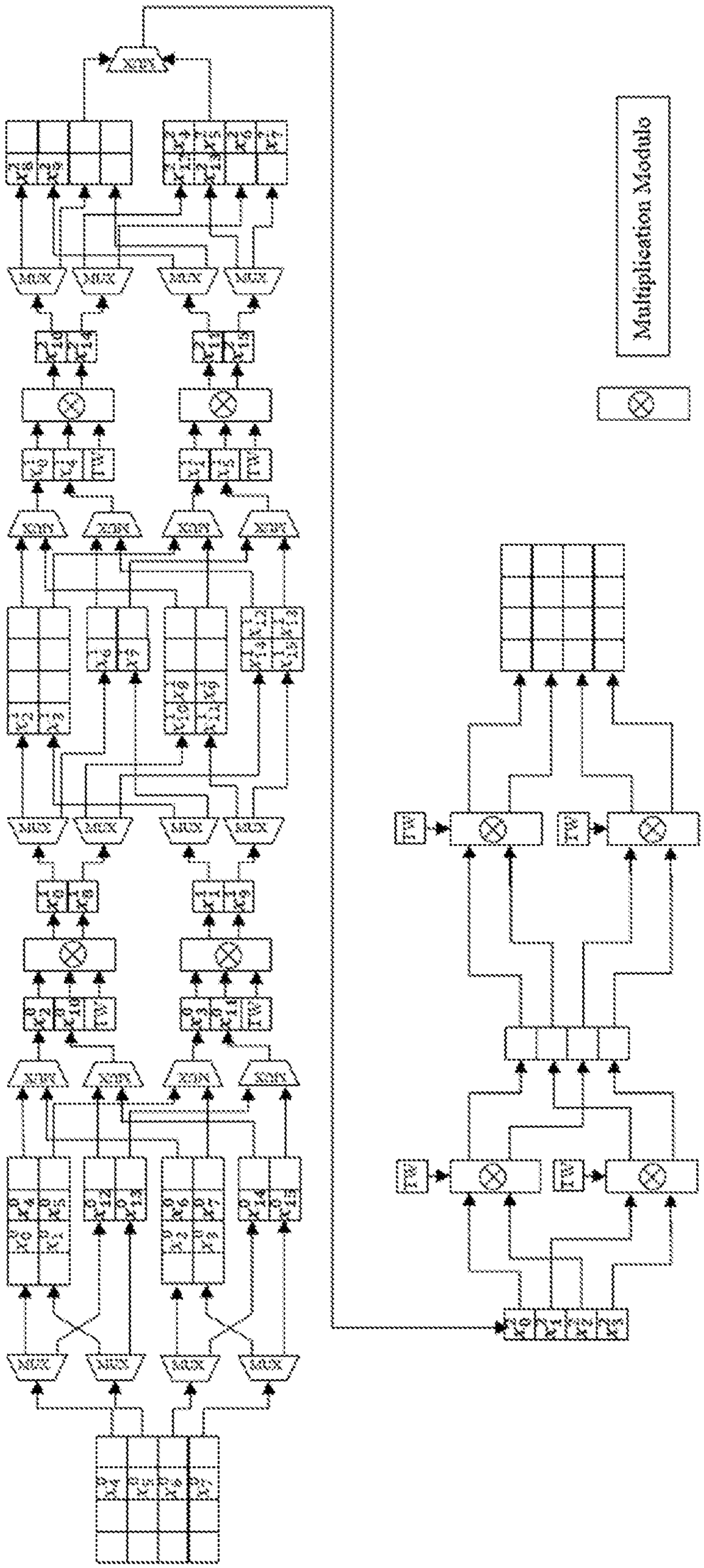
Figure 31O:
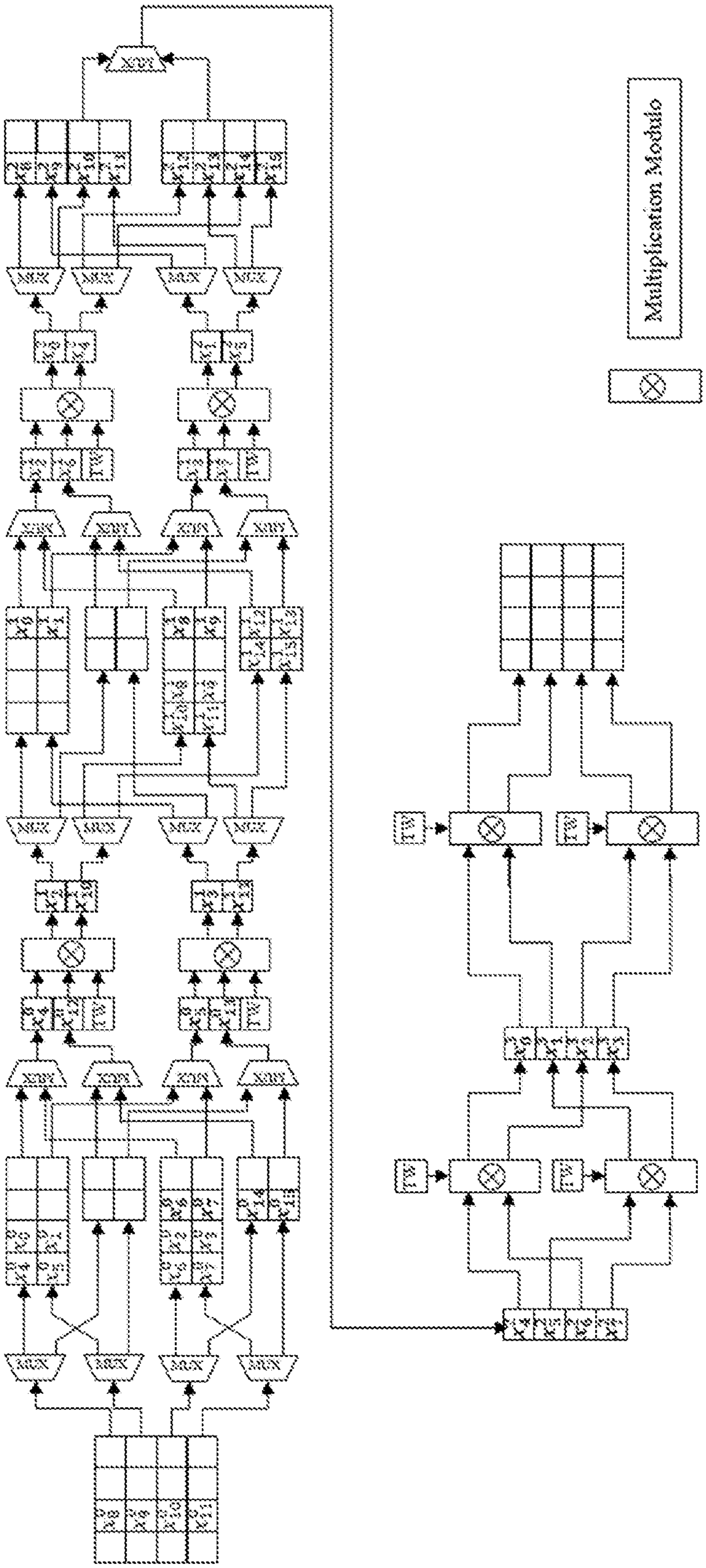
Figure 31P:
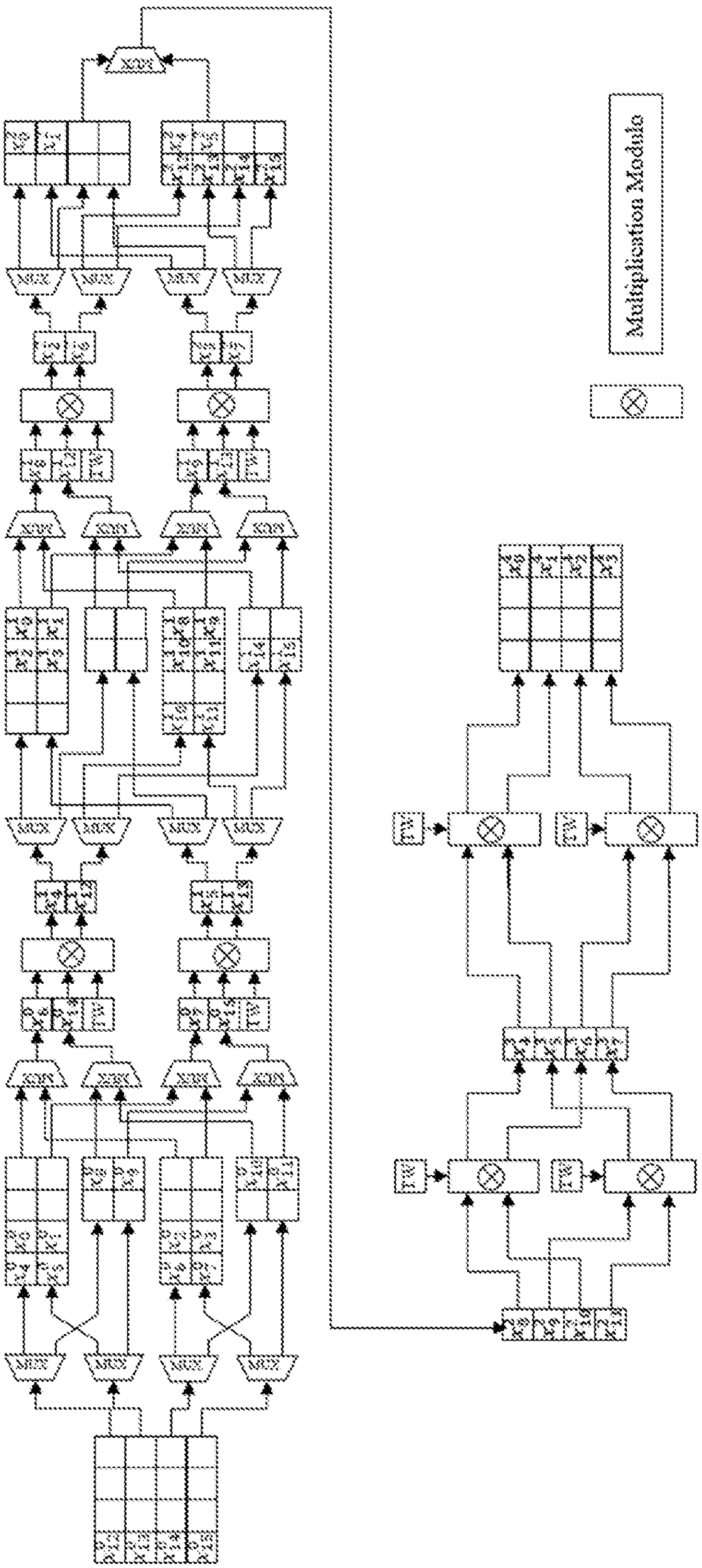
Figure 31Q:
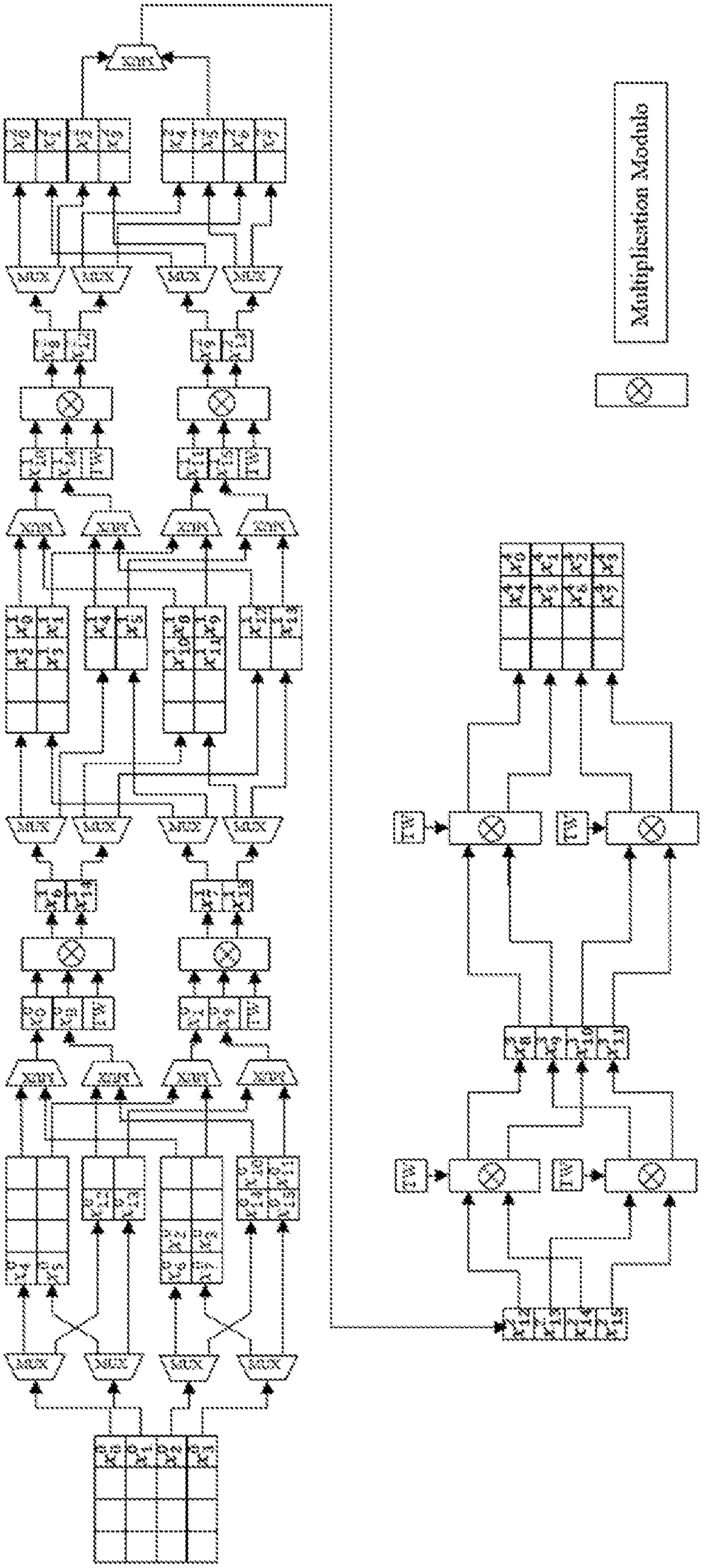
Figure 31R:
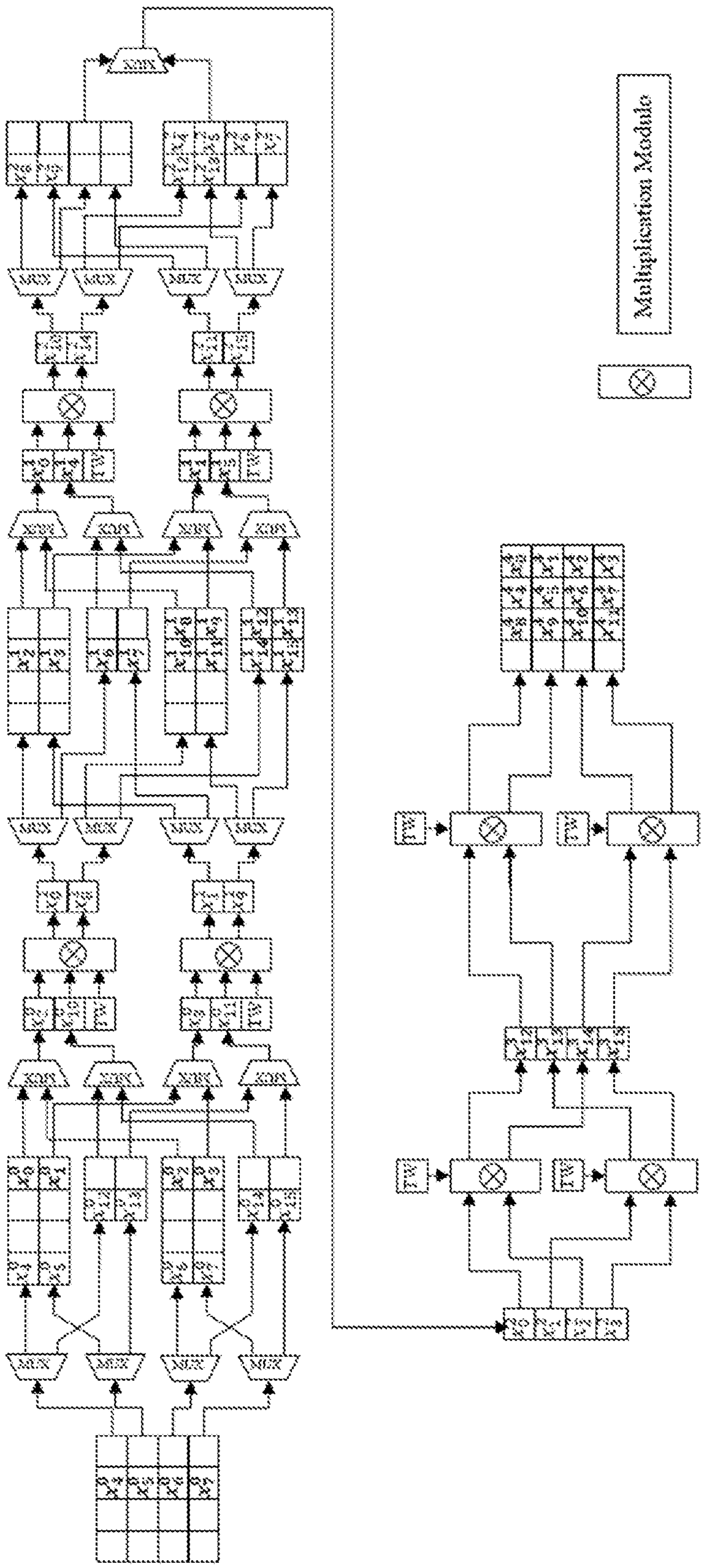
Figure 31S:
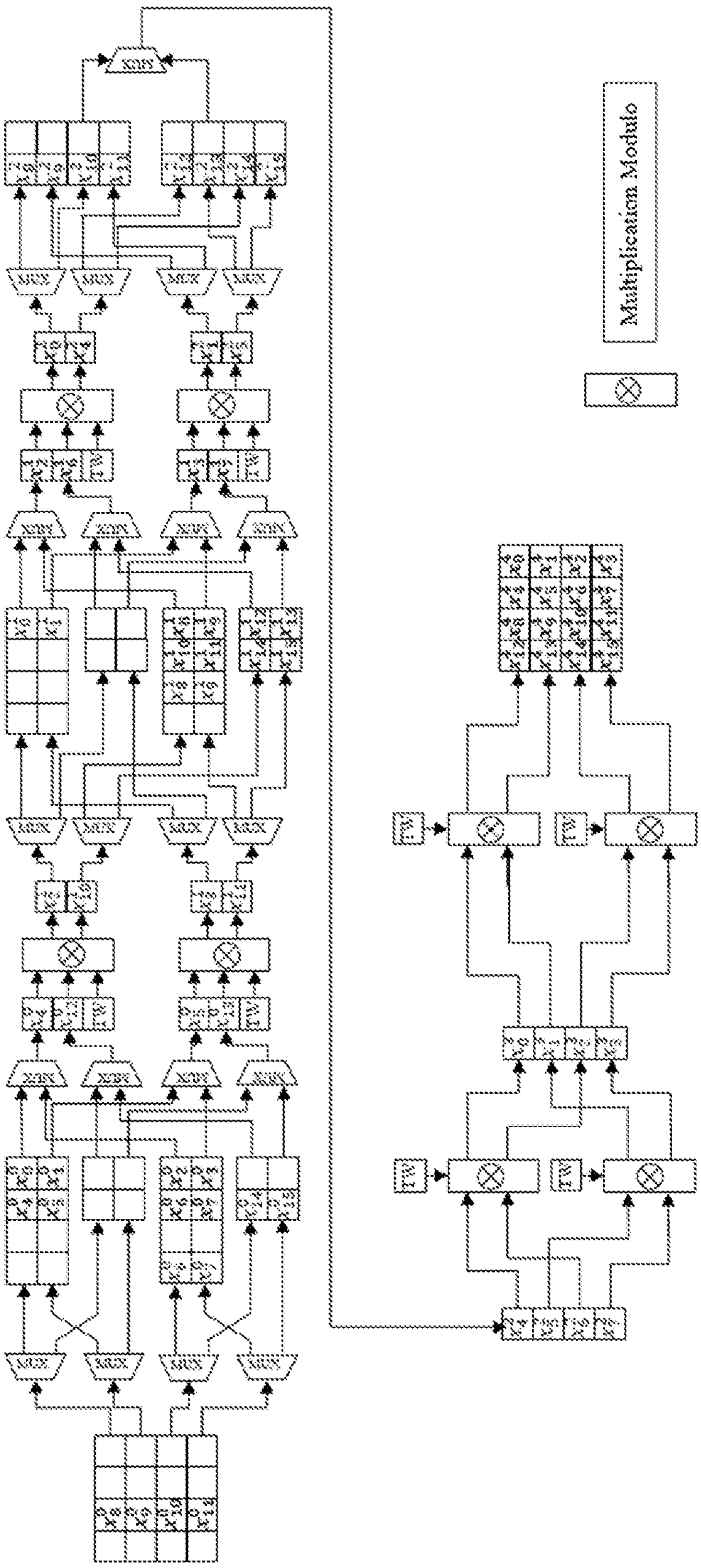

Accordingly, the DGT circuit 100 comprises a plurality of inter-line butterfly array blocks 808, each inter-line butterfly array block comprising a plurality of inter-line modulus butterfly units 1508/1908/2008, each inter-line modulus butterfly unit being configured to perform a modulus butterfly operation based on a computation pair of data points received corresponding to a pair of input data points at a same row of the matrix of input data points (e.g., as illustrated in the data flow of the DGT circuit 800 shown in FIGS. 31A to 31S to be described later below. By way of an example only, as shown in FIGS. 31E to 31K, it can be seen that each inter-line modulus butterfly unit is configured to perform a modulus butterfly operation based on a computation pair of data points received (e.g., data points $x_0^0$ and $x_8^0$ received by an inter-line modulus butterfly unit in FIG. 31E) corresponding to a pair of input data points at a same row of the matrix of input data points (e.g., see FIG. 31A, whereby data points $x_0^0$ and $x_8^0$ are at a same row of the matrix of input data points)). In this regard, as described hereinbefore with reference to FIGS. 7A and 7B, the matrix of input data points comprises a plurality of columns of input data points, whereby a plurality of parallel input data points derived from the homomorphically encrypted data are arranged into the plurality of columns of input data points. Furthermore, each inter-line butterfly array block of the plurality of inter-line butterfly array blocks 808 comprises a plurality of FIFO input data buffers (e.g., corresponding to In FIFO A to In_FIFO D in FIG. 15, Out_(i−1) FIFO A to Out_(i−1)_FIFO D in FIG. 19 and Out_q−2 FIFO A to Out_q−2 FIFO D in FIG. 20). For example, as shown in FIGS. 15, 16, 19 and 20, for said each inter-line butterfly array block, each FIFO input data buffer of the plurality of FIFO input data buffers is communicatively coupled to the plurality of inter-line modulus butterfly units of the inter-line butterfly array block and is configured to receive a plurality of columns of data points and output each of the plurality of columns of data points to the plurality of inter-line modulus butterfly units 1508/1908/2008 column-by-column in FIFO order for each of the plurality of inter-line modulus butterfly units to perform the modulus butterfly operation based on the computation pair of data points received.

Figure 21:
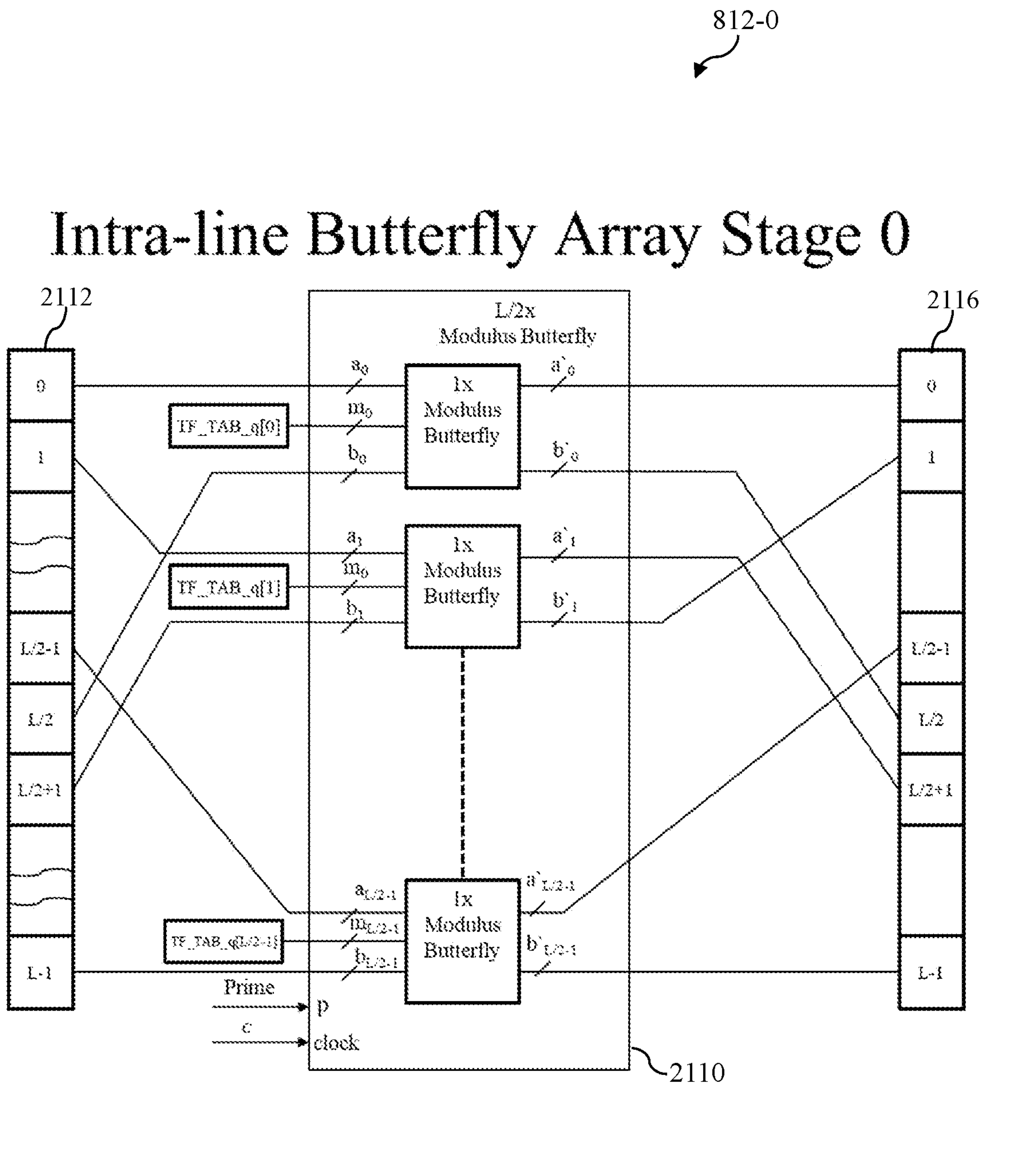
FIG. 21 depicts a schematic block diagram of an example intra-line butterfly array block of the DGT circuit at the first stage of the intra-line butterfly (illustrated as stage 0 in FIG. 8), according to various example embodiments of the present invention.

FIG. 21 depicts a schematic block diagram of an example intra-line butterfly array block 812-0 of the DGT circuit 800 at the first stage of the intra-line butterfly (illustrated as stage 0 in FIG. 8), according to various example embodiments of the present invention. In the example intra-line butterfly array block 812-0, components thereof are communicatively coupled (or interconnected) in the manner as shown in FIG. 21 and thus need not be described in detail for conciseness. For example, it can be seen that each modulus butterfly unit 2110 is configured to perform a modulus butterfly operation based on a corresponding computation pair of data points ($a_i$, $b_i$) from an input register 2112, along with a corresponding twiddle factor, received, so as to produce a pair of output data points ($a'_i$, $b'_i$) to an output register 2116. Each modulus butterfly unit 2110 may be configured to receive a clock signal and a prime integer. Similarly, the configuration and operation of the L/2 modulus butterfly units 2110 are the same or similar as the L/2 modulus butterfly units 1508 as described hereinbefore and thus need not be repeated for conciseness.

At Stage 0 of the intra-line butterfly (i.e., intra-line butterfly array block 812-0), each pair of data points $R_{in}$[s] and $R_{in}$[s+L/2], along with TF_TAB_q[s], are input to a corresponding modulus butterfly unit 2110 for computation to obtain the result of $R_{out}$[s] and $R_{out}$[s+L/2] where s∈[0, L/2-1]. As an example, computations by a modulus butterfly unit may be performed according to the following equations:

$$R_{out}[s]=(R_{in}[s]+R_{in}[s+L/2])\text{mod}_p \quad \text{(Equation 7)}$$

$$R_{out}[s+L/2]=((R_{in}[s]-R_{in}[s+L/2])\cdot TF\_TAB\_q[s])\text{mod}_p \quad \text{(Equation 8)}$$

Figure 22:
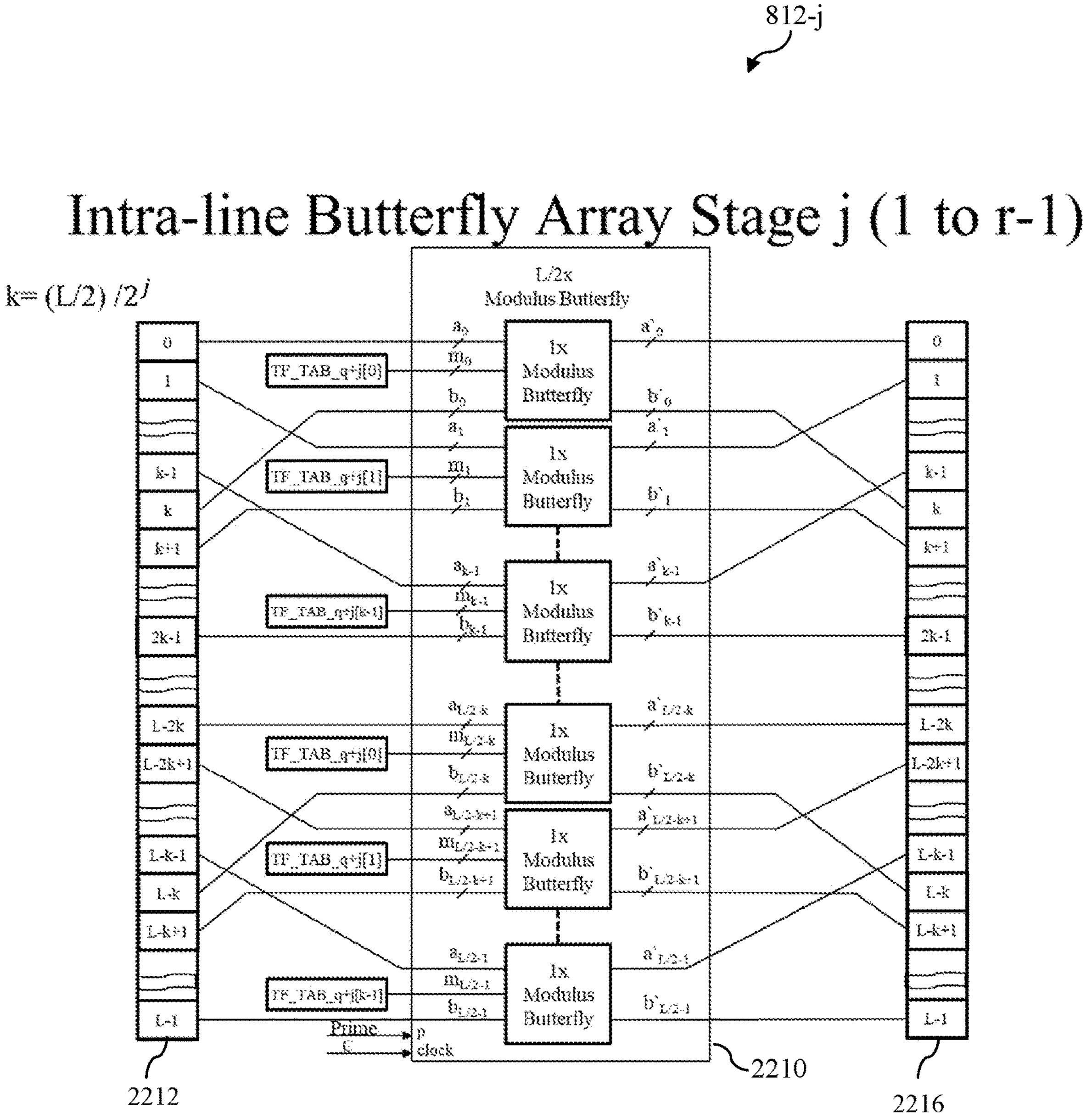
FIG. 22 depicts a schematic block diagram of an example intra-line butterfly array block of the DGT circuit at an intermediate or the last time stage of the intra-line butterfly (illustrated as stage j), according to various example embodiments of the present invention.

FIG. 22 depicts a schematic block diagram of an example intra-line butterfly array block 812-*j* of the DGT circuit 800 at an intermediate or last time stage of the intra-line butterfly (illustrated as stage j), according to various example embodiments of the present invention. In the example intra-line butterfly array block 812-*j*, components thereof are communicatively coupled (or interconnected) in the manner as shown in FIG. 22 and thus need not be described in detail for conciseness. For example, it can be seen that each modulus butterfly unit 2210 is configured to perform a modulus butterfly operation based on a corresponding computation pair of data points ($a_i$, $b_i$) from an input register 2212, along with a corresponding twiddle factor, received, so as to produce a pair of output data points ($a'_i$, $b'_i$) to an output register 2216. Each modulus butterfly unit 2210 may be configured to receive a clock signal and a prime integer. Similarly, the configuration and operation of the L/2 modulus butterfly units 2210 are the same or similar as the L/2 modulus butterfly units 1508 as described hereinbefore and thus need not be repeated for conciseness.

In particular, FIG. 21 illustrates at stage j of intra-line butterfly (i.e., intra-line butterfly array block 812-*j*)) while j∈[1, r−1], t∈[0, L/2k−1], k=(L/2)/$2^j$. Each pair of data points $R_{in}$[t·2k+s] and $R_{in}$[t·2k+s+k], along with TF_TAB_q [s], are input to a corresponding modulus butterfly unit 2210 for computation to obtain the result of $R_{out}$[t·2k+s] and $R_{out}$[t·2k+s+k] where s∈[0, k−1]. As an example, computations by a modulus butterfly unit may be performed according to the following equations:

$$R_{out}[t\cdot 2k+s]=(R_{in}[t\cdot 2k+s]+R_{in}[t\cdot 2k+s+k])\text{mod}_p \quad \text{(Equation 9)}$$

$$R_{out}[t\cdot 2k+s+k]=((R_{in}[t\cdot 2k+s]-R_{in}[t\cdot 2K+s+k])\cdot TF\_TAB\_q[s])\text{mod}_p \quad \text{(Equation 10)}$$

Accordingly, the DGT circuit 100 comprises a plurality of intra-line butterfly array blocks 812, each intra-line butterfly array block comprising a plurality of intra-line modulus butterfly units 2110/2210, each intra-line modulus butterfly unit being configured to perform a modulus butterfly operation based on a computation pair of data points received corresponding to a pair of input data points at a same column of the matrix of input data points (e.g., as described hereinbefore with reference to FIGS. 7A and 7B and as illustrated in the data flow of the DGT circuit 800 shown in FIGS. 31A to 31S to be described later below. By way of an example only, as shown in FIGS. 31N to 31S, it can be seen that each intra-line modulus butterfly unit is configured to perform a modulus butterfly operation based on a computation pair of data points received (e.g., data points $x_0^2$ and $x_1^2$ received by an intra-line modulus butterfly unit in FIG. 31N) corresponding to a pair of input data points at a same column of the matrix of input data points (e.g., see FIG. 31A, whereby corresponding data points $x_0^0$ and $x_1^0$ are at a same column of the matrix of input data points)). Furthermore, as shown in FIGS. 21 and 22, each intra-line butterfly array block of the plurality of intra-line butterfly array blocks 812 comprises an input register 2112/2212. In this regard, for said each intra-line butterfly array block, the input register is communicatively coupled to the plurality of intra-line modulus butterfly units 2110/2210 of the intra-line butterfly array block and is configured to receive a column of data points and output the column of data points to the plurality of intra-line modulus butterfly units for each of the plurality of intra-line modulus butterfly units to perform the modulus butterfly operation based on the computation pair of data points received.

Furthermore, as described hereinbefore according to various example embodiments, a clock counter 1502 is communicatively coupled to each inter-line butterfly array block of the plurality of inter-line butterfly array blocks 808 and each intra-line butterfly array block of the plurality of intra-line butterfly array blocks 812, and configured to output a counter signal for controlling each inter-line butterfly array block and said each intra-line butterfly array block to operate with single cycle initiation interval. Accordingly, the plurality of inter-line butterfly array blocks 808 and the plurality of intra-line butterfly array blocks 812 are arranged in series to form a pipeline for processing the matrix of input data points.

As explained hereinbefore and as will be understood by a person skilled in the art, the operation or process (or data flow) of iDGT is generally the reverse of that of DGT as described hereinbefore with reference to FIG. 8, and thus, the configuration and data flow of the iDGT as shown in FIG. 10 need not be described in detail for clarity and conciseness. That is, it can be understood by a person skilled in the art that iDGT is generally the reversal processing of DGT. For example, the data flows (or a plurality of columns of input data points are processed) from stage r−1 to stage 0 of intra-line modulus butterfly blocks 1012 and from stage 0 to stage q−1 of inter-line modulus butterfly blocks as shown in FIG. 10. Thereafter, the L data points obtained are modulo multiplied by minV parallelly in L×parallel modulus multiplication units 1020. As an example, each modulus multiplication unit may be configured to operate according to the following equation:

$$W_k[n]=(W'_k[n]\cdot\min V)\mathrm{Mod}_p \text{ where } n\in[0,L-1] \quad \text{(Equation 11)}$$

Figure 23:
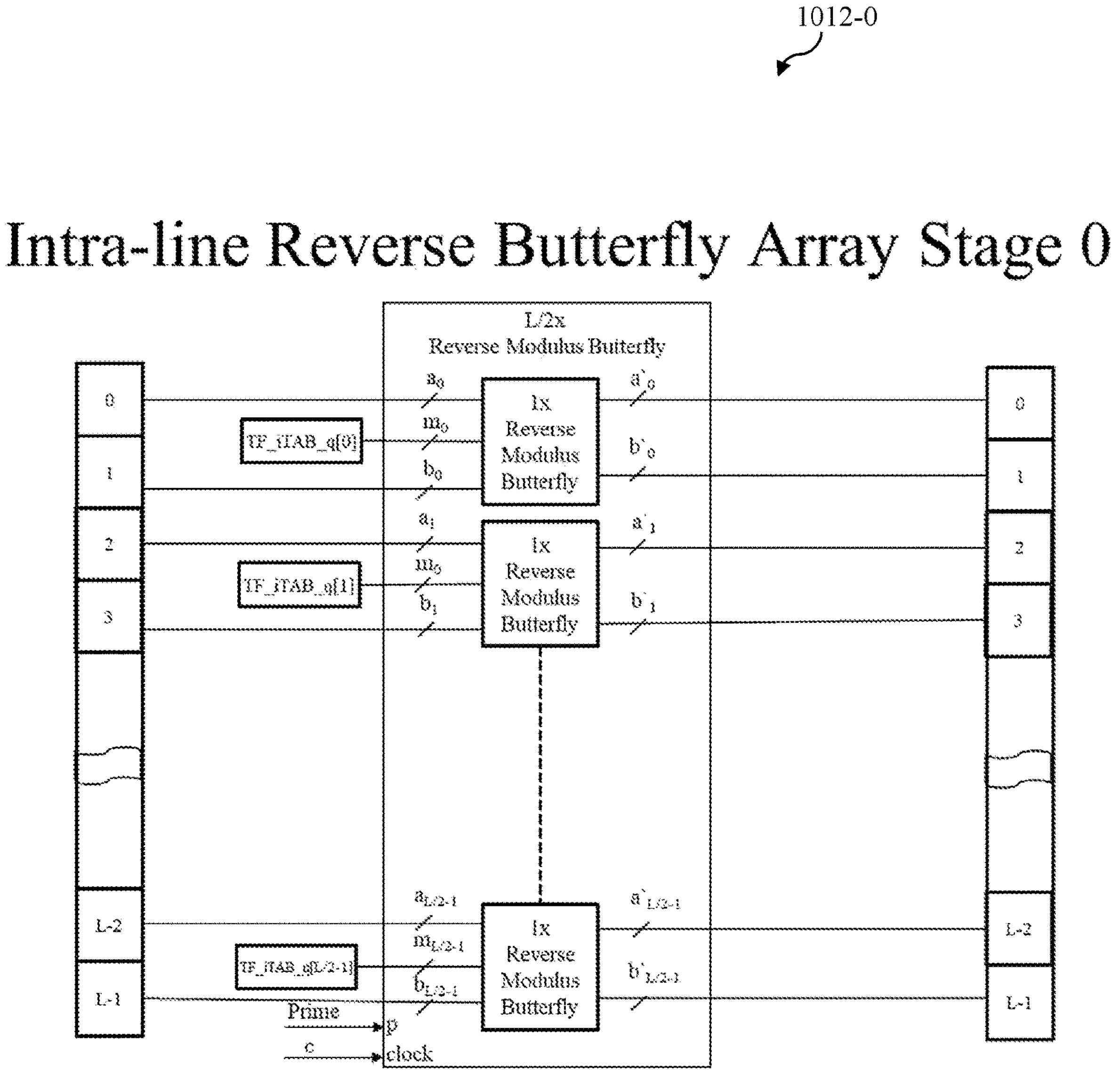
FIG. 23 depicts a schematic block diagram of an example intra-line butterfly array block of the iDGT circuit at a first stage of the intra-line butterfly (the intra-line butterfly stage 0), according to various example embodiments of the present invention, corresponding to, and being an inverse or reverse, of the intra-line butterfly stage 0 of the DGT circuit as described hereinbefore.
Figure 24:
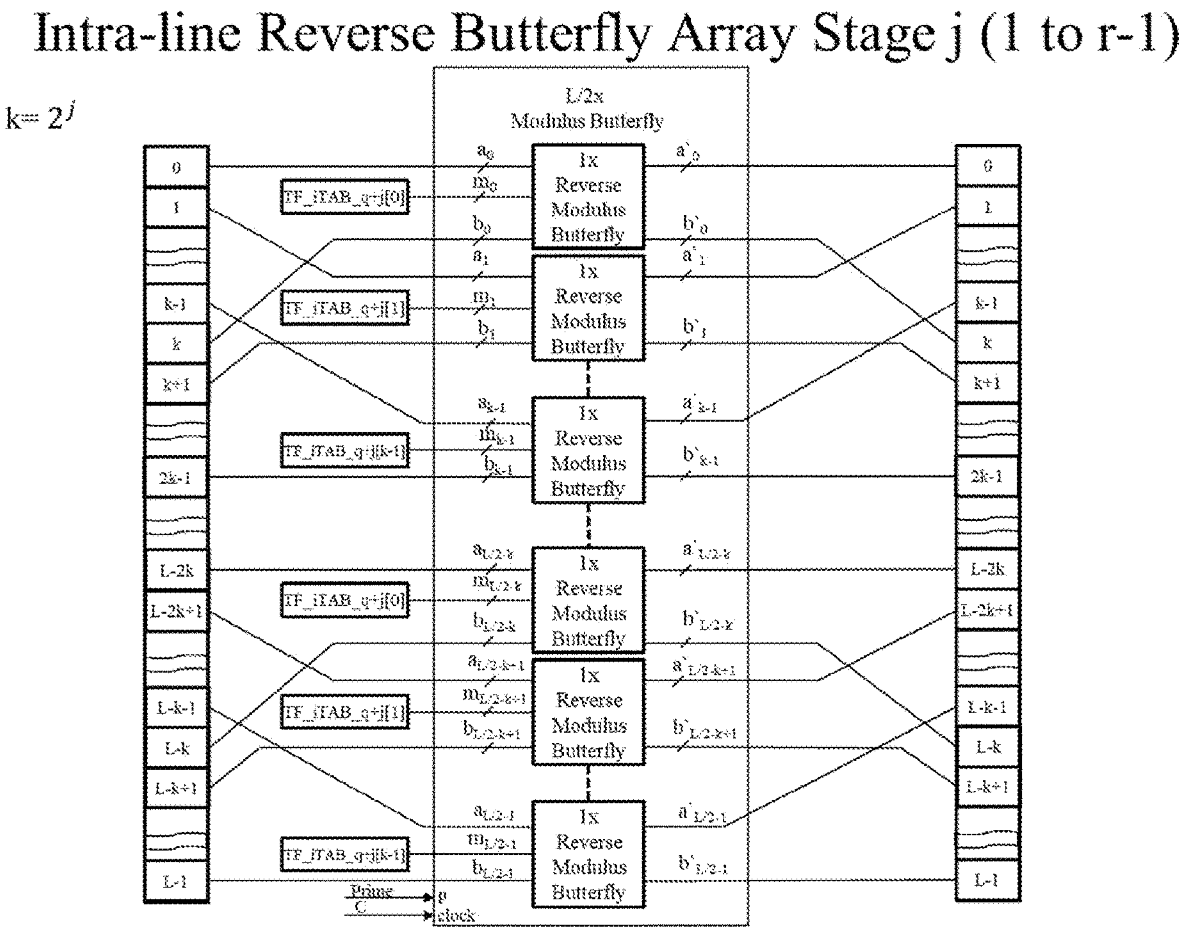
FIG. 24 depicts a schematic block diagram of an example intra-line butterfly array block of the iDGT circuit at an intermediate or the last time stage of the intra-line butterfly (illustrated as stage j), according to various example embodiments of the present invention, corresponding to, and being an inverse or reverse of, the intra-line butterfly stage j of the DGT circuit as described hereinbefore.
Figure 25:
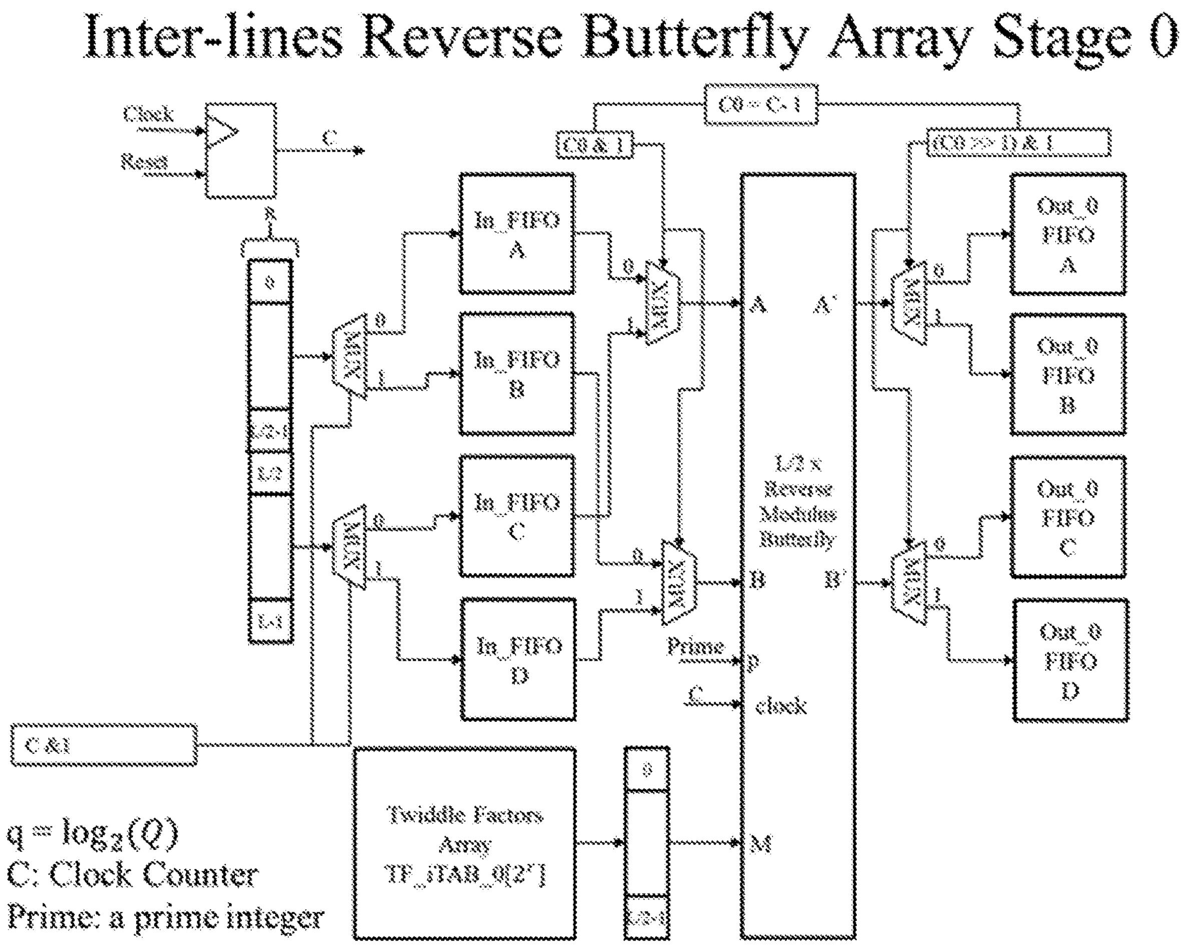
FIG. 25 depicts a schematic block diagram of an example inter-line butterfly array block of the iDGT circuit at a first stage of the inter-line butterfly (illustrated as stage 0 in FIG. 10), according to various example embodiments of the present invention, corresponding to, and being an inverse or reverse, of the inter-line butterfly stage 0 of the DGT circuit as described hereinbefore.
Figure 26:
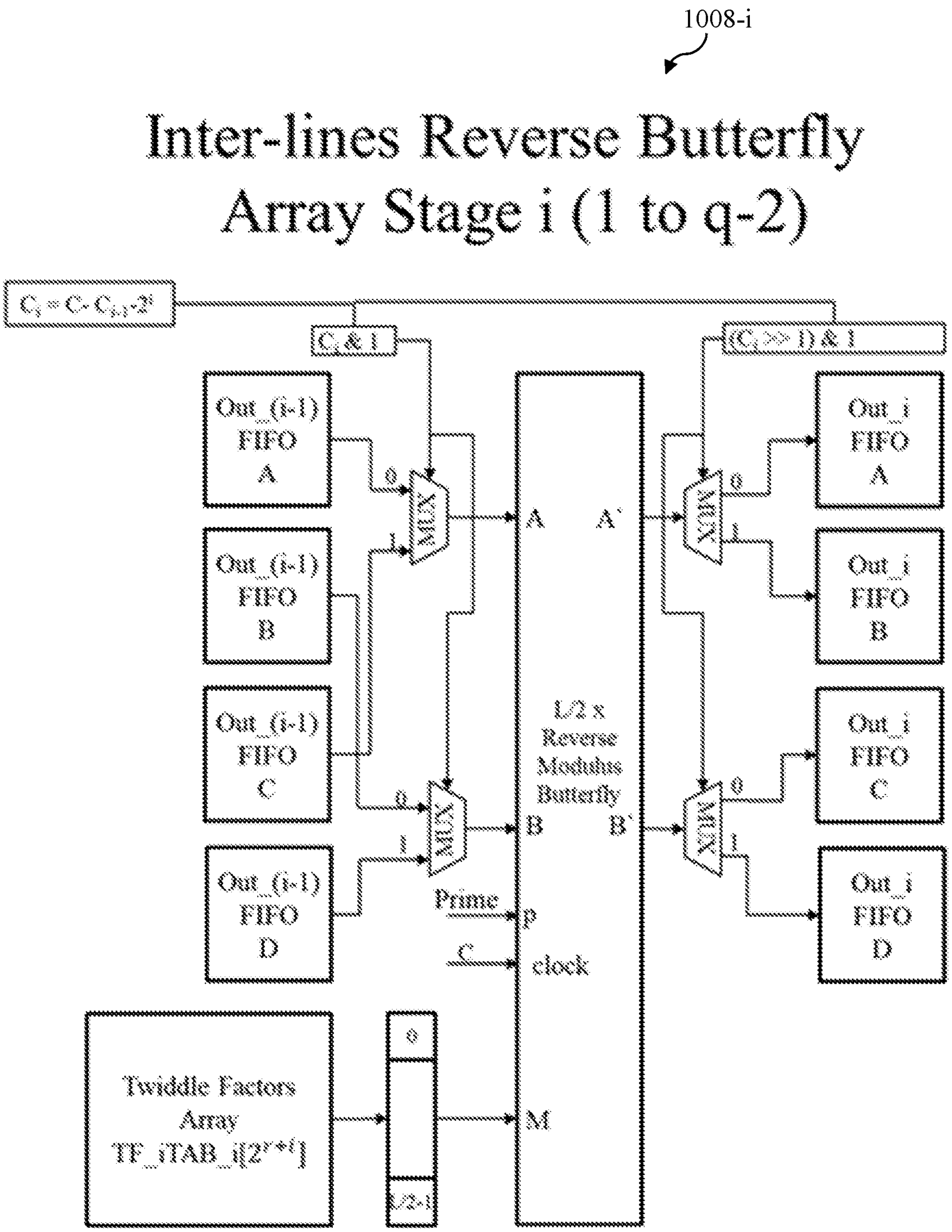
FIG. 26 depicts a schematic block diagram of an example inter-line butterfly array block of the iDGT circuit at an intermediate stage (illustrated as stage i) according to various example embodiments of the present invention, corresponding to, and being an inverse or reverse, of the inter-line butterfly stage i of the DGT circuit as described hereinbefore.
Figure 27:
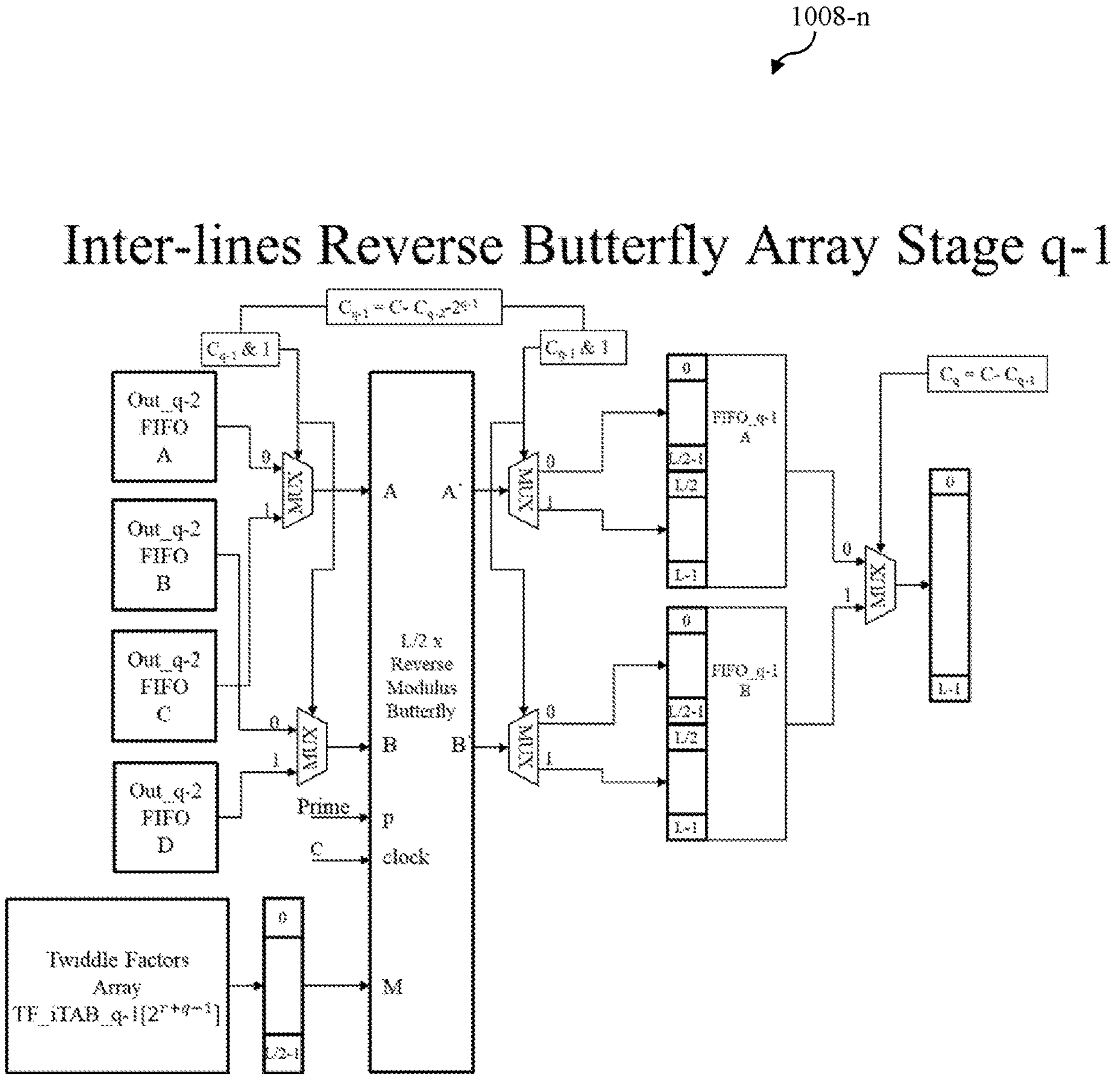
FIG. 27 depicts an example inter-line butterfly array block of the iDGT circuit at the last stage (illustrated as stage q−1), according to various example embodiments of the present invention, corresponding to, and being an inverse or reverse, of the inter-line butterfly stage q−1 of the DGT circuit as described hereinbefore.
Figure 28:
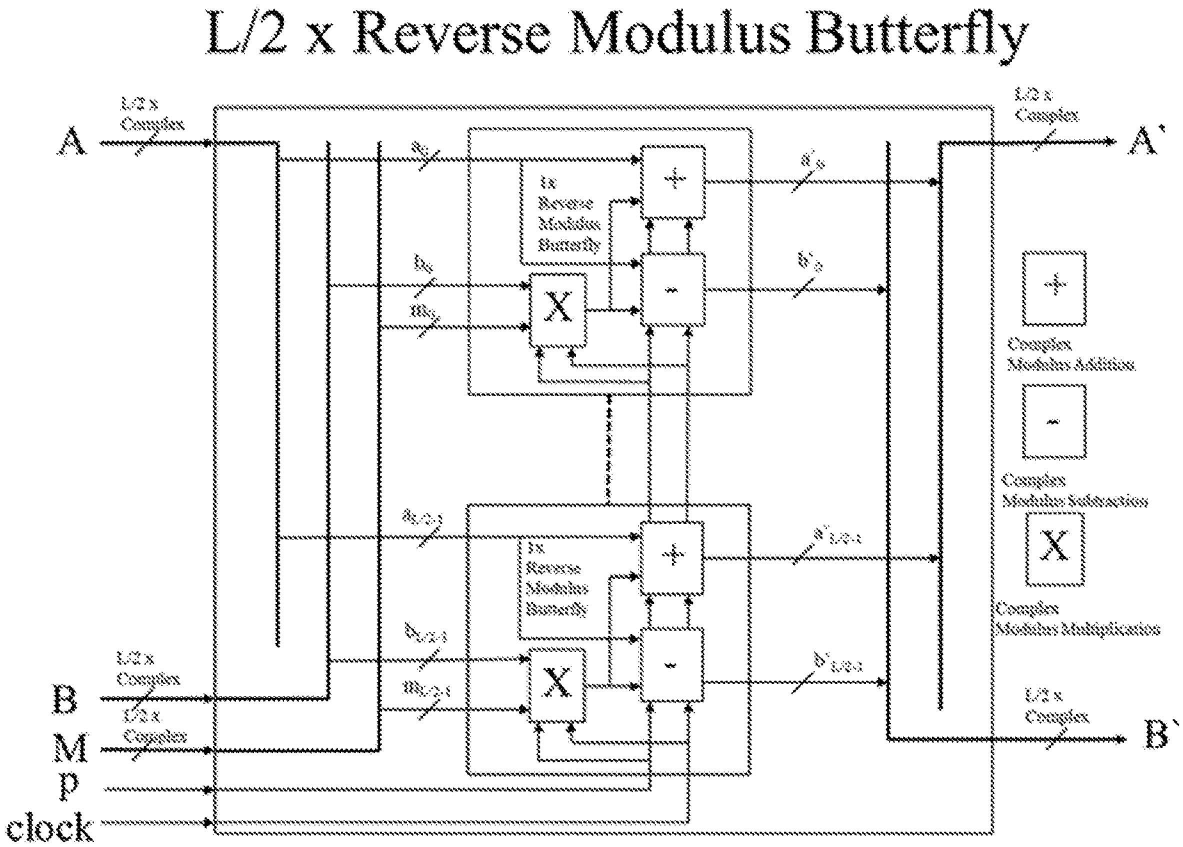
FIG. 28 depicts a schematic block diagram of the L/2 reverse modulus butterfly units of the iDGT circuit, according to various example embodiments of the present invention, corresponding to, and being an inverse or reverse, of the L/2 modulus butterfly units of the DGT circuit as described hereinbefore.

For completeness, FIG. 23 depicts a schematic block diagram of an example intra-line butterfly array block 1012-0 (which may be referred to as an intra-line reverse butterfly array block) of the iDGT circuit 1000 at a first stage of the intra-line butterfly (the intra-line butterfly stage 0), according to various example embodiments of the present invention, corresponding to, and being an inverse or reverse, of the intra-line butterfly stage 0 (intra-line butterfly array block 812-0) of the DGT circuit 800 as described hereinbefore, whereby the modulus butterfly operation performed by each modulus butterfly unit of the intra-line butterfly array block 1012-0 is inversed or reversed as shown in FIG. 28 (such a modulus butterfly operation and such a modulus butterfly unit may thus be referred to as a reverse or inverse modulus butterfly operation or a reverse or inverse modulus butterfly unit, respectively) compared with the modulus butterfly operation as described hereinbefore with reference to FIG. 16 for the DGT circuit 800. FIG. 24 depicts a schematic block diagram of an example intra-line butterfly array block 1012-*j* (which may be referred to as an intra-line reverse butterfly array block) of the iDGT circuit 1000 at an intermediate or the last time stage of the intra-line butterfly (illustrated as stage j), according to various example embodiments of the present invention, corresponding to, and being an inverse or reverse of, the intra-line butterfly stage j (intra-line butterfly array block 812-*j*) of the DGT circuit 800 as described hereinbefore, whereby similarly, the modulus butterfly operation performed by each modulus butterfly unit of the intra-line butterfly array block 1012-*j* is inversed or reversed as shown in FIG. 28 compared with the modulus butterfly operation as described hereinbefore with reference to FIG. 16 for the DGT circuit 800. FIG. 25 depicts a schematic block diagram of an example inter-line butterfly array block 1008-0 (which may be referred to as an inter-line reverse butterfly array block) of the iDGT circuit 1000 at a first stage of the inter-line butterfly (illustrated as stage 0 in FIG. 10), according to various example embodiments of the present invention, corresponding to, and being an inverse or reverse, of the inter-line butterfly stage 0 (inter-line butterfly array block 808-0) of the DGT circuit 800 as described hereinbefore, whereby similarly, the modulus butterfly operation performed by each modulus butterfly unit of the inter-line butterfly array block 1008-0 is inversed or reversed as shown in FIG. 28 compared with the modulus butterfly operation as described hereinbefore with reference to FIG. 16 for the DGT circuit 800. FIG. 26 depicts a schematic block diagram of an example inter-line butterfly array block 1008-*i* (which may be referred to as an inter-line reverse butterfly array block) of the iDGT circuit 1000 at an intermediate stage (illustrated as stage i) according to various example embodiments of the present invention, corresponding to, and being an inverse or reverse, of the inter-line butterfly stage i (inter-line butterfly array block 808-*i*) of the DGT circuit 800 as described hereinbefore, whereby similarly, the modulus butterfly operation performed by each modulus butterfly unit of inter-line butterfly array block 1008-*i* is inversed or reversed as shown in FIG. 28 compared with the modulus butterfly operation as described hereinbefore with reference to FIG. 16 for the DGT circuit 800. FIG. 27 depicts an example inter-line butterfly array block 1008-*n* (which may be referred to as an inter-line reverse butterfly array block) of the iDGT circuit 1000 at the last stage (illustrated as stage q−1), according to various example embodiments of the present invention, corresponding to, and being an inverse or reverse, of the inter-line butterfly stage q−1 (inter-line butterfly array block 808-*n*) of the DGT circuit 800 as described hereinbefore, whereby similarly, the modulus butterfly operation performed by each modulus butterfly unit of inter-line butterfly array block 1008-*n* is inversed or reversed as shown in FIG. 28 compared with the modulus butterfly operation as described hereinbefore with reference to FIG. 16 for the DGT circuit 800.

FIG. 28 depicts a schematic block diagram of example L/2 reverse or inverse modulus butterfly units 2808 according to various example embodiments of the present invention. As can be seen in FIG. 28, each reverse modulus butterfly unit 2808 is the reverse of the modulus butterfly unit 1508 shown in FIG. 16 whereby the complex modulus multiplication is performed before the complex modulus addition and subtraction in the reverse modulus butterfly operation compared with the modulus butterfly operation described with reference to FIG. 16. In the example L/2 modulus butterfly units 2808, components thereof are communicatively coupled (or interconnected) in the manner as shown in FIG. 28 and thus need not be described in detail for conciseness. Each reverse modulus butterfly unit 2808 is configured to perform a reverse modulus butterfly operation based on a computation pair of data points ($a_i$, $b_i$) received. In particular, FIG. 28 illustrates and defines the reverse modulus butterfly operation performed by each reverse modulus butterfly unit 2808 according to various example embodiments of the present invention involving a modulus addition operation (e.g., the complex modulus addition operation as shown in FIG. 17), a modulus subtraction operation (e.g., the complex modulus subtraction operation as shown in FIG. 18) and a modulus multiplication operation (e.g., the complex modulus multiplication operation as shown in FIG. 14) configured or arranged (e.g., interconnected) as shown in FIG. 28, whereby $$A = \left\{a_0 a_1 \ldots a_{\frac{L}{2}-1}\right\},\ B = \left\{b_0 b_1 \ldots b_{\frac{L}{2}-1}\right\},$$

$$A' = \left\{a'_0 a'_1 \ldots a'_{\frac{L}{2}-1}\right\},\ B' = \left\{b'_0 b'_1 \ldots b'_{\frac{L}{2}-1}\right\} \text{ and}$$

$$M = \left\{m_0 m_1 \ldots m_{\frac{L}{2}-1}\right\}.$$

Furthermore, $a_i$, $b_i$, $a'_i$, $b'_i$ and $m_i$ are complex integers, whereby $$i \in \left[0, \frac{L}{2} - 1\right],$$

p denotes a prime integer and clock denotes a single bit clock. As shown in FIG. 28, each modulus butterfly unit 2808 may be configured to receive a clock signal and a prime integer.

To demonstrate the effectiveness (improved performance) of the DGT circuit 800 and the iDGT circuit 1000 according to various example embodiments of the present invention, simulation results thereof will now be described. For the example simulation, the DGT described according to various example embodiments is designed in C++ code and passed the C simulation and is synthesized by using Xilinx HLS (High Level Synthesis) Tools. The DGT is configured based on $m=2^{15}$, L=64, r=6 and q=9. At the clock frequency of 200 MHz, the latency of DGT achieved was 1439 cycles which is equal to 7.195 us while the initiation interval is 1 cycle, as can be seen from the simulation results shown in FIG. 29. The iDGT described according to various example embodiments is designed in C++ code and passed the C simulation and is synthesized by using Xilinx HLS (High Level Synthesis) Tools. The iDGT is configured based on $m=2^{15}$, L=64, r=6 and q=9. At the clock frequency of 200 MHz, the latency of iDGT is 1154 cycles which is equal to 5.77 us while the initiation interval is 1 cycle, as can be seen from the simulation results shown in FIG. 30. Accordingly, the improved performance (e.g., significantly low latency) of the DGT and iDGT according to various example embodiments of the present invention (as summarized in Table 1 presented hereinbefore) can be clearly seen.

For better understanding and illustrative purpose, a detailed data flow of the DGT circuit 800 for $2^4$ data points (i.e., 16 parallel data points arranged into 4 columns of 4 parallel data points) according to various example embodiments are shown in FIGS. 31A to 31S. In FIGS. 31A to 31S, the transition from one figure to the next figure corresponds to one clock count.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A device for processing homomorphically encrypted data, the device comprising:

a processor; and a memory communicatively coupled to the processor storing instructions that when executed by the processor causes the processor to:

perform, using each inter-line modulus butterfly unit of a plurality of inter-line butterfly array blocks wherein each inter-line butterfly array block comprises a plurality of the inter-line modulus butterfly units, a modulus butterfly operation based on a computation pair of data points received corresponding to a pair of input data points at a same row of a matrix of input data points;

perform, using each intra-line modulus butterfly unit of a plurality of intra-line butterfly array blocks wherein each intra-line butterfly array block comprises a plurality of the intra-line modulus butterfly units, a modulus butterfly operation based on a computation pair of data points received corresponding to a pair of input data points at a same column of the matrix of input data points; and output, using a clock counter communicatively coupled to each inter-line butterfly array block of the plurality of inter-line butterfly array blocks and each intra-line butterfly array block of the plurality of intra-line butterfly array blocks, a counter signal for controlling said each inter-line butterfly array block and said each intra-line butterfly array block to operate with single cycle initiation interval, wherein the matrix of input data points comprises a plurality of columns of input data points, wherein a plurality of parallel input data points derived from the homomorphically encrypted data are arranged into the plurality of columns of input data points, and the plurality of inter-line butterfly array blocks and the plurality of intra-line butterfly array blocks are arranged in series to form a pipeline for processing the matrix of input data points.

2. The device according to claim 1, whereby the memory further comprises instructions for directing the processor to:

receive, using a data point arranging block, the plurality of parallel input data points derived from the homomorphically encrypted data and arrange the plurality of parallel input data points received into the plurality of columns of input data points to form the matrix of input data points.

3. The device according to claim 1, wherein each inter-line butterfly array block of the plurality of inter-line butterfly array blocks comprises a plurality of first-in-first-out (FIFO) input data buffers, and the memory further comprises instructions for directing the processor to:

for said each inter-line butterfly array block, receive, using each FIFO input data buffer of the plurality of FIFO input data buffers that is communicatively coupled to the plurality of inter-line modulus butterfly units of the inter-line butterfly array block, a plurality of columns of data points and output each of the plurality of columns of data points to the plurality of inter-line modulus butterfly units column-by-column in FIFO order for each of the plurality of inter-line modulus butterfly units to perform said modulus butterfly operation based on the computation pair of data points received.

4. The device according to claim 3, wherein for said each inter-line butterfly array block:

said each of the plurality of columns of data points has a number of data points being half of the number of input data points in a column of the plurality of columns of input data points, and the plurality of inter-line modulus butterfly units of the inter-line butterfly array block has a number of inter-line modulus butterfly units being half of the number of input data points in the column of the plurality of columns of input data points.

5. The device according to claim 3, wherein for said each inter-line butterfly array block:

the inter-line butterfly array block comprises a first set of multiplexer units, each FIFO input data buffer of the plurality of FIFO input data buffers of the inter-line butterfly array block being communicatively coupled to the plurality of inter-line modulus butterfly units of the inter-line butterfly array block via a multiplexer unit of the first set of multiplexer units, and the clock counter is communicatively coupled to each multiplexer unit of the first set of multiplexer units for controlling the inter-line butterfly array block to operate with single cycle initiation interval.

6. The device according to claim 5, wherein a first FIFO input data buffer and a third FIFO input data buffer of the plurality of FIFO input data buffers of the inter-line butterfly array block are each communicatively coupled to a first multiplexer unit of the first set of multiplexer units, and the memory further comprises instructions for directing the processor to output, using the first multiplexer unit, a column of data points of the plurality of columns of data points from a selected FIFO input data buffer amongst the first and third FIFO input data buffers to the plurality of inter-line modulus butterfly units of the inter-line butterfly array block, the selected FIFO input data buffer being selected based on the counter signal received by the first multiplexer unit of the first set of multiplexer units, and wherein a second FIFO input data buffer and a fourth FIFO input data buffer of the plurality of FIFO input data buffers of the inter-line butterfly array block are each communicatively coupled to a second multiplexer unit of the first set of multiplexer units, and the memory further comprises instructions for directing the processor to output, using the second multiplexer unit, a column of data points of the plurality of columns of data points from a selected FIFO input data buffer amongst the second and fourth FIFO input data buffers to the plurality of inter-line modulus butterfly units of the inter-line butterfly array block, the selected FIFO input data buffer being selected based on the counter signal received by the second multiplexer unit of the first set of multiplexer units.

7. The device according to claim 6, wherein for each inter-line butterfly array block from a first inter-line butterfly array block to a penultimate inter-line butterfly array block of the plurality of inter-line butterfly array blocks:

the inter-line butterfly array block further comprises a second set of multiplexer units, each FIFO input data buffer of the plurality of FIFO input data buffers of an immediately subsequent inter-line butterfly array block of the plurality of inter-line butterfly array blocks with respect to the inter-line butterfly array block is communicatively coupled to the plurality of inter-line modulus butterfly units of the inter-line butterfly array block via a multiplexer unit of the second set of multiplexer units, and the clock counter is communicatively coupled to each multiplexer unit of the second set of multiplexer units for controlling the inter-line butterfly array block to operate with single cycle initiation interval.

8. The device according to claim 7, wherein the first FIFO input data buffer and the second FIFO input data buffer of the plurality of FIFO input data buffers of the immediately subsequent inter-line butterfly array block are each communicatively coupled to a first multiplexer unit of the second set of multiplexer units, and the memory further comprises instructions for directing the processor to output, using the first multiplexer unit, a first portion of a column of data points from the plurality of inter-line modulus butterfly units of the inter-line butterfly array block to a selected FIFO input data buffer amongst the first and second FIFO input data buffers, the selected FIFO input data buffer being selected based on the counter signal received by the first multiplexer unit of the second set of multiplexer units, and the third FIFO input data buffer and the fourth FIFO input data buffer of the plurality of FIFO input data buffers of the immediately subsequent inter-line butterfly array block are each communicatively coupled to a second multiplexer unit of the second set of multiplexer units, and the memory further comprises instructions for directing the processor to output, using the second multiplexer unit, a second portion of a column of data points from the plurality of inter-line modulus butterfly units of the inter-line butterfly array block to a selected FIFO input data buffer amongst the third and fourth FIFO input data buffers, the selected FIFO input data buffer being selected based on the counter signal received by the second multiplexer unit of the second set of multiplexer units.

9. The device according to claim 7, wherein the first inter-line butterfly array block further comprises a third set of multiplexer units, the first and second FIFO input data buffers of the plurality of FIFO input data buffers of the first inter-line butterfly array block are each communicatively coupled to a first multiplexer unit of the third set of multiplexer units, and the memory further comprises instructions for directing the processor to output, the first multiplexer unit, a first portion of a column of data points from an input register to a selected FIFO input data buffer amongst the first and second FIFO input data buffers, the selected FIFO input data buffer being selected based on the counter signal received by the first multiplexer unit of the third set of multiplexer units, the third and fourth FIFO input data buffers of the plurality of FIFO input data buffers of the first inter-line butterfly array block are each communicatively coupled to a second multiplexer unit of the third set of multiplexer units, and the memory further comprises instructions for directing the processor to output, using the second multiplexer unit, a second portion of the column of data points from the input register to a selected FIFO input data buffer amongst the third and fourth FIFO input data buffers, the selected FIFO input data buffer being selected based on the counter signal received by the second multiplexer unit of the third set of multiplexer units, and the clock counter is communicatively coupled to each multiplexer unit of the third set of multiplexer units for controlling the first inter-line butterfly array block to operate with single cycle initiation interval.

10. The device according to claim 5, wherein a last inter-line butterfly array block of the plurality of inter-line butterfly array blocks further comprises:

a second set of multiplexer units;

a third multiplexer unit; and a plurality of FIFO output data buffers, wherein each FIFO output data buffer of the plurality of FIFO output data buffers of the last inter-line butterfly array block is communicatively coupled to the plurality of inter-line modulus butterfly units of the last inter-line butterfly array block via a multiplexer unit of the second set of multiplexer units, and the memory further comprises instructions for directing the processor to output, using the third multiplexer unit, a column of data points from a selected FIFO output data buffer amongst the plurality of FIFO output data buffers, the selected FIFO output data buffer being selected based on the counter signal received by the third multiplexer unit, and the clock counter is communicatively coupled to each multiplexer unit of the second set of multiplexer units and the third multiplexer unit for controlling the last inter-line butterfly array block to operate with single cycle initiation interval.

11. The device according to claim 1, wherein each intra-line butterfly array block of the plurality of intra-line butterfly array blocks comprises an input register, for said each intra-line butterfly array block, the input register is communicatively coupled to the plurality of intra-line modulus butterfly units of the intra-line butterfly array block and the memory further comprises instructions for directing the processor to receive, using the input register, a column of data points and output the column of data points to the plurality of intra-line modulus butterfly units for each of the plurality of intra-line modulus butterfly units to perform said modulus butterfly operation based on the computation pair of data points received.

12. The device according to claim 1, further comprising a weight modulus multiplication block comprising a plurality of modulus multiplication units, and the memory further comprises instructions for directing the processor to perform, using each modulus multiplication unit, a modulus multiplication operation based on a data point received.

13. The device according to claim 1, wherein the plurality of intra-line butterfly array blocks are arranged after the plurality of inter-line butterfly array blocks in the pipeline.

14. The device according to claim 13, wherein the memory further comprises instructions for directing the processor to perform, using the pipeline, a discrete Galois transform (DGT) of the plurality of parallel input data points.

15. The device according to claim 1, wherein the plurality of inter-line butterfly array blocks are arranged after the plurality of intra-line butterfly array blocks in the pipeline.

16. The device according to claim 15, wherein the memory further comprises instructions for directing the processor to perform, using the pipeline, an inverse discrete Galois transform (iDGT) of the plurality of parallel input data points.

17. The device according to claim 1, wherein the plurality of parallel input data points has $2^n$ number of parallel input data points, the matrix has $2^r$ number of rows of input data points and $2^{n-r}$ number of columns of input data points, wherein $n \geq 4$, $r \geq 2$ and $r < n$, the plurality of inter-line butterfly array blocks has q number of inter-line buttery array blocks, wherein $q = n - r$, and the plurality of intra-line butterfly array blocks has r number of inter-line buttery array blocks.

18. The device according to claim 1, wherein the device is a field-programmable gate array (FPGA) device or an application specific integrated circuit (ASIC) device.

19. A system comprising:

a device for processing homomorphically encrypted data;

a processor; and a memory communicatively coupled to the processor storing instructions that when executed by the processor causes the processor to:

send, using the memory, a plurality of parallel input data points derived from homomorphically encrypted data to the device for processing by the device; and receive, using the memory, a plurality of parallel output data points produced by the device from processing the plurality of parallel input data points, wherein the device comprises:

a plurality of inter-line butterfly array blocks, each inter-line butterfly array block comprising a plurality of inter-line modulus butterfly units, the memory further comprising instructions for directing the processor to perform, using each inter-line modulus butterfly unit, a modulus butterfly operation based on a computation pair of data points received corresponding to a pair of input data points at a same row of a matrix of input data points;

a plurality of intra-line butterfly array blocks, each intra-line butterfly array block comprising a plurality of intra-line modulus butterfly units, the memory further comprising instructions for directing the processor to perform, using each inter-line modulus butterfly unit, a modulus butterfly operation based on a computation pair of data points received corresponding to a pair of input data points at a same column of the matrix of input data points; and a clock counter communicatively coupled to each inter-line butterfly array block of the plurality of inter-line butterfly array blocks and each intra-line butterfly array block of the plurality of intra-line butterfly array blocks, the memory further comprising instructions for directing the processor to output, using the clock counter, a counter signal for controlling said each inter-line butterfly array block and said each intra-line butterfly array block to operate with single cycle initiation interval, wherein the matrix of input data points comprises a plurality of columns of input data points, wherein a plurality of parallel input data points derived from the homomorphically encrypted data are arranged into the plurality of columns of input data points, and the plurality of inter-line butterfly array blocks and the plurality of intra-line butterfly array blocks are arranged in series to form a pipeline for processing the matrix of input data points.

20. A method of forming a device for processing homomorphically encrypted data, the method comprising:

performing a modulus butterfly operation based on a computation pair of data points received corresponding to a pair of input data points at a same row of a matrix of input data points using each inter-line modulus butterfly unit of a plurality of inter-line butterfly array blocks, each inter-line butterfly array block comprising a plurality of the inter-line modulus butterfly units;

performing a modulus butterfly operation based on a computation pair of data points received corresponding to a pair of input data points at a same column of the matrix of input data points using each intra-line modulus butterfly unit of a plurality of intra-line butterfly array blocks, each intra-line butterfly array block comprising the plurality of intra-line modulus butterfly units; and outputting a counter signal for controlling said each inter-line butterfly array block and said each intra-line butterfly array block to operate with single cycle initiation interval using a clock counter communicatively coupled to each inter-line butterfly array block of the plurality of inter-line butterfly array blocks and each intra-line butterfly array block of the plurality of intra-line butterfly array blocks, wherein the matrix of input data points comprises a plurality of columns of input data points, wherein a plurality of parallel input data points derived from the homomorphically encrypted data are arranged into the plurality of columns of input data points, and the plurality of inter-line butterfly array blocks and the plurality of intra-line butterfly array blocks are arranged in series to form a pipeline for processing the matrix of input data points.

* * * * *